United States Patent
Kim

(10) Patent No.: US 12,174,958 B2
(45) Date of Patent: Dec. 24, 2024

(54) APPARATUS FOR PROCESSING CYBER THREAT INFORMATION, METHOD FOR PROCESSING CYBER THREAT INFORMATION, AND MEDIUM FOR STORING A PROGRAM PROCESSING CYBER THREAT INFORMATION

(71) Applicant: SANDS LAB INC., Seoul (KR)

(72) Inventor: Kihong Kim, Seoul (KR)

(73) Assignee: SANDS LAB INC., Seoul (KR)

( * ) Notice: Subject to any disclaimer, the term of this patent is extended or adjusted under 35 U.S.C. 154(b) by 301 days.

(21) Appl. No.: 17/721,757

(22) Filed: Apr. 15, 2022

(65) Prior Publication Data
US 2023/0252143 A1    Aug. 10, 2023

(30) Foreign Application Priority Data
Feb. 9, 2022    (KR) .................. 10-2022-0017167

(51) Int. Cl.
G06F 21/56    (2013.01)

(52) U.S. Cl.
CPC .......... *G06F 21/563* (2013.01); *G06F 21/565* (2013.01); *G06F 21/566* (2013.01); *G06F 2221/033* (2013.01)

(58) Field of Classification Search
CPC .... G06F 21/563; G06F 21/565; G06F 21/566; G06F 2221/033; G06F 21/56
See application file for complete search history.

(56) References Cited

U.S. PATENT DOCUMENTS

| 8,402,541 B2 * | 3/2013 | Craioveanu ........... G06F 21/563 |
| | | 713/188 |
| 9,813,435 B2 | 11/2017 | Muddu et al. |
| 10,133,865 B1 | 11/2018 | Feinman et al. |
| 11,960,597 B2 * | 4/2024 | Prudkovskiy ........... G06F 21/54 |

(Continued)

FOREIGN PATENT DOCUMENTS

| CA | 2900312 A1 * | 8/2014 | ............. G06F 21/53 |
| KR | 10-2015-0118186 A | 10/2015 | |

(Continued)

OTHER PUBLICATIONS

Kaiser et al., "Attack Forecast and Prediction," Computer Electronics Security Application Rendezvou, 77-97 (2021).

*Primary Examiner* — Jayesh M Jhaveri
(74) *Attorney, Agent, or Firm* — Morgan, Lewis & Bockius LLP

(57) ABSTRACT

The disclosed embodiments relate to a cyber threat information processing apparatus, a cyber threat information processing method, and a storage medium storing a cyber threat information processing program. A disclosed embodiment provides a cyber threat information processing method including: a step to classify at least one executable file into a set of code blocks corresponding to at least one malware by performing conversion of such executable file and provide the classified set of block codes; a step to select one or more code blocks included in the classified set of code blocks and generate a new set of code blocks by combining such selected code blocks; and a step to predict new malware based on the set of code blocks generated as above and provide information about the new malware predicted.

14 Claims, 40 Drawing Sheets

(56) References Cited

U.S. PATENT DOCUMENTS

| | | | | |
|---|---|---|---|---|
| 2013/0326625 | A1* | 12/2013 | Anderson | G06F 21/566 |
| | | | | 726/23 |
| 2015/0186296 | A1 | 7/2015 | Guidry | |
| 2017/0147815 | A1 | 5/2017 | Pedersen | |
| 2018/0041536 | A1* | 2/2018 | Berlin | H04L 63/1416 |
| 2019/0005238 | A1* | 1/2019 | Breitenbacher | G06F 21/563 |
| 2020/0042701 | A1* | 2/2020 | Yang | G06N 3/045 |
| 2021/0176258 | A1* | 6/2021 | Zou | G06N 3/08 |

FOREIGN PATENT DOCUMENTS

| | | |
|---|---|---|
| KR | 10-2016-0082644 A | 7/2016 |
| KR | 10-2017-0018791 A | 2/2017 |
| KR | 10-2308477 B1 | 10/2021 |

* cited by examiner

FIG. 5

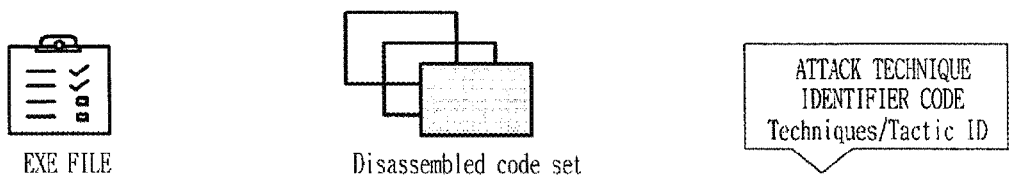

EXE FILE — Disassembled code set — ATTACK TECHNIQUE IDENTIFIER CODE Techniques/Tactic ID

| FILE | OP CODE | T-ID | DESCRIPTION |
|---|---|---|---|
| malware.exe | MOV DWORD PTR SS: [EBP-4], 1<br>MOV DWORD PTR SS: [EBP-8], 2<br>MOV EDX, DWORD PTR SS: [EBP-8]<br>LEA EAX, DWORD PTR SS: [EBP-4] | 1022 | CHANGE SYSTEM MAJOR REGISTRY |
| | PUSH EBP<br>MOV EBP, ESP<br>SUB ESP, 18<br>AND ESP, FFFFFFF0<br>MOV EAX, 0 | 1077 | REGISTER STARTUP PROGRAM |
| | LEA EAX, DWORD PTR SS: [EBP-4]<br>MOV EDX, DWORD PTR SS: [EBP-8]<br>LEA EAX, DWORD PTR SS: [EBP-4]<br>LEA EAX, DWORD PTR SS: [EBP-4] | 1034 | TURN OFF WINDOWS FIREWALL |
| | PUSH EBP<br>MOV EBP, ESP<br>MOV EAX, DWORD PTR SS: [EBP+B]<br>ADD EAX, DWORD PTR SS: [EBP+C]<br>POP EBP<br>RETN | 1090 | ADD NEW USER |
| | CMP DWORD PTR SS: [EBP-4], 2<br>JNZ SHORT if. 00401035<br>PUSH if. 0040C008<br>CALL if.printf<br>ADD ESP, 4<br>JMP SHORT if. 00401042 | 2011 | CREATE BACKDOOR |
| | CMP DWORD PTR SS: [EBP-B], 1<br>JE SHORT switch. 00401027<br>CMP DWORD PTR SS: [EBP-B], 2<br>JE SHORT switch. 00401036<br>CMP DWORD PTR SS: [EBP-B], 3<br>JE SHORT switch. 00401045<br>JMP SHORT switch. 00401054 | 3744 | SUSPEND OPERATION OF SECURITY PROGRAM |

FIG. 9

QUERY (A)
"FILE IN WHICH WORD "ransomware*" IS INCLUDED IN
ANTI-VIRUS DETECTION NAME DETECTED IN
MALWARE DETECTING 40 OR MORE ANTI-VIRUSES
FROM 4 PM MARCH 1, 2020 TO 9 AM MARCH 2, 2020,
FILE TYPE IS EXE, DISTRIBUTION SITE (ITW) IS
"go.kr*", CODE SIGN SIGNATURE INFORMATION IS
PRESENT, AND FILE SIZE IS 10 MB OR LESS"

QUERY (B)
"FILE IN WHICH FILE TYPE IS HWP, DOC, PPT, PDF, OR
XLS, DISTRIBUTION SITE IS PRESENT, "powershell.exe"
OR "vbscript.exe" IS EXECUTED AS RESULT OF
ACTIVITY ANALYSIS, AND FILE SIZE IS 10 MB OR
LESS IN FILE DETECTING 10 OR FEWER
ANTI-VIRUSES ON MARCH 1, 2020"

Query (C)
"FILE IN WHICH FILE TYPE IS EXE_32 OR EXE_64,
DISTRIBUTION SITE IS PRESENT, DISTRIBUTION SITE
ADDRESS IS NOT "nexon.com", "nexon" IS INCLUDED IN
FILE NAME, ACTIVITY "CORRECT FIREWALL
SETTING" OR "REGISTER IN START PROGRAM" IS
EXECUTED TO ATTEMPT ACCESS TO 184.55.38.2 AS
RESULT OF ACTIVITY ANALYSIS, AND FILE SIZE IS
100 KB OR MORE IN FILE DETECTING FIVE OR MORE
ANTI-VIRUSES IN JANUARY TO DECEMBER 2019"

Query (D)
"DAILY STATISTICAL INFORMATION OF FILE IN WHICH
FILE TYPE IS DOCUMENT (HWP, DOC, PPT, XLS, PDF),
"not-virus" IS NOT INCLUDED IN DETECTION NAME OF
Kaspersky, DISTRIBUTION SITE ADDRESS INCLUDES
"*.kr*" IN FILE DETECTING 20 OR MORE ANTI-VIRUSES
IN JANUARY TO DECEMBER 2019"

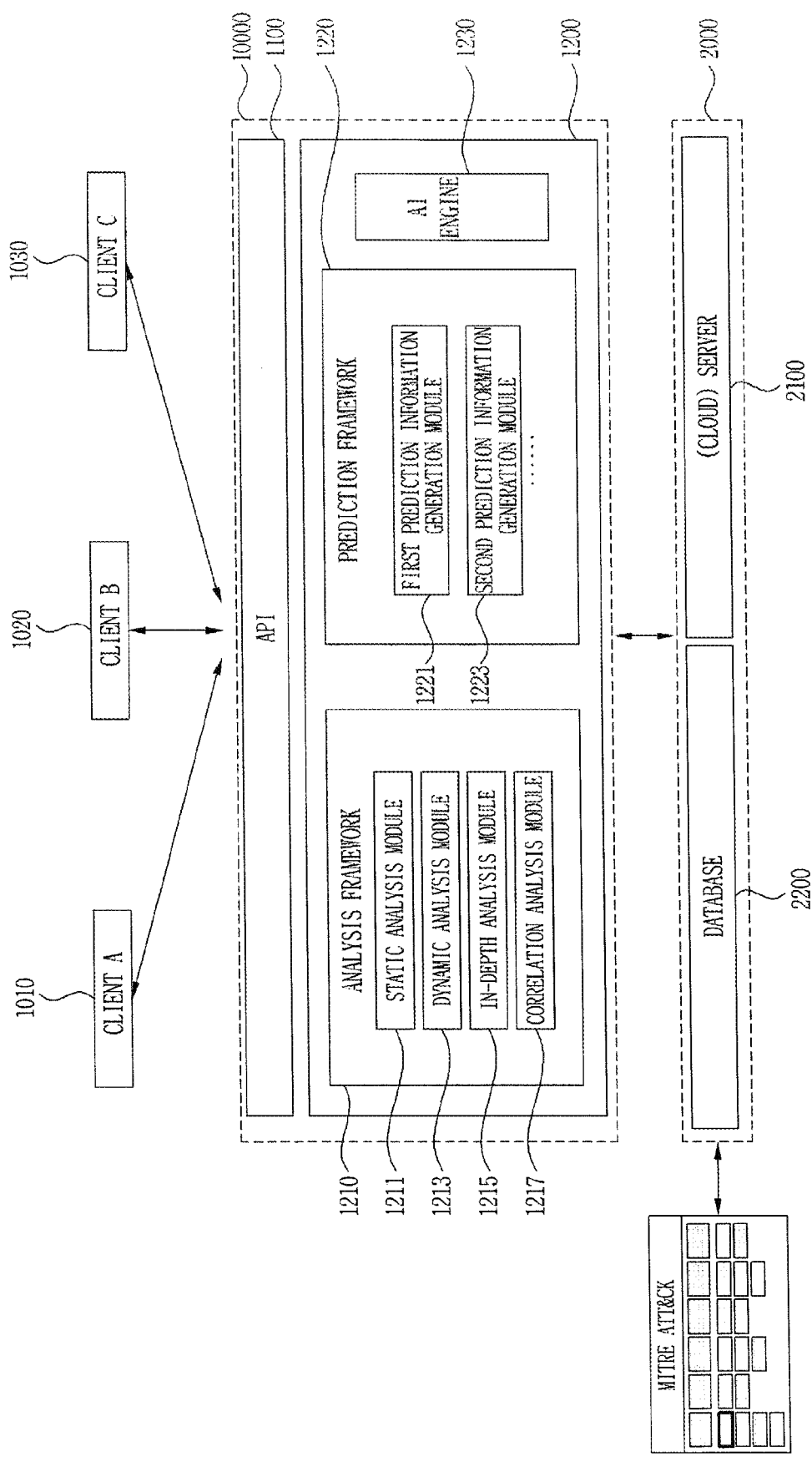

FIG. 22

| OP-CODE | OP-CODE → CRC-16 | ASM-CODE | ASM-CODE → CRC-32 |
|---|---|---|---|
| push | 0x45E9 | 55 | 0xC9034AF6 |
| mov | 0x10E3 | 8B EC | 0x3012FD2C |
| lea | 0xAACE | 8D 45 0C | 0x9214A6AA |
| push | 0x45E9 | 50 | 0xB969BE79 |
| push | 0x45E9 | 6A 00 | 0xDECB91D2 |
| push | 0x45E9 | FF 75 08 | 0x1D4AE87E |
| push | 0x45E9 | 6A 01 | 0xA9CCA144 |
| call | 0x09F8 | FF 15 B0 20 40 00 | 0x284055E2 |
| pop | 0x7117 | 59 | 0xC0B506DD |
| push | 0x45E9 | 50 | 0xB969BE79 |
| call | 0x09F8 | E8 AB FF FF FF | 0x4452C315 |
| add | 0x8B0B | 83 C4 10 | 0xAE137EE5 |
| pop | 0x7117 | 5D | 0xC7D8C2C4 |
| retn | 0x12B3 | C3 | 0xD06F7C87 |

FIG. 23

| OP-CODE Vector | ASM-CODE Vector |
|---|---|
| 17897 | 201 3 74 246 |
| 4323 | 48 18 253 44 |
| 43726 | 146 20 166 170 |
| 17897 | 185 105 121 44 |
| 17897 | 222 203 145 210 |
| 17897 | 29 74 232 126 |
| 17897 | 169 204 161 68 |
| 2552 | 40 64 85 226 |
| 28951 | 192 181 6 221 |
| 17897 | 185 105 190 121 |
| 2552 | 68 82 195 21 |
| 35595 | 174 19 126 229 |
| 28951 | 199 216 194 196 |
| 4787 | 208 111 124 135 |

FIG. 24

| Fixed block | content | a | b | c | d | e | f | g | h | i | j | k | l | m | n | o | p | q | r | s | t | u | v | w | x | y | z | 0 | 1 |
|---|---|---|---|---|---|---|---|---|---|---|---|---|---|---|---|---|---|---|---|---|---|---|---|---|---|---|---|---|---|
| Original | ascii val | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 48 | 19 |
| | ascii sum | 394 | | | 410 | | | 426 | | | 442 | | | 458 | | | 474 | | | 340 | | | | | | | | | |
| Kaq6KaU | b64 char | K | | | a | | | q | | | 6 | | | K | | | a | | | U | | | | | | | | | |

FIG. 27

| Label | | SHA-256 (size) | N-gram |
|---|---|---|---|
| T-ID | Attacker (or Group) | (OP-CODE + ASM-CODE)'s Fuzzy Hash | |
| T10XX | TA504 | 389E03B1A1FD1C5.... | {"3736":1,"3645":1, "4563":1, "6344":1, "4472":1,"7255":1 ..... |
| | | 32:76EcDrURBPQk58t... | |
| | TA504 | E3EC2AA04AFECC6... | {"3736":1,"3645":1, "4563":1, "6344":1, "4472":1,"7255":1, "5552":1,"5242":1, "4250":1...... |
| | | 32:76EcDrURBPQk58tGcoHE... | |

FIG. 31

| | |
|---|---|
| Cylance | ① Unsafe |
| eGambit | ① Unsafe.AI_Score_100% |
| SentinelOne (Static ML) | ① Static AI-Malicious PE |
| Symantec | ① ML.Attribute.HighConfidence |
| SecureAge APEX | ① Malicious |
| AVG | ① FileRepMalware |
| Bkav Pro | ① W32.AIDetect.malware1 |
| Cynet | ① Malicious (score:99) |
| Sophos | ① ML/PE-A |

3210        3220

APPARATUS FOR PROCESSING CYBER THREAT INFORMATION, METHOD FOR PROCESSING CYBER THREAT INFORMATION, AND MEDIUM FOR STORING A PROGRAM PROCESSING CYBER THREAT INFORMATION

CROSS-REFERENCE TO RELATED APPLICATIONS

This application claims the priority benefit of Korean Application No. 10-2022-0017167, filed on Feb. 9, 2022, which is hereby incorporated by reference as if fully set forth therein.

BACKGROUND OF THE INVENTION

Field of the Invention

The disclosed embodiments relate to a cyber threat information processing apparatus, a cyber threat information processing method, and a storage medium storing a cyber threat information processing program.

Discussion of the Related Art

The disclosed embodiments relate to a cyber threat information processing apparatus, a cyber threat information processing method, and a storage medium storing a cyber threat information processing program.

The damage from cybersecurity threats, which are gradually becoming more sophisticated, centering on new or variant malware, has been increasing. In order to reduce such damage even a little and to respond at an early stage, countermeasure technology has been advancing through multi-dimensional pattern composition, various types of complex analysis, etc. However, recent cyber-attacks tend to increase day by day rather than being adequately responded to within a control range. These cyberattacks threaten finance, transportation, environment, health, etc. that directly affect lives of people beyond the existing information and communication technology (ICT) infrastructure.

One of basic technologies to detect and respond to most existing cybersecurity threats is to create a database of patterns for cyberattacks or malware in advance, and utilize appropriate monitoring technologies where data flow is required. Existing technology has evolved based on a method of identifying and responding to threats when a data flow or code matching a monitored pattern is detected. Such conventional technology has an advantage of being able to rapidly and accurately perform detection when a data flow or code matches a previously secured pattern. However, the technology has a problem in that, in the case of a new or mutant threat for which a pattern is not secured or is bypassed, detection is impossible or it takes a significantly long time for analysis.

The related art is focused on a method of advancing technology to detect and analyze malware itself even when artificial intelligence (AI) analysis is used. However, there is no fundamental technology to counter cybersecurity threats, and thus there is a problem in that it is difficult to address new malware or new variants of malware with this method alone, and there is a limitation.

For example, there is a problem in that only the technology for detecting and analyzing previously discovered malware itself cannot address decoy information or fake information for deceiving a detection or analysis system thereof, and confusion occurs.

In the case of mass-produced malware having enough data to be learned, characteristic information thereof can be sufficiently secured, and thus it is possible to distinguish whether code is malicious or a type of malware. However, in the case of advanced persistent threat (APT) attacks, which are made in relatively small numbers and attack precisely, since training data does not match in many cases, and targeted attacks make up the majority, even when the existing technology is advanced, there are limitations.

In addition, conventionally, methods and expression techniques for describing malware, attack code, or cyber threats have differed depending on the position or analysis perspective of an analyst. For example, a method of describing malware and attack activity has not been standardized worldwide, and thus there has been a problem in that, even when the same incident or the same malware is detected, explanations of experts in the field are different, and thus confusion had occurred. Even a malware detection name has not been unified, and thus, for the same malicious file, it has been impossible to identify an attack performed correctly, or attacks have been differently organized. Therefore, there has been a problem in that identified attack techniques cannot be described in a normalized and standardized manner.

A conventional malware detection and analysis method focuses on detection of malware itself, and thus has a problem in that, in the case of malware performing significantly similar malicious activity, when generating attackers are different, the attackers cannot be identified.

In connection with the above problems, the conventional method has a problem in that it is difficult to predict a type of cyber threat attack occurring in the near future by such an individual case-focused detection method.

SUMMARY OF THE INVENTION

A disclosed embodiment provides a cyber threat information processing method. The cyber threat information processing method comprises converting one or more executable files to classify a set of code blocks corresponding to at least one malware and providing the classified set of code blocks, generating new set of cod blocks by selecting at least one code blocks included in the classified set of code blocks and combining the selected code blocks, and predicting new malware based on the generated new set of code blocks and providing information for the predicted new malware.

The cyber threat information processing method may additionally include a step to provide countermeasure information of the new malware predicted based on the information about the new malware predicted as above.

When at least one executable file is classified into a set of code blocks corresponding to at least one malware after going through conversion, a step to provide the set of code blocks includes a step to generate a set of code blocks corresponding to at least one such malware based on the disassembling code resulting from the rearrangement of opcode corresponding to a function included in the executable file and assembly code, which is an operand of the function.

One or more such executable files may run on an identical operating system.

The new malware may be predicted from the set of code blocks generated as above based on a cyberattack technique of at least one malware converted as above and another new attack technique.

The new malware may be predicted from the generated set of code blocks, except for a case in which characteristics of a physical attack technique of at least one malware converted as below are contradictory.

In another aspect of the instant disclosure, a cyber threat information apparatus includes a processor processing an executable file in an input file and a database storing malware.

The processor provides a cyber threat information processing apparatus that: classifies at least one executable file input through an Application Programming Interface (API) into a set of code blocks corresponding to at least malware by performing conversion of such executable file; selects one or more code blocks included in the classified set of code blocks and generate a new set of code blocks by combining the selected code blocks; and predicts new malware based on the set of code blocks generated as above and provide information about the new malware predicted.

The process may enable the provision of countermeasure information of the new malware based on information about the new malware predicted as above.

When at least one executable file is classified into a set of code blocks corresponding to at least one malware after going through conversion, the processor may generate a set of code blocks corresponding to at least one such malware based on the disassembling code resulting from the rearrangement of opcode corresponding to a function included in the executable file and assembly code, which is an operand of the function.

In another aspect of the instant disclosure, a storage medium for storing a software executable by a computer for processing cyber threat information may store software executable by a computer for processing cyber threat information that: classifies at least one executable file into a set of code blocks corresponding to at least one malware by performing conversion of such executable file and provides the classified set of code blocks; selects one or more codes blocks included in the classified set of code blocks and generates a new set of code blocks by combining the selected code blocks; and predicts new malware based on the generated set of code blocks and provides information about the new malware predicted as above.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 5 is a diagram illustrating an example of disassembling malware to determine that a file includes malicious activity as an example of in-depth analysis;

FIG. 9 is a diagram illustrating examples of malware queries for providing cyber threat information according to an embodiment;

FIG. 10 is a diagram illustrating an embodiment of a cyber threat information processing apparatus;

FIG. 22 is a diagram illustrating values obtained by converting opcode and ASM code into normalized code according to a disclosed embodiment;

FIG. 23 is a diagram illustrating vectorized values of opcode and ASM code according to a disclosed embodiment;

FIG. 24 is a diagram illustrating an example of converting a block unit of code into a hash value according to a disclosed embodiment;

FIG. 27 is a diagram illustrating an example of performing labeling by identifying an attack identifier and an attacker using training data according to a disclosed embodiment;

FIG. 31 is a diagram illustrating an example of providing detection names using detection engines that detect cyber threat information;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments will be described in detail with reference to the accompanying drawings. In the embodiments, a framework, a module, an application program interface, etc. may be implemented as a device coupled with a physical device or may be implemented as software.

When an embodiment is implemented as software, the software may be stored in a storage medium, installed in a computer, etc., and executed by a processor.

Embodiments of a cyber threat information processing apparatus and a cyber threat information processing method are disclosed in detail as follows.

Figure 1:
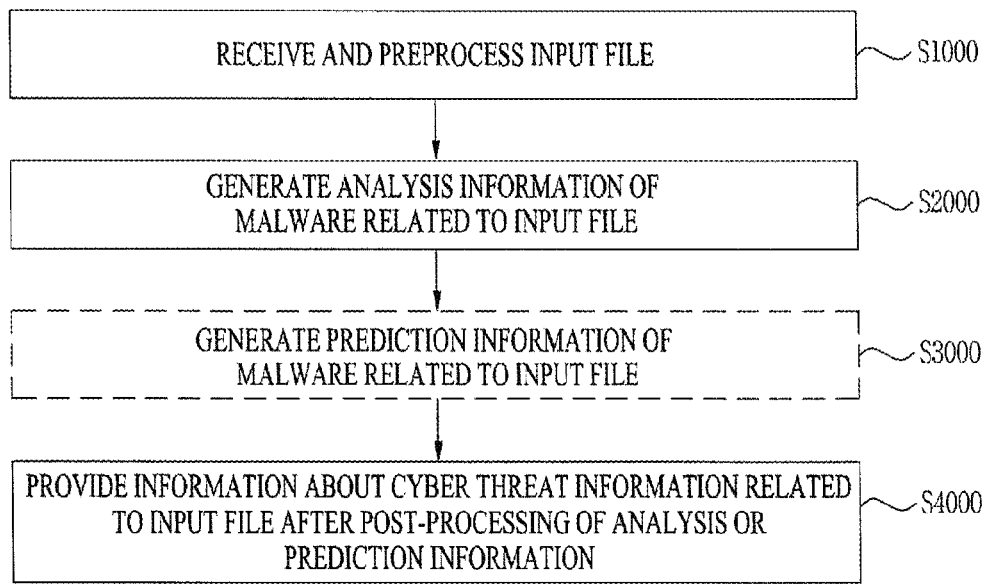
FIG. 1 is a diagram illustrating an embodiment of a cyber threat information processing method.

FIG. 1 is a diagram illustrating an embodiment of a cyber threat information processing method. The embodiment of the cyber threat information processing method is described as follows.

A file input to a cyber threat information processing apparatus is preprocessed (S1000).

Identification information capable of identifying a file may be obtained through preprocessing of the file. An example of performing preprocessing of a file is as follows.

Various types of meta information may be obtained from a received file, including source information of the file, collection information for obtaining the file, and user information of the file. For example, when the file includes a uniform resource locator (URL) or is included in an e-mail, it is possible to obtain collection information for the file. The user information may include information about a user generating, uploading, or finally saving the file, etc. In a preprocessing process, as meta information of the file, it is possible to obtain internet protocol (IP) information, country information based thereon, API key information, for example, API information of a user requesting analysis, etc.

It is possible to extract a hash value of the file in the preprocessing process. When the hash value is previously known to the cyber threat information processing apparatus, a type of file or a degree of risk may be identified based on the hash value.

When the file is not previously known, analysis information for identifying the file type may be obtained by inquiring about pre-stored information or, if necessary, the hash value and file information on an external reference website. For example, information according to file type may be obtained from a site such as cyber threats analysis system (C-TAS) operated by Korea Internet & Security Agency, cyber threat alliance (CTA) operating system (OS), or Virus Total as the external reference website.

For example, it is possible to search for the file from the site by using a hash value of a hash function such as Message-Digest algorithm 5 (MD5), Secure Hash Algorithm 1 (SHA1), or SHA 256 of the file. In addition, the file may be identified using a search result.

As an example of performing file analysis, when an input file is transmitted through a mobile network, network transmission packet recombination technology, etc. is used for packets transmitted through network traffic, so that, when the input file is suspicious mobile malware, the file may be saved. The packet recombination technology recombines a series of packets corresponding to one piece of executable code in the collected network traffic, and when a file transmitted by the recombined packets is suspicious mobile malware, this file is saved.

When the suspicious mobile malware is not extracted from the transmitted file in this step, it is possible to directly access a download URL in the file to download and save the suspicious mobile malware.

Malicious activity analysis information related to the input file is generated (S2000).

The malicious activity analysis information related to the input file may include static analysis information for analyzing information about the file itself or dynamic analysis information for determining whether malicious activity is performed by executing information obtained from the input file.

The analysis information in this step may include in-depth analysis information that uses information processed from an executable file related to the input file or performs memory analysis related to the file.

In-depth analysis may include AI analysis to accurately identify malicious activity.

The analysis information in this step may include correlation analysis information capable of estimating a correlation for attack activity or an attacker by correlating analysis information previously stored in relation to the file or generated analysis information with each other.

In this step, a plurality of pieces of analysis information may be aggregated to provide an overall analysis result.

For example, static analysis information, dynamic analysis information, in-depth analysis information, correlation analysis information, etc. for a single file may be integrated and analyzed for accurate attack technique and attacker identification. Integrated analysis removes an overlap between pieces of analysis information, and common information between pieces of analysis information may be used to increase accuracy.

For example, cyber threat infringement information (indicator of compromise, IoC) collected through several analyses and pathways may be standardized through normalization or enrichment of information.

In the embodiment of acquiring the analysis information, it is unnecessary to calculate all the analysis information described above in order. For example, any one of acquisition of the static analysis information and acquisition of the dynamic analysis information may be performed, and the dynamic analysis information may be acquired before the static analysis information.

The in-depth analysis information does not have to proceed after static analysis or dynamic analysis is performed, and correlation analysis may be performed without the in-depth analysis information.

Accordingly, the processing order for acquiring the analysis information may be changed, or acquisition may be selectively performed. In addition, the process of acquiring the analysis information and the process of generating the prediction information described above may be performed in parallel based on the information acquired from the file. For example, even when dynamic analysis is not completed, correlation analysis information may be generated. Similarly, dynamic analysis or in-depth analysis may be performed simultaneously.

In this case, the preprocessing process (S1000) exemplified above is for obtaining or identifying the information of the file, and thus, when static analysis, dynamic analysis, in-depth analysis, or correlation analysis is performed individually or in parallel, each preprocessing process may be performed as a part of each analysis step.

A detailed embodiment of this step will be described below.

Prediction information of malicious activity related to the input file may be generated (S3000).

In order to increase analysis accuracy, a data set of the various types of information analyzed above may be used to generate prediction information for whether malicious activity occurs, attack technique, an attacker group, etc.

The prediction information may be generated through AI analysis of a previously analyzed data set. The generation of the prediction information is not an essential step, and when an appropriately analyzed data set is prepared for AI analysis and a condition is satisfied, prediction information for malicious attack activity may be generated in the future.

An embodiment performs machine learning based on AI based on various types of analysis information. An embodiment may generate prediction information based on a data set for the analyzed information. For example, additional analysis information may be generated based on data learned by AI, and the regenerated analysis information may be used again as input data of AI as new training data.

Here, the prediction information may include malware creator information, malware tactic information, malware attack group prediction, malware similarity prediction information, and malware spread degree prediction information.

The generated prediction information may include first prediction information for predicting a risk level of the malware itself and second prediction information for predicting the attacker, attack group, similarity, spread degree, etc. of the malware.

Predictive analysis information including the first prediction information and the second prediction information may be stored in a server or a database.

A detailed embodiment thereof will be described below.

After post-processing of the analysis information or prediction information, cyber threat information related to the input file is provided (S4000).

The embodiment determines a type of malware and a risk level of the malware based on the analysis information or the prediction information. In addition, the embodiment creates profiling information for the malware. Therefore, it is possible to save a result of performing self-analysis on the file or a result of performing additional and predictive analysis through file analysis. The generated profiling information includes an attack technique for malware or labeling for an attacker.

The cyber threat information may include information on which preprocessing is performed, generated or identified analysis information, generated prediction information, aggregate information of these pieces of information, or information determined based on these pieces of information.

As for the provided cyber threat information, analysis information stored in a database in relation to the input file may be used, or the analyzed or predicted information may be included.

According to an embodiment, when a user inquires about not only malicious activity for an input file but also cyber threat information for a previously stored file or malicious activity, information thereon may be provided.

Such integrated analysis information may be stored in a standardized format in a server or database in response to the corresponding file. Such integrated analysis information may be stored in a standardized format and used for searching for or inquiring about cyber threat information.

An additional example of inquiring about the cyber threat information by the user will be described in detail below.

Figure 2:
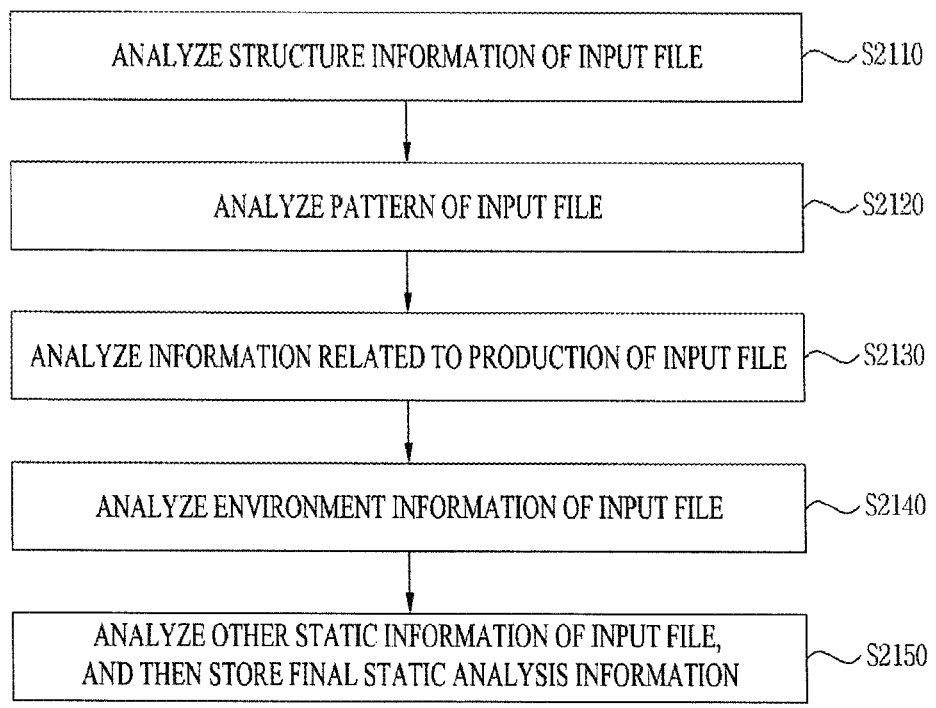
FIG. 2 is a diagram illustrating an example of obtaining static analysis information in a process of generating analysis information according to a disclosed embodiment.

FIG. 2 is a diagram illustrating an example of obtaining static analysis information in a process of generating analysis information according to a disclosed embodiment.

A step of acquiring the static analysis information according to the disclosed embodiment may include obtaining and analyzing structure information of the input file (S2110).

The embodiment may analyze basic structure information of a file identified first in an environment in which the file is not executed. In this step, for example, even when the file type is different, such as executable and linkable format (ELF), portable executable (PE), android application package (APK), etc., the file structure of the file or information that can be extracted from the structure is acquired or analyzed.

In the static analysis exemplified for reference, the file may be identified in the disclosed preprocessing step. In this case, an analysis step of step S210 may be performed together with the preprocessing step.

Then, pattern analysis of the input file may be performed (S2120).

Here, in the case of analyzing the file pattern for the identified file, the file pattern may be obtained by checking several strings that can be extracted by opening the file itself without taking any action on the file.

Information related to production of the input file may be obtained and analyzed (S2130).

The embodiment may obtain unique information or meta information of a file, for example, file creator information, and code signing information in the case of an executable file.

Further, it is possible to analyze environment information of the input file (S2140).

Here, it is possible to obtain information such as system environmental component information that needs to be assigned to a target file.

Then, various types of other information related to the input file are analyzed and stored (S2150). It is possible to store static information of the file itself in a specific file format, for example, in a data format such as JavaScript Object Notation (JSON), without executing such a file.

An example of static analysis is to analyze the file itself, and it is possible to obtain information about whether there is a weak item based on coding, a problem with a call structure of an interface or function, or a binary structure of a file.

An example of analyzing the static information disclosed above is illustrated as a flowchart for convenience. However, the above steps do not have to be performed in the order described above or illustrated in the drawings. In addition, it is unnecessary to perform all the steps disclosed in this drawing according to the file, and some steps, for example, structural information analysis, production-related information analysis, and environmental information analysis, may be selectively performed to obtain static analysis information. That is, the order of implementation and selection of implementation steps therefor may vary according to selection of those skilled in the art.

Examples of acquiring static analysis information according to the disclosed embodiment will be briefly described as follows.

As an example of performing static analysis, when a hash value of an input file is extracted in the preprocessing process, a hash value of an extracted file may be compared with a hash value previously stored for malware to analyze whether the input file has malware. Based on the analysis, it is possible to detect the presence of malware in the file.

When the input file is mobile data, code information of suspicious mobile malware is extracted from the input file. Here, the code information refers to information that can be extracted from the code itself without executing the suspicious mobile malware, and may include, for example, hash information, code size information, file header information, identifiable string information and operating platform information included in the code, etc.

As described above, the static analysis information acquired in this way may be stored to correspond to the file.

Figure 3:
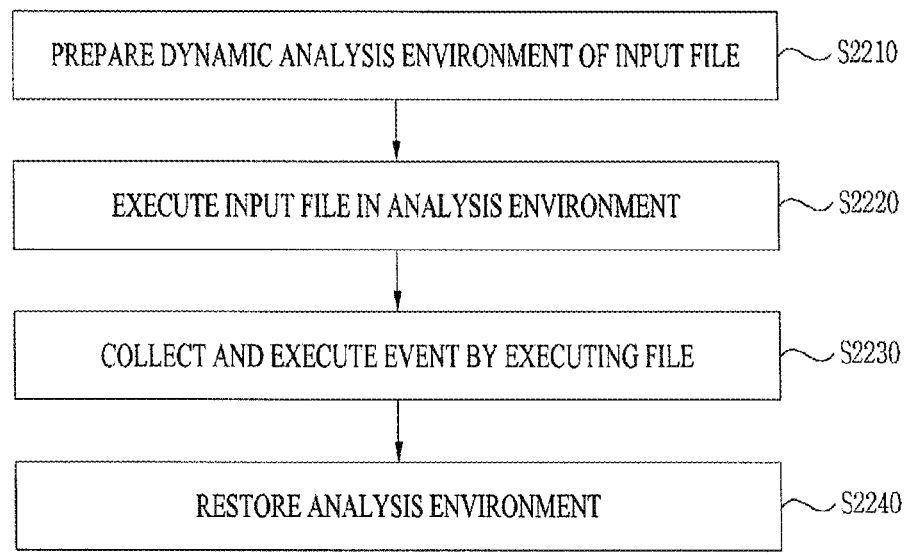
FIG. 3 is a diagram illustrating an example of obtaining dynamic analysis information in a process of generating analysis information according to a disclosed embodiment.

FIG. 3 illustrates an example of obtaining dynamic analysis information in a process of generating analysis information according to a disclosed embodiment.

It is possible to acquire dynamic analysis information according to a result data executed in an execution environment of an identified file based on at least one of file information or static analysis information identified from preprocessing.

A step of acquiring dynamic analysis information according to the disclosed embodiment is a step of analyzing various input/output data in an environment in which a file is running or analyzing a change in interaction with the execution environment when the file is executed to detect a weak or dangerous anomaly. In general, the file is directly executed in a virtualization environment to analyze whether abnormality is present.

In order to perform dynamic analysis, the embodiment creates and prepares a dynamic analysis environment for executing the input file (S2210). When the type of the input file is identified, it is possible to know a required execution environment according to the type of each file. For example, depending on the file, it is possible to identify whether the file is running on a Windows OS, a Linux OS, or a mobile device OS.

In the prepared analysis environment, the acquired file is executed to determine whether malware is present (S2220).

In order to acquire dynamic analysis information, an event occurring in the corresponding system may be collected by executing a file in such an execution environment (S2230). For example, it is possible to collect an event related to a file, a process, a memory, a registry, and a network system, or an event that changes setting of each system. Then, the collected events are analyzed individually or by aggregating the events.

After aggregating the collected results, an environment for dynamic analysis is restored again (S2240).

A result acquired in this way may be stored as dynamic analysis information corresponding to the file.

Hereinafter, an example of collecting and analyzing dynamic analysis information according to an embodiment of acquiring such dynamic analysis information will be briefly described.

As an embodiment of the dynamic analysis, when an input file is identified as a file operating in a mobile device OS, the file is directly executed in a mobile terminal or an emulator or virtualization environment configured to be the same as a mobile terminal environment. Further, after the suspicious mobile malware is executed in the file, all changes occurring in the terminal, that is, activity information, are extracted and recorded. The activity information differs depending on the OS environment of the terminal, and may generally include event information such as a process, a file, a memory, and network information.

As another embodiment of the dynamic analysis, even when the hash value of the input file is not extracted in the preprocessing process and the hash value is extracted from the user terminal, the hash value of the file extracted from the terminal may be received through an intelligence platform.

When the hash value of the file is not previously stored in the database, the received file may be executed in a virtual or real OS, activity occurring during execution may be collected in real time, and collected dynamic analysis information may be compared with information previously stored in the database.

As a result of the comparison, when a predefined risk level is exceeded, it may be determined that the input file includes malware, and the hash value of the file may be stored in a database and used for static analysis later.

Depending on the malware, a first process, which is a subject of activity, may generate dangerous activity in a system. However, depending on the case, the activity of the first process may additionally create a second process, which is a child process, and the second process may perform malicious activity on the system.

In this case, an embodiment of the dynamic analysis may store events occurring due to activity of the initial first process in the execution system, and additionally extract or check the second process, which is a child process, to store an event of malicious activity according to the second process. As such, in this example, the dynamic analysis may determine whether an identified file includes malware by comprehensively analyzing event information of the initial first process and the second and third processes to be connected thereto.

Depending on the execution result of the input file, when there is no unknown malware characteristic, detection is difficult even when characteristics of malware are included. In this case, another embodiment of the dynamic analysis may detect malicious activity of the running process by monitoring and analyzing a network process that communicates with the outside when the identified file is executed.

For example, when the identified file is executed, it is possible to monitor a network event that communicates with the outside. According to file execution, a process ID (Process IDentifier, PID) creating a local address object is stored. In addition, when a network event related to file execution occurs, local address object information may be extracted from interior router protocol (IRP) information of the corresponding network event.

The dynamic analysis may be performed to determine malicious activity by comparing a local address object generated by the process ID with local address objects related to the network event. For example, it is possible to determine whether malicious activity is performed by checking a pattern of packets transmitted and received according to the network event or a command and control (C&C) server that triggers packet transmission.

As another embodiment of the dynamic analysis, it is possible to monitor the address resolution protocol (ARP) information to prevent an ARP spoofing attack. In general, ARP or neighbor discovery protocol (NDP) may be used for correspondence between an IP address and a media access control (MAC) address of a device on a local area network.

When an attacker transmits an IP packet, an ARP spoofing attack is achieved by transmitting an ARP message corresponding to a MAC address thereof, not a MAC address of a receiving network device. A network device receiving the transmitted message transmits a transmission packet to the attacker instead of a normal IP address.

An embodiment determines whether an ARP spoofing attack occurs by comparing ARP information directly collected from network devices to respond to such an attack with ARP information in simple network management protocol (SNMP) information of network devices included in a virtual network.

That is, in an embodiment of the dynamic analysis, first ARP information included in an ARP response message returned by transmitting an ARP information request message to devices connected to a network by a host may be compared with second ARP information included in SNMP information of devices connected to a virtual network, thereby determining that an ARP spoofing attack occurs when the first ARP information and the second ARP information are different from each other.

This embodiment may detect an ARP spoofing attack by using such a dynamic analysis method and prevent leakage of confidential information to be stored in a host device.

Another embodiment of the dynamic analysis method is a method capable of analyzing malware that avoids a virtual environment. Here, a terminal connected to a management server through a network may perform booting using a first OS image stored in the management server. After the terminal is booted and after analyzing the malware based on the first OS, the terminal receives a second OS image from the management server, and performs initialization using the received second OS image. Then, the terminal transmits a signature on which analysis of the malware is completed to the management server. Therefore, even when there is malicious activity issued after analyzing the malware based on the first OS, the management server causes the terminal to delete the first OS from the terminal and allows the terminal to boot based on the second OS identical to the original OS image, so that malicious activity may be prevented from occurring in the terminal.

The malware may communicate with an external server, issue an additional command, and receive a file.

However, when the server capable of performing dynamic analysis is stopped, the dynamic analysis may take a significantly long time, and even when the corresponding activity is blocked in advance, the dynamic analysis cannot be performed in some cases.

In order to analyze network activity through the dynamic analysis, information about a command and control server (C&C server) used by malware, a download server for downloading additional malware, a communication packet for exchanging information between malware or exchanging information with a hacker, etc. needs to be extracted and analyzed. However, such information cannot be extracted when a relevant server is not operating in this way.

Another embodiment of the dynamic analysis method disclosed herein may perform dynamic analysis even when the server is stopped.

For example, the dynamic analysis may be performed by allowing a network access inducing device to process a terminal access request between a client terminal infected with the malware and a management server. The network access inducing device may receive an access request from a terminal and transmit the access request to a C&C server that triggers malware activity. Further, when the network access inducing device does not receive a response packet from the C&C server within a predetermined time, the network access inducing device transmits a separate virtual response packet and an access request together to the terminal.

Thereafter, data related to analysis of the malware received from the terminal may be extracted.

For an example of using the virtual response packet, a packet format for creating a virtual response packet TCP session is sufficient. General transmission control protocol (TCP) used by malware may generate a data packet transmitted by the client terminal to create only a TCP session. In addition, important information necessary for dynamic analysis of malware may be extracted from the data packet. In this way, even when the management server does not operate, dynamic analysis may be performed using the operation of the network access inducing device.

In this way, the embodiment may analyze the event issued by executing the received file and store the dynamic analysis information in the database.

Figure 4:
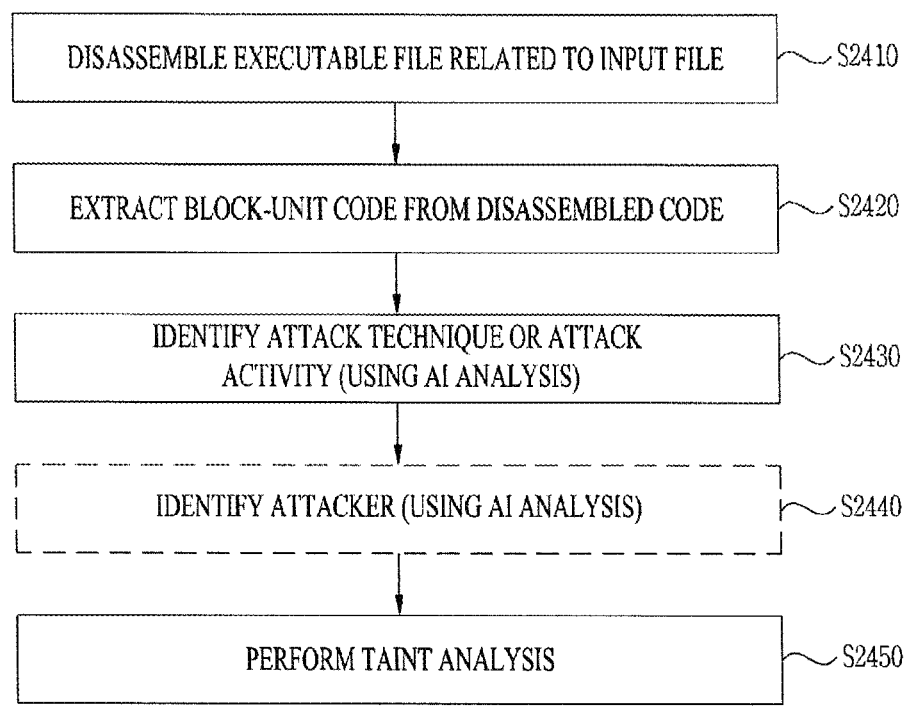
FIG. 4 is a diagram illustrating an example of obtaining in-depth analysis information in a process of generating analysis information according to a disclosed embodiment.

FIG. 4 is a diagram illustrating an example of obtaining in-depth analysis information in a process of generating analysis information according to a disclosed embodiment.

A step of acquiring the in-depth analysis information according to the disclosed embodiment has a characteristic in that an executable file including a received file is disassembled and analyzed at a machine language level to identify an attacker or attack technique causing malicious activity.

The in-depth analysis information may be obtained using a result of the described static analysis or dynamic analysis, and an executable file may be analyzed as a file causing malicious activity according to an analysis criterion of an analyst.

In addition, the in-depth analysis information may include analysis information of the file itself or information obtained by processing the file several times, and may be performed based on previously stored information.

The in-depth analysis may include a step of performing disassembly, extracting disassembled machine language level code, identifying attack activity (Terrorist Tactics, Techniques, and Procedures, hereinafter TTP), identifying an attacker, and taint analysis.

Details are exemplified with reference to the drawings as follows.

When the input file includes an executable file, the executable file is dissembled in in-depth analysis (S2410).

The disassembled assembly code may include operation code (opcode) and an operand. Opcode indicates a machine language command that may be referred to as command code, and an operand indicates information necessary for an execution operation, that is, target data or a memory location of a machine language command.

Hereinafter, for convenience, a part of disassembled assembly code excluding the opcode will be referred to as ASM code. Therefore, hereinafter, the ASM code may include an operand part.

Through disassembly, an executable file in an object code format is converted into code in a specific format, for example, assembly language format or disassembled code. Opcode and ASM code having a predetermined format may be extracted from the disassembled code (S2420).

The extracted disassembled code may be converted into a certain data format. An example of conversion of a certain type of data format is disclosed below.

The in-depth analysis may identify attack activity based on the extracted disassembled code or the data format converted into the predetermined format (S2430).

In the disassembled code, the opcode is a part of a machine language command that specifies an operation to be performed. In terms of cybersecurity, the opcode that causes attack activity or attack technique (TTP) may have a significantly similar value or format for each attack activity. Therefore, by analyzing the opcode and the ASM code, specific attack activity may be distinguished.

Disassembled code may be extracted from an executable file, and the extracted disassembled code may be separated according to an executable function.

For example, the opcode and ASM code extracted from the disassembled code or the recombined code of the disassembled code is a hash value of a fuzzy hashing method, a context triggered piecewise hashing (CTPH) method, etc., and may be converted into a certain type of code.

An embodiment may identify the attack activity by converting the disassembled code of the executable file into a certain format and matching the converted certain format with attack activity details commonly recognized by cybersecurity expert groups.

In addition, it is possible to identify the attack activity (TTP) based on the database storing the previously extracted disassembled code and the matching relation for each attack activity (TTP). In this case, it is possible to perform similarity matching for each attack activity (TTP) with a fuzzy hash value according to a CTPH algorithm of the extracted disassembled code or data obtained by converting the fuzzy hash value into a certain format at high speed.

As an example of a database storing the attack activity of such a security expert group, a database storing information of MITRE ATT&CK, etc. may be exemplified. MITRE ATT&CK is a database on an actual security attack technique or activity, and by displaying specific security attack techniques or activities as components in a matrix format, attack techniques and activities may be identified in a specific data set format.

MITRE ATT&CK classifies content of attack techniques of hackers or malware for each attack stage and expresses the content as a matrix of common vulnerabilities and exposures (CVE) code.

The embodiment identifies specific attack activity among various attack activities by analyzing the disassembled code, and allows an identified type of attack activity to be matched with attack code recognized by expert groups and actually performed, so that attack activity identification may be expressed by professional and commonly recognized elements.

Since the opcode in the disassembled code is a machine language command that causes specific activity, opcode of files causing the same attack activity may be significantly similar to each other. However, since the same attack activity and the opcode included in the file causing the attack activity are not exactly the same, the embodiment may perform AI-based machine learning on the disassembled code including the opcode. When machine learning is performed, whether attack code having a similarity greater than or equal to a threshold value is included and an attack technique of the attack code may be identified.

Accordingly, even when the disassembled code of the files causing the same malicious activity is not completely the same, the file performing the malicious activity may be identified based on the disassembled code.

Algorithms such as perceptron, logistic regression, support vector machines, and multilayer perceptron may be used as machine learning algorithms.

By matching the similarity of the fuzzy hash values of the disassembled code with the attack code of the attack technique such as MITRE ATT&CK previously learned using an AI algorithm, it is possible to finally detect malware.

In addition, in the embodiment, when a result of AI machine learning is used, it is possible to more accurately and rapidly identify attack activity corresponding to the disassembled code or vulnerable elements of the attack activity.

Specific embodiments thereof will be described in detail below with reference to the drawings.

An embodiment of the in-depth analysis may include a step of identifying an attacker causing similar attack activity using the disassembled code and the AI-based machine learning result (S2440). Similarly, a specific example of attacker identification will be described later.

In addition, an embodiment of the in-depth analysis may include taint analysis capable of determining whether there is attack activity through memory analysis of the system at a specific point in time even in the case of fileless malware. (S2450).

The in-depth analysis is based on processing the disassembled code of the executable file, and identification of the attack technique or attacker, or taint analysis accordingly may be selectively performed.

The final in-depth analysis information performed in this way may be stored in the database as in-depth analysis information corresponding to the file.

FIG. 5 illustrates an example of disassembling malware to determine that a file includes malicious activity as an example of the in-depth analysis.

As described above, when the executable file is disassembled, opcode and ASM code, which are assembly language code types, may be obtained.

For example, a specific function A in an EXE executable file may be converted into disassembled code including opcode or disassembled code through a disassembler.

When the EXE executable file is malware causing malicious activity, disassembled code set causing the malicious activity may be obtained by disassembling a function or code segment that causes such activity.

The disassembled code set may include opcode set or a set combining opcode and ASM code corresponding to the malicious activity or malware.

Even when the malicious activity is the same, since a disassembly result of the executable file or an algorithm of the malware causing the activity to be performed is not exactly the same, whether the input malware corresponds to a specific disassembled code set may be identified through AI-based similarity analysis.

This malicious activity corresponding to a specific disassembled code set may be used to identify an attack technique (TTP) by being matched with a professional and public tactic or attack technique such as MITRE ATT&CK.

Alternatively, an opcode set or a set combining opcode and ASM code in a specific disassembled code may be used to determine an attack technique by being matched with the attack technique elements defined in MITRE ATT&CK.

This figure illustrates an example in which the executable file, the disassembled code set of the executable file, and the attack technique corresponding to the attack technique elements in the MITRE ATT&CK correspond to each other.

Figure 6:
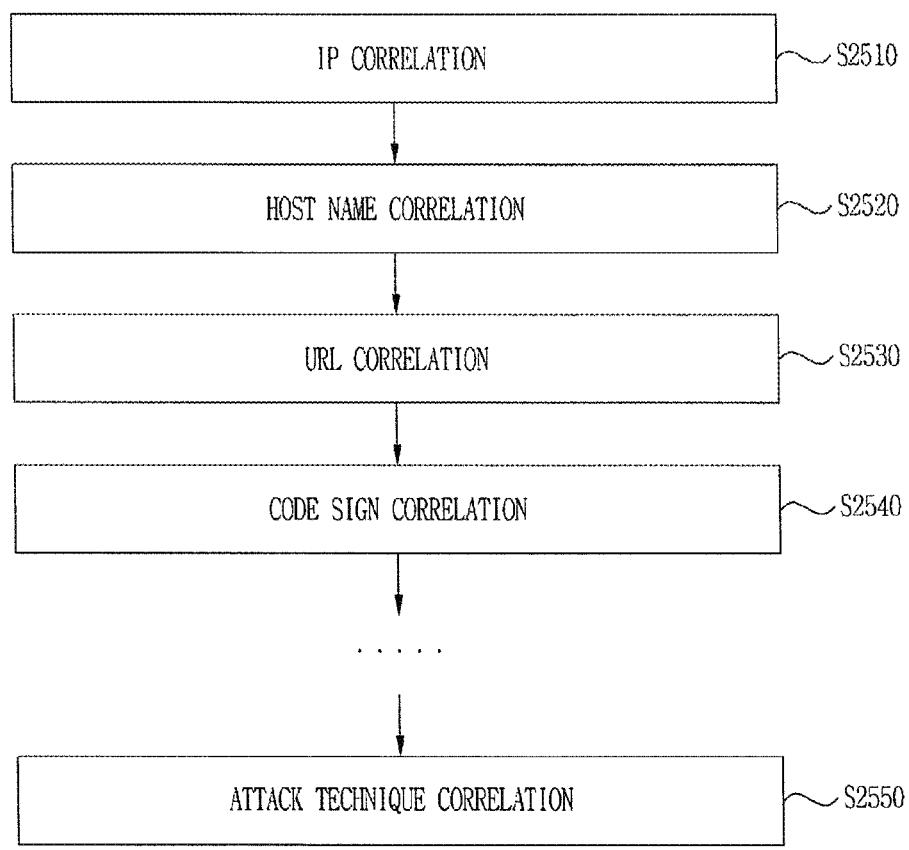
FIG. 6 is a diagram illustrating an example of calculating correlation analysis information in a process of generating analysis information according to a disclosed embodiment.

FIG. 6 illustrates an example of calculating correlation analysis information in a process of generating analysis information according to a disclosed embodiment.

The various types of analysis information obtained above may be used as cyber threat infringement information, and correlation analysis information indicating a relationship of an attacker or an attack technique is generated based on the cyber threat infringement information.

The cyber threat infringement information (IoC) refers to various pieces of information that identify an actual or potential cybersecurity threat, attack activity, or malicious activity occurring on a system or network. For example, the cyber threat infringement information (IoC) represents a file indicating these activities, various traces appearing in log information, the file itself, a path, or information for inferring these activities.

Using the previously analyzed static, dynamic, and in-depth analysis information, etc., and identified files, it is possible to obtain a correlation of IP information between analysis information and attack activity (S2510), a correlation of a host name included in an e-mail or a host name included in a website (S2520), a correlation of a URL (S2530), and a correlation of a code sign of a file (S2540).

The process of acquiring the correlation analysis information exemplified here is an example, and it may be unnecessary to follow the illustrated order or analyze all correlations. For example, by using only the correlation of IP and URL between the analysis information and the attack activity, it is possible to obtain the correlation for the related file. Such correlation analysis information may be used to accurately infer an attack technique or an attacker.

Even when the attack activity or the attacker is not identified through static analysis, dynamic analysis, or in-depth analysis, information for estimating the attack activity and the attacker may be obtained using a correlation between pieces of the analyzed information. A detailed description thereof will be given below with reference to the drawings.

Such correlation analysis information may be continuously and cumulatively stored for a received file, and the stored correlation analysis information may be updated again whenever a new file is received in the future.

Based on the various types of analysis information analyzed above, cyber threat infringement information is obtained.

In addition, various types of correlation information for identifying attack activity or an attacker may be obtained using the cyber threat infringement information (IoC) (S2550).

Such cyber threat infringement information (IoC) may be used to obtain correlation analysis information for inferring an attack technique later. The correlation analysis and an example in which an attacker may be tracked or attack activity may be inferred by using the correlation analysis will be described in detail below.

Further, the obtained correlation analysis information may be stored in the server or database again to correspond to the file.

As described above, the analyzed information may be aggregated and standardized through de-duplication, standardization, and enrichment processes. For example, static analysis information, dynamic analysis information, in-depth analysis information, and correlation analysis information may be provided to a user or stored in a standardized format to update or reproduce cyber threat information later.

Here, for overlapping or common analysis information of each piece of analysis information, an overlap may be removed, and an enrichment operation for an insufficient part of the data may be performed.

In addition, the information may be provided as cyber threat information according to an inquiry of a user or according to a service policy. Provision of cyber threat information will be described in detail below.

Such cyber threat information may be directly provided to the user or may be generated as cyber threat prediction information described below and then provided according to a request of the user or a service.

Figure 7:
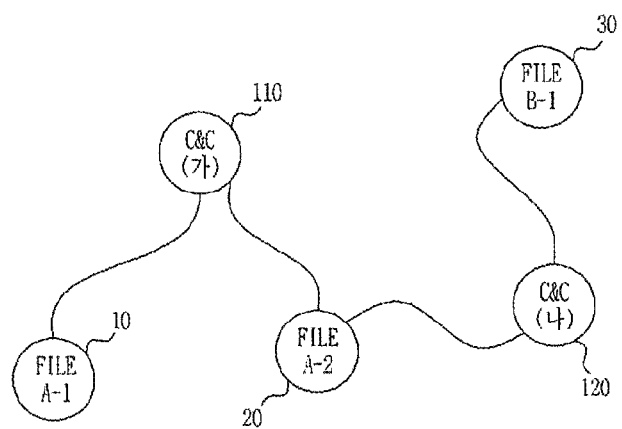
FIG. 7 is a diagram illustrating an example of a process of obtaining correlation analysis information according to a disclosed embodiment.

FIG. 7 is a diagram illustrating an example of a process of obtaining correlation analysis information according to a disclosed embodiment.

In this figure, files A-1 10, A-2 20, and B-1 30 refer to files that may cause malicious activity, and a server A 110 and a server B 120 refer to C&C servers that cause malicious activity.

According to the disclosed embodiment, when a file of the file A-1 10 is received and dynamic analysis is performed, it is assumed that accessing the server A 110 is confirmed during execution of the file A-1 10.

In the embodiment, stored analysis information of the file A-2 20 similar to the file A-1 10 may be obtained from a database storing various types of analysis information on the malware. From the analysis information of file A-2 20, it may be understood that the same server, server A 110, utilizes the file A-1 10 and the file A-2 20, and from this information, it may be assumed that the server A 110 is a hacker using the same attack technique or the same server.

According to the embodiment, when the file A-2 20, which is a previously analyzed file, accesses not only the server A 110 but also the server B 120, information of the server B 120 may be stored as a correlation of the file A-2 20.

When the file A-1 10 and the file A-2 20 are completely different files, and analysis information of the file B-1 30 stores a record of accessing the server B 120, even though file formats are different, the server A 110 and the server B 120 may be the same attacker group or attacker groups using the same technique.

Therefore, when a correlation of various types of analysis information related to a file is analyzed in this way, it is possible to obtain grouping information related to an attacker, an attack technique, etc. causing malicious activity, and such correlation analysis information may be used to identify an attacker or an attacker group.

Hereinafter, an example of describing cyber threat prediction information will be disclosed.

Cyber threat prediction information may be generated using at least one piece of information among pieces of obtained analysis information and identification information of a file or based on an aggregated data set.

Figure 8:
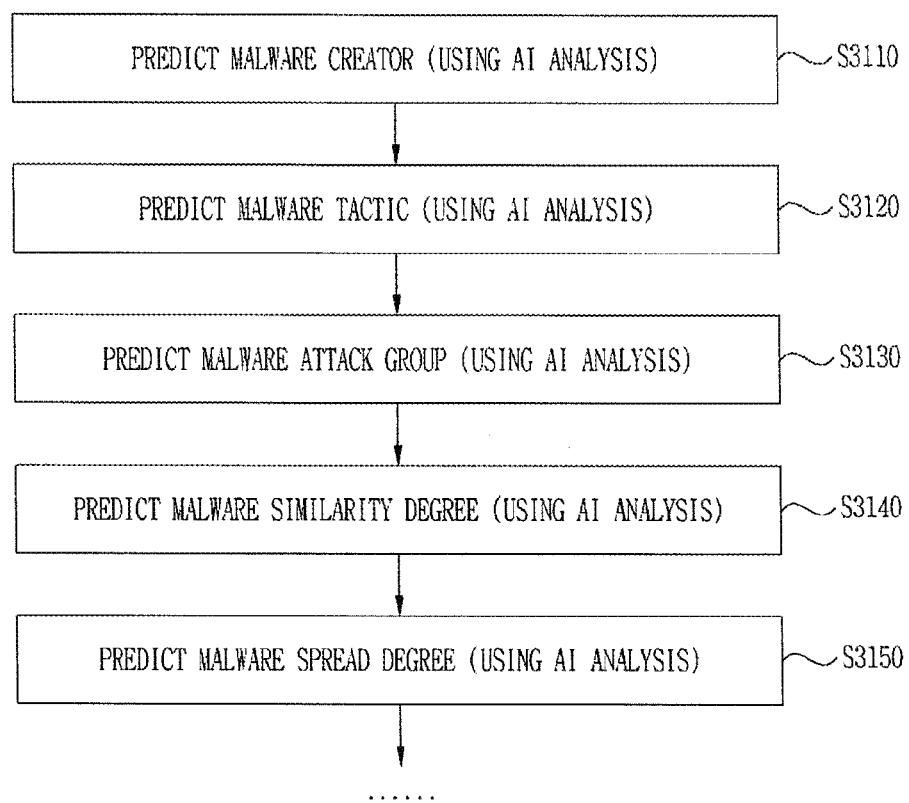
FIG. 8 is a diagram illustrating an example of generating prediction information of cyber threat information according to an embodiment.

FIG. 8 illustrates an example of generating prediction information of cyber threat information according to an embodiment. An example of generating prediction information of cyber threat information will be described as follows with reference to the drawings.

When a data set for analysis information is ensured, prediction information related to attack activity occurring in the future may be generated based on the data set.

When the data set according to the analysis information extracted in this way is processed into an AI-based training data set, and AI analysis is performed based on the processed training data set, it is possible to generate various types of prediction information related to attack activity.

The data set of the prediction information generated in this way may be repeatedly generated or processed into a new training data set.

An embodiment of this figure discloses an example of generating prediction information of malware creator (S3110), prediction information of malware tactic (S3120), prediction information of a malware attack group (S3130), malware similarity prediction information (S3140), malware spread degree prediction information (S3150), etc. through AI learning of the data set of the analysis information.

Here, the order of the prediction information is an example, and the order of obtaining the prediction information may be changed. For example, the order of the malware similarity prediction information S3140 and the malware spread degree prediction information S3150 may be changed, and generation of the remaining prediction information does not have to follow the illustrated order.

In addition to the exemplified similarity prediction information, it is possible to generate additional prediction information related to cyber threat information.

The prediction information of the malware generated in this way may be divided into risk level prediction information for predicting a risk level thereof, and prediction information for predicting each of an attacker, an attack group, a similarity, a spread degree, etc. or comprehensive prediction information of malware comprehensively indicating the prediction information, and stored in a database.

When the analysis information and the prediction information of the cyber threat information described above are used, it is possible to identify a type of malware related to an input file and determine a risk level therefor.

In addition, profiling information including a record of malware related to the input file may be created and stored, and analysis information, prediction information, a risk level, or profiling information related to the stored malware may be further processed so that the user may easily refer to the information.

An example of providing cyber threat information to a user is disclosed as follows.

Since various types of correlation analysis information may be generated based on a specific file, a very large amount of data communication may be required for cyber threat infringement information (IoC). An embodiment may share, store, refer to, and update such information within a short time in order to rapidly respond to cybersecurity threats.

Based on the analysis information, in an embodiment, when a security event occurs, inquiry about the cyber threat infringement information (IoC) related to the generated security event may be requested using P2P socket communication from a cyber threat infringement information (IoC) storage server or other user terminals through encrypted socket communication. In addition, information rapidly receiving the cyber threat infringement information (IoC) from the cyber threat infringement information (IoC) storage server or other user terminals may be used as the cyber threat infringement information (IoC).

As another example of providing cyber threat information, when information on the malware analyzed as described above is referred to from a terminal used by a user, the referred information may be provided as follows.

For example, when the terminal used by the user calculates a hash value of a file, a query may be transmitted to a server to inquire about whether malware is present in text format with respect to the calculated hash value. The server receiving the hash value and the query transmits the hash value to the database in which malware information is stored in this way, and receives an inquiry result. The server receiving the inquiry result may return a result thereof back to the user terminal as a text value corresponding to the hash value.

Another example of providing cyber threat information according to a request of the user based on stored malware information will be described with reference to the drawings.

FIG. 9 illustrates examples of malware queries for providing cyber threat information according to an embodiment.

In an embodiment of processing cyber threat information, the malware identified based on the analysis information and prediction information calculated as above may be stored together with various types of meta information.

As described above, a user may request an inquiry exemplified above from the database in which malware information is stored.

Referring to Query (A), the user may query a database, in which the cyber threat information according to the embodiment is stored, about malware using categories such as a period related to the malware, the number of specific malware, a detection name, a file type, a distribution site, a code sign, and a file size as in Query (A).

Then, the database in which the cyber threat information is stored returns cyber threat information or malware information corresponding to the query through the server.

As another example, as illustrated in Query (B) of this figure, the user may inquire about a specific date related to malware, the number of specific malware, a file type, whether a distribution site is present, whether to create a child process, etc.

As illustrated in Query (C), the user may inquire about information about malware using information about a period related to the malware, the number of specific malware, a file type, distribution site information, file name information, attack activity according to malware execution, and a file size.

In an example of Query (D), it is possible to inquire about information about malware using a period related to the malware, the number of specific malware, a file type, a distribution site address, and statistical information of the malware.

As described above, in the embodiment of the cyber threat information processing method, as the analysis information and the prediction information, information meeting the above conditions is stored together with the malware in the database in order to provide malware information corresponding to inquiry of the user.

Therefore, the server may obtain information about the malware meeting the query condition from the database and transmit the information to the user.

As illustrated, the user may inquire about the malware information using various types of meta information of the file. The user may obtain, in advance, information indicating that information or a system to be protected may be damaged or threatened by malware.

FIG. 10 is a diagram illustrating an embodiment of a cyber threat information processing apparatus. The embodiment of this figure conceptually illustrates the cyber threat information processing apparatus, and the embodiment of the cyber threat information processing apparatus will be described below with reference to this figure.

The disclosed cyber threat information processing apparatus includes a server 2100 and a database 2200, which are physical devices 2000, and a platform 10000 including an API running on the physical devices 2000. Hereinafter, the platform 10000 is referred to as a cyber threat intelligence platform (CTIP) or simply an intelligence platform 10000.

The server 2100 may include an arithmetic unit such as a central processing unit (CPU) or a processor, and may store or read data in the database 2200.

The server 2100 calculates and processes input security-related data, and executes a file to generate various security events and process related data. In addition, the server 2100 may control input/output of various cybersecurity-related data and store data processed by the intelligence platform 10000 in the database 2200.

The server 2100 may include a network device for data input or a network security device. The central processing unit, processor, or arithmetic unit of the server 2100 may execute a framework illustrated in the following drawings or a module within the framework.

The intelligence platform 10000 according to an embodiment provides an API for processing cyber threat information. For example, the intelligence platform 10000 may receive a file or data input from a network security device connected to a network or cyber malicious activity prevention programming software that scans for and detects malicious activity.

For example, the intelligence platform 10000 according to the embodiment may provide functions such as a security information and event management (SIEM) API that provides a security event, an environmental data retrieval (EDR) API that provides data about an execution environment, and a firewall API that monitors and controls network traffic according to a defined security policy. In addition, the intelligence platform 10000 may provide a function of an API of intrusion prevention systems (IPS) that perform a function similar to that of a firewall between internal and external networks.

An API 1100 of the intelligence platform 10000 according to an embodiment may receive files including malware that perform cybersecurity attack activities from various client devices 1010, 1020, and 1030.

The intelligence platform 10000 according to an embodiment may include a preprocessor (not illustrated), an analysis framework 1210, a prediction framework 1220, an AI engine 1230, and a postprocessor (not illustrated).

The preprocessor of the intelligence platform 10000 performs preprocessing to analyze cyber threat information on various files received from the client devices 1010, 1020, and 1030.

For example, the preprocessor may process a received file to obtain various types of meta information from the received file, including source information of the file, collection information for obtaining the file, and user information of the file. For example, when the file includes a URL or is included in an e-mail, it is possible to obtain collection information for the file. The user information may include information about a user generating, uploading, or finally saving the file, etc. In a preprocessing process, as meta information of the file, it is possible to obtain IP information, country information based thereon, API key information, etc.

The preprocessor (not illustrated) of the intelligence platform 10000 may extract a hash value of the input file. When the hash value is previously known to the cyber threat information processing apparatus, the file type may be identified based thereon.

When the file is not previously known, analysis information for identifying the file type may be obtained by inquiring about the hash value and file information from reference Internet sites for cyber threat information such as operating C-TAS, an operating system of CTA, and Virus Total.

As described above, the hash value of the input file may be a hash value of a hash function such as MD5, SHA1, or SHA 256.

The analysis framework 1210 may generate analysis information on the malware from the input file.

The analysis framework 1210 may include an analysis module according to various analysis methods, such as a static analysis module 1211, a dynamic analysis module 1213, an in-depth analysis module 1215, and a correlation analysis module 1217.

The static analysis module 1211 may analyze malware-related information on the file itself for the analysis information of the malicious activity related to the input file.

The dynamic analysis module 1213 may analyze malware-related information by performing various activities based on various types of information obtained from the input file.

The in-depth analysis module 1215 may analyze malware-related information by using information obtained by processing an executable file related to the input file or by performing memory analysis related to an executable file. The in-depth analysis module 1215 may include AI analysis to accurately identify malicious activity.

The correlation analysis module 1217 may include correlation analysis information capable of estimating a correlation with attack activity or an attacker by correlating the previously stored analysis information or the generated analysis information in relation to the input file.

The analysis framework 1210 may mutually combine the information analyzed from the static analysis module 1211, the dynamic analysis module 1213, the in-depth analysis module 1215, and the correlation analysis module 1217 with analysis results for the characteristics and activities of the malware, and provide the combined final information to the user.

For example, the analysis framework 1210 may perform integrated analysis of static analysis information, dynamic analysis information, in-depth analysis information, correlation analysis information, etc. for a single file to accurately identify the attack technique and attacker. The analysis framework 1210 removes an overlap between pieces of analysis information and uses information common to pieces of analysis information to increase accuracy.

The analysis framework 1210 may standardize the information provided, for example, by normalizing or enriching cyber threat infringement information (IoC) collected through various analyses and paths. In addition, it is possible to generate analysis information on the final standardized malware or malicious activity.

The static analysis module 1211, the dynamic analysis module 1213, the in-depth analysis module 1215, and the correlation analysis module 1217 of the analysis framework 1210 may perform machine learning or deep learning techniques according to AI analysis on analysis target data to increase accuracy of the analyzed data.

The AI engine 1230 may perform an AI analysis algorithm to generate analysis information of the analysis framework 1210.

Such information may be stored in the database 2200, and the server 2100 may provide analysis information on malware or malicious activity stored in the database 2200 as cyber threat intelligence information according to a user or client request.

The prediction framework 1220 may include a plurality of prediction information generation modules according to prediction information, such as a first prediction information generation module 1221 and a second prediction information generation module 1223. The prediction framework 1220 may generate prediction information about whether malicious activity occurs, an attack technique, an attacker group, etc. by using the data set of the various types of information analyzed above in order to increase analysis accuracy.

The prediction framework 1220 may generate prediction information for malicious activity related to the input file by performing an AI analysis algorithm using the AI engine 1230 based on the data set for the analysis information analyzed by the analysis framework 1210.

The AI engine 1230 generates additional analysis information by learning the data set for the analysis information through AI-based machine learning, and the additionally generated analysis information may be used again as AI input data as new training data.

The prediction information generated by the prediction framework 1220 may include malware creator information, malware tactic information, malware attack group prediction, malware similarity prediction information, and malware spread degree prediction information.

As described above, the prediction framework 1220 generating prediction information related to various malware or attack activities may store the generated prediction information in the database 2200. In addition, the generated predicted information may be provided to the user according to a user request or attack symptom.

As described above, the server 2100 may provide the cyber threat information related to the input file after post-processing the analysis information or prediction information stored in the database 2200.

The processor of the server 2100 determines the type of malware and the risk level of the malware based on the generated analysis information or prediction information.

The processor of the server 2100 may generate profiling information about the malware. The database 2200 may store a result of performing self-analysis on a file through file analysis or a result of performing additional and predictive analysis.

The cyber threat information provided to the user by the server 2100 may include information on which the preprocessing is performed, generated or identified analysis information, generated prediction information, aggregate information of these pieces of information, or information determined based on these pieces of information.

As for the provided cyber threat information, analysis information stored in a database in relation to the input file may be used, or the analyzed or predicted information may be included.

According to an embodiment, when a user inquires about not only malicious activity for an input file but also cyber threat information for a previously stored file or malicious activity, information thereon may be provided.

Such integrated analysis information may be stored in a standardized format in a server or database in response to the corresponding file. Such integrated analysis information may be stored in a standardized format and used for searching for or inquiring about cyber threat information.

Figure 11:
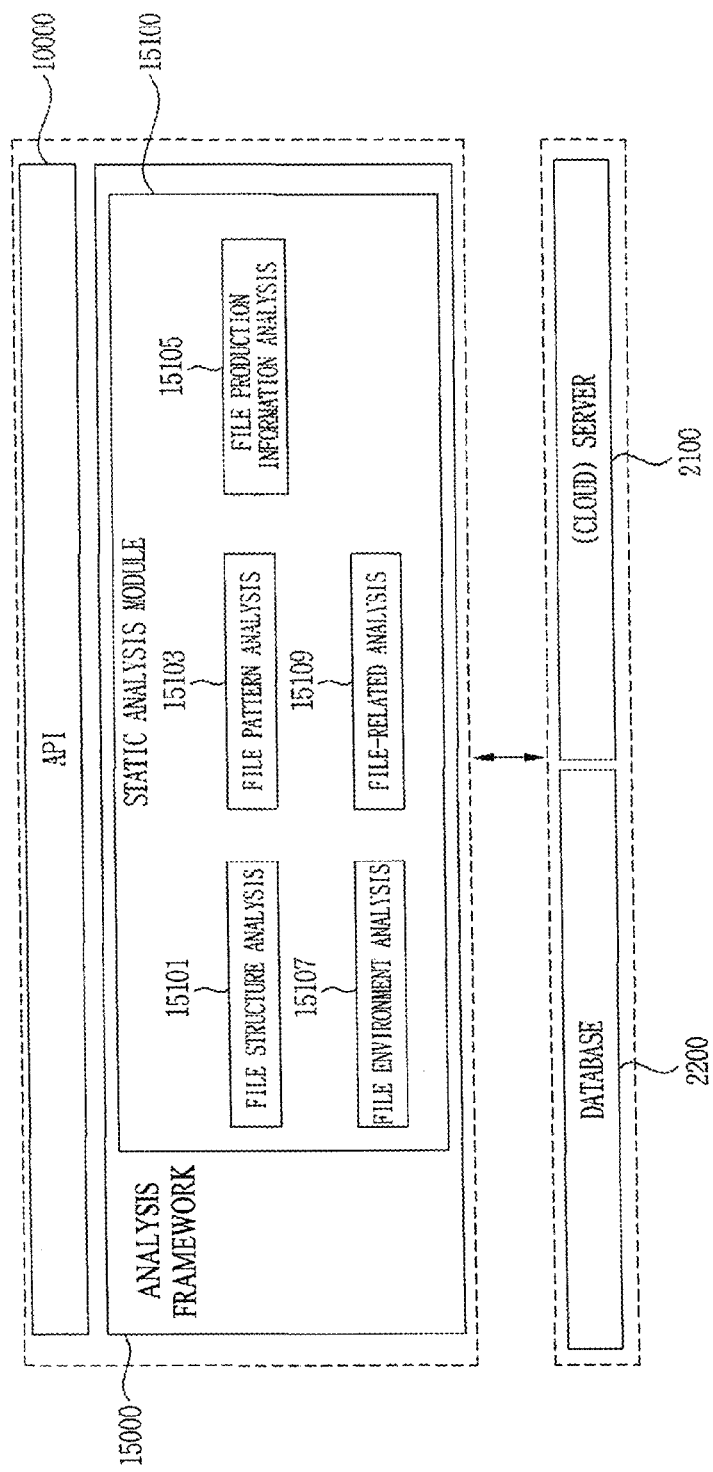
FIG. 11 is a diagram illustrating an example for describing in detail a function of a static analysis module in an analysis framework according to a disclosed embodiment.

FIG. 11 illustrates an example for describing in detail a function of the static analysis module in the analysis framework according to a disclosed embodiment. An example of an execution process of the static analysis module is illustrated as follows with reference to this figure.

As disclosed, the analysis framework 15000 of the intelligence platform 100 may include a static analysis module 15100.

The static analysis module 15100 may analyze the file itself, and it is possible to obtain information that may be related to malicious activity in relation to the file, such as information about whether there is a weak item based on coding, a problem with a call structure of an interface or function, or a binary structure of a file, based on the file or meta information of the file.

The static analysis module 15100 includes a file structure analysis module 15101, a file pattern analysis module 15103, a file production information analysis module 15105, a file environment analysis module 15107, and a file-related analysis module 15109.

The file structure analysis module 15101 in the static analysis module 15100 may analyze basic structure information of the identified file in an environment in which the file is not executed.

For example, even when the file type is different, such as ELF, PE, APK, etc., the file structure analysis module 15101 acquires or analyzes the file structure of the file or information that can be extracted from the structure.

The file pattern analysis module 15103 may perform pattern analysis of the file, and may open the file itself to check several strings, etc. that can be extracted, thereby obtaining a file pattern without taking any action on the identified file.

The file production information analysis module 15105 may obtain and analyze information related to production of the input file. The file production information analysis module 15105 may obtain unique information or meta information of the file, for example, file creator information, and code signing information in the case of an executable file.

The file environment analysis module 15107 may analyze environment information of the input file. The file environment analysis module 15107 may obtain information such as system environmental component information that needs to be assigned to a target file.

The file-related analysis module 15109 may analyze various types of other meta information related to the input file.

The static analysis module 15100 may convert the static information of the file itself obtained and analyzed as disclosed into a data format such as JSON without executing the input file and store the information in the database 2200.

The server 2100 may provide static analysis information on a file stored in the database 2200 to the user.

The static analysis module 15100 of the analysis framework 15000 may compare the hash value of the input file with a hash value previously stored for the malware in the database 2200 to determine whether the input file is malware. In addition, the analyzed information on the malware of the input file may be stored in the database 2200.

When the input file is mobile data, the static analysis module 15100 of the analysis framework 15000 may extract code information of the suspicious mobile malware from the input file. The code information of the suspicious malware may include hash information, code size information, file header information, identifiable string information included in the code, operating platform information, etc.

The static analysis module 15100 of the analysis framework 15000 may detect whether there is malware in the file based on the analyzed analysis information. In addition, static analysis information related to the detected malware may be stored in the database 2200.

Figure 12:
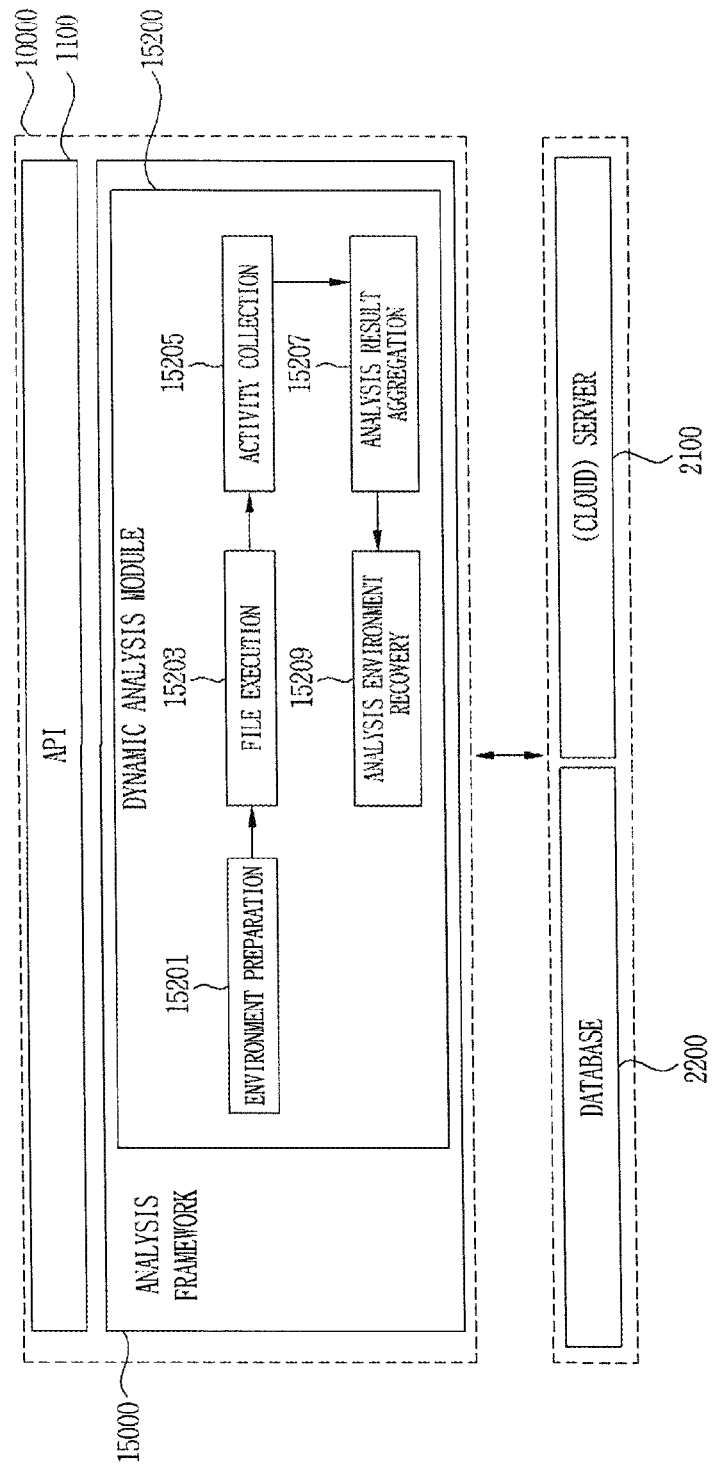
FIG. 12 is a diagram illustrating an example for describing in detail a function of a dynamic analysis module in the analysis framework according to a disclosed embodiment.

FIG. 12 illustrates an example for describing in detail a function of the dynamic analysis module in the analysis framework according to a disclosed embodiment. An example of an execution process of the dynamic analysis module is illustrated as follows with reference to this figure.

The analysis framework 15000 of the illustrated intelligence platform 10000 may include a dynamic analysis module 15200. The dynamic analysis module 15200 may acquire dynamic analysis information according to result data executed in an execution environment of a file identified based on at least one of preprocessed file information or static analysis information.

The dynamic analysis module 15200 may detect a weak or dangerous anomaly by analyzing various input/output data in the environment in which the file is being executed or by analyzing a change in interaction with the execution environment when the file is executed. The dynamic analysis module 15200 may analyze whether there is an abnormality by creating a virtual environment, etc. and directly executing a file in the created virtual environment.

The dynamic analysis module 15200 of the analysis framework 15000 may include an environment preparation module 15201, a file execution module 15203, an activity collection module 15205, an analysis result aggregation module 15207, and an analysis environment recovery module 15209.

The environment preparation module 15201 creates and prepares a dynamic analysis environment for executing an executable file related to an input file. When the type of the execution file is identified, the environment preparation module 15201 may identify a required execution environment according to the type of each file. For example, depending on the file, it is possible to identify whether the file is running on a Windows operating system, a Linux operating system, or a mobile device operating system. The environment preparation module 15201 may prepare the identified environment to execute the executable file.

The file execution module 15203 executes the file to determine whether the executable file includes malware in an analysis environment prepared by the environment preparation module 15201.

The activity collection module 15205 may collect events occurring in the system during execution of a file executed in the execution environment in order to acquire dynamic analysis information. For example, the activity collection module 15205 may collect an event for a file itself, a process, a memory, a registry, and a system of a network, or an event for changing setting of each system.

The analysis result aggregation module 15207 analyzes the events collected by the activity collection module 15205 individually or by aggregating the events.

The analysis environment recovery module 15209 restores the environment for dynamic analysis after aggregating the collected results.

The dynamic analysis module 15200 may store the obtained result in the database 2200 as dynamic analysis information corresponding to the corresponding file or malware of the file.

An example in which the dynamic analysis module 15200 collects and analyzes dynamic analysis information according to the embodiment is briefly described as follows.

As an embodiment of the dynamic analysis, when the input file is identified as a file operating in the mobile device operating system, the dynamic analysis module 15200 may create an emulator or virtualization environment configured to be the same as a mobile terminal or mobile terminal environment. In addition, the dynamic analysis module 15200 may directly execute the file in the created emulator or virtualized environment. The dynamic analysis module 15200 may extract and record all changes that occur in the terminal after the suspicious mobile malware is executed in the file, that is, activity information. The activity information may include event information such as process, file, memory, and network information even when the OS environment of the terminal is different.

As another embodiment of the dynamic analysis, even when the hash value of the input file is not extracted in the preprocessing process and is extracted from the user terminal, the dynamic analysis module 15200 may receive the hash value of the file extracted from the terminal through the intelligence platform 10000.

When the hash value of the file is not previously stored in the database 2200, the dynamic analysis module 15200 may execute the received file in a virtual or real operating system, collect activities that occur during execution in real time, and compare collected dynamic analysis information with information previously stored in the database 2200.

When a predefined risk level is exceeded as a result of comparison, it may be determined that the input file includes malware, and the dynamic analysis module 15200 may store a hash value of the file corresponding to the malware in the database 2200. The stored malicious hash value can be used for static analysis later.

The malware may communicate with an external server, issue additional commands, and receive files.

However, when the platform and server capable of performing dynamic analysis are suspended, such dynamic analysis may take a significantly long time, and when the corresponding activity is blocked in advance, dynamic analysis cannot be performed in some cases.

When analyzing network activity, the dynamic analysis module 15200 according to an embodiment may extract and analyze information about a C&C server used by the malware, a download server for downloading additional malware, or a communication packet for exchanging information between malware or exchanging information with a hacker.

The dynamic analysis module 15200 disclosed herein may perform dynamic analysis even when operation of the server 2100 is suspended.

For example, a network access inducing device (not illustrated) may process a terminal access request between a client terminal infected with malware and the intelligence platform 10000 or the server 2100 to perform dynamic analysis.

The network access inducing device (not illustrated) may receive an access request from the terminal and transmit the request to a C&C server that causes malware activity.

Further, when the network access inducing device fails to receive a response packet from the C&C server within a predetermined time, the network access inducing device transmits a separate virtual response packet and an access request together to the terminal.

Thereafter, data related to analysis of the malware received from the terminal may be extracted.

For an example of using the virtual response packet, a packet format for creating a virtual response packet TCP session is sufficient. General TCP used by malware may generate a data packet transmitted by the client terminal to create only a TCP session. In addition, important information necessary for dynamic analysis of the malware may be extracted from the data packet. In this way, even when the management server does not operate, dynamic analysis may be performed using the operation of the network connection inducing device.

Figure 13:
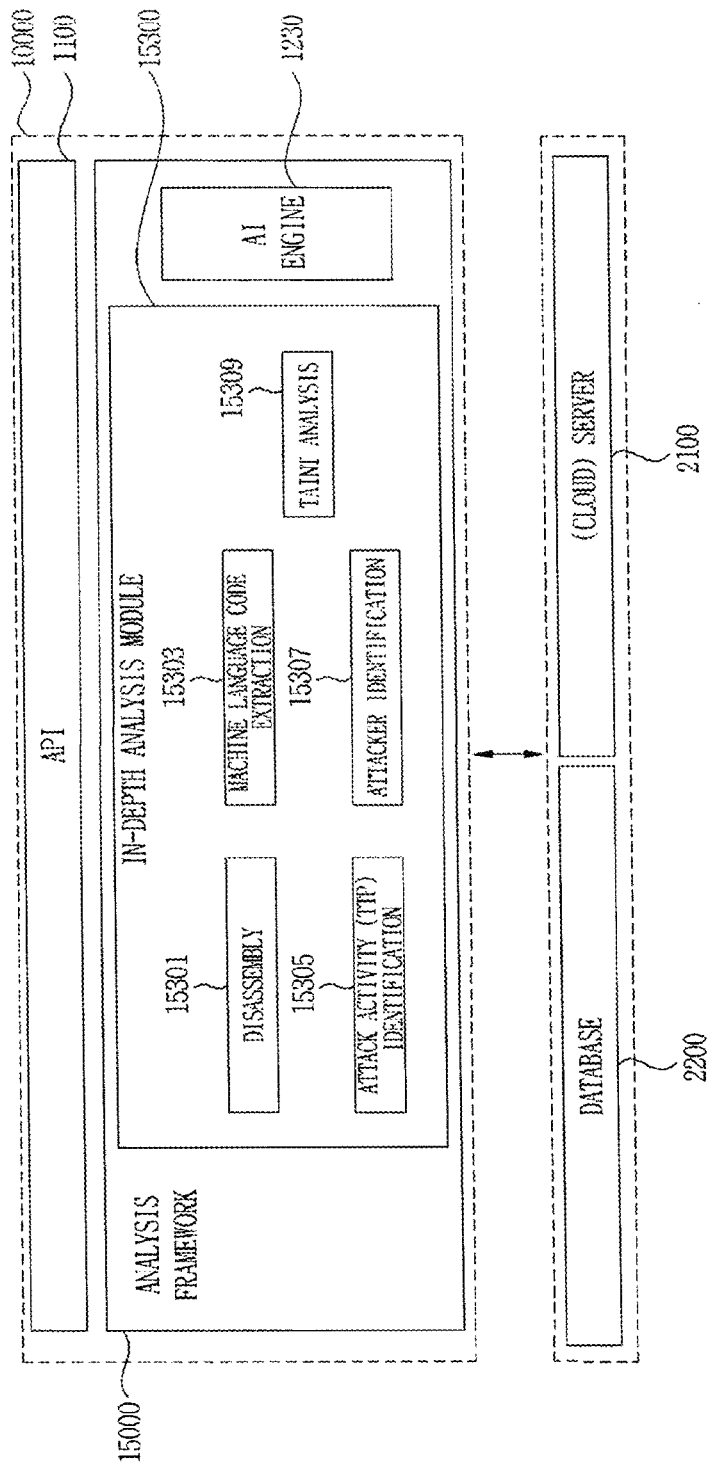
FIG. 13 is a diagram illustrating an example for describing in detail a function of an in-depth analysis module in the analysis framework according to a disclosed embodiment.

FIG. 13 illustrates an example for describing in detail a function of the in-depth analysis module in the analysis framework according to a disclosed embodiment. An example of an execution process of the in-depth analysis module is illustrated as follows with reference to this figure.

The analysis framework 15000 of the intelligence platform 10000 may include an in-depth analysis module 15300. The in-depth analysis module 15300 may disassemble an executable file including a received file to analyze the file at a machine language level, thereby identifying an attack technique or attacker that causes malicious activity.

The in-depth analysis module 15300 may obtain in-depth analysis information based on the described static analysis or dynamic analysis, or may analyze an executable file using a file that causes malicious activity according to an analysis criterion of an analyst.

The in-depth analysis module 15300 may include analysis information of the file itself or information obtained by processing the file several times, and may generate in-depth analysis information based on previously stored information.

In addition, the in-depth analysis module 15300 may include a disassembly module 15301, a machine language code extraction module 15303, an attack activity (TTP) identification module 15305, an attacker identification module 15307, and a taint analysis module 15309.

In the analysis framework 15000, the in-depth analysis module 15300 may use the AI engine 1230 to perform an AI-based machine learning algorithm, and obtain in-depth analysis information as a result.

The disassembly module 15301 disassembles an executable file when the input file includes the executable file.

When the executable file is disassembled, the executable file is converted into code in a specific format such as an object code format, for example, assembly language format.

The machine language code extraction module 15303 may extract disassembled code including opcode and ASM code having a certain format. The opcode having the certain format refers to an opcode segment related to the malware, and the disassembled code including the extracted opcode refers to a segment related to the malware or malicious activity.

The machine language code extraction module 15303 may convert the disassembled code into a data format having a certain format. An example of conversion into the data format having the certain format is disclosed below.

The attack activity may be identified by matching the disassembled code of the executable file with attack activity details commonly recognized by cybersecurity expert groups.

The attack activity (TTP) identification module 15305 may identify attack activity, an attack technique, and an attack process based on the extracted disassembled code or data of a format converted into a certain format.

The attack activity (TTP) identification module 15305 may identify attack activity by matching a fuzzy hash value based on the disassembled code of the executable file with attack activity details commonly recognized by cybersecurity expert groups.

The attack activity (TTP) identification module 15305 may identify the attack activity (TTP) based on the database 2200 or an external reference database that stores a matching relationship for each attack activity (TTP) with previously extracted disassembled code. The attack activity (TTP) identification module 15305 may use machine learning of the AI engine 1230 to perform similarity matching for each attack activity (TTP) with a fuzzy hash value of a CTPH algorithm, etc. of the extracted disassembled code at high speed, thereby classifying attack activity or attack technique.

The opcode in the disassembled code is part of the machine language command that specifies an operation to be performed, and the disassembled code including the opcode that causes an attack technique or attack activity (TTP) in terms of cybersecurity may have a significantly similar value or format for each attack activity. Therefore, by analyzing the disassembled code, which is a combination of the opcode and the ASM code, a specific type of attack activity may be distinguished.

For example, the attack activity (TTP) identification module 15305 may convert disassembled code extracted from an executable file into a hash value of a fuzzy hashing method or a CTPH method.

Algorithms such as perceptron, logistic regression, support vector machines, multilayer perceptron, etc. may be used as machine learning algorithms of the AI engine 1230 performed together with the attack activity (TTP) identification module 15305. In addition, an ensemble machine learning algorithm or a natural language processing algorithm may be used as the AI engine 1230. Examples thereof are disclosed in detail below.

As an example of a database that stores attack activity of a group of security experts, MITRE ATT&CK is a database for actual security attack technique or activity. The attack activity (TTP) identification module 15305 may identify a hash value converted from the disassembled code including the extracted opcode in a certain data set format or identifier on a MITRE ATT&CK database.

MITRE ATT&CK expresses vulnerable factors for the attack technique of the malware or the hacker as a matrix of CVE code.

The embodiment identifies specific attack activity among various attack activities by analyzing the disassembled code, and allows an identified type of attack activity to be matched with attack activity elements recognized by expert groups, so that attack activity identification may be expressed by professional and commonly recognized elements.

As described above, since the opcode is a machine language command that causes specific activity, disassembled code of files causing the same attack activity may be significantly similar. However, since the attack activity and the disassembled code of the file that causes the attack activity do not exactly match, there may be some differences in the code.

The attack activity (TTP) identification module 15305 allows the AI engine 1230 to perform machine learning on code converted from the extracted disassembled code into a certain format. Therefore, even when the opcode of the files that cause the same malicious activity are not exactly the same, the attack activity (TTP) identification module 15305 may identify attack activity, etc. by matching the fuzzy hash value based on machine learning and the extracted opcode and an attack element corresponding thereto.

The attack activity (TTP) identification module 15305 may match the similarity of disassembled code to an attack technique such as MITRE ATT&CK using an AI algorithm to finally detect that the file is malware.

A specific example thereof will be described later.

The attacker identification module 15307 may include a step of identifying an attacker causing similar attack activity using the extracted disassembled code and an AI-based machine learning result. Similarly, a specific example of attacker identification will be described later.

The taint analysis module 15309 may determine whether there is attack activity through memory analysis of the system at a specific point in time even in the case of fileless malware.

The in-depth analysis module 15300 may store in-depth analysis information corresponding to a corresponding file or malware identified from the file in the database 2200.

Figure 14:
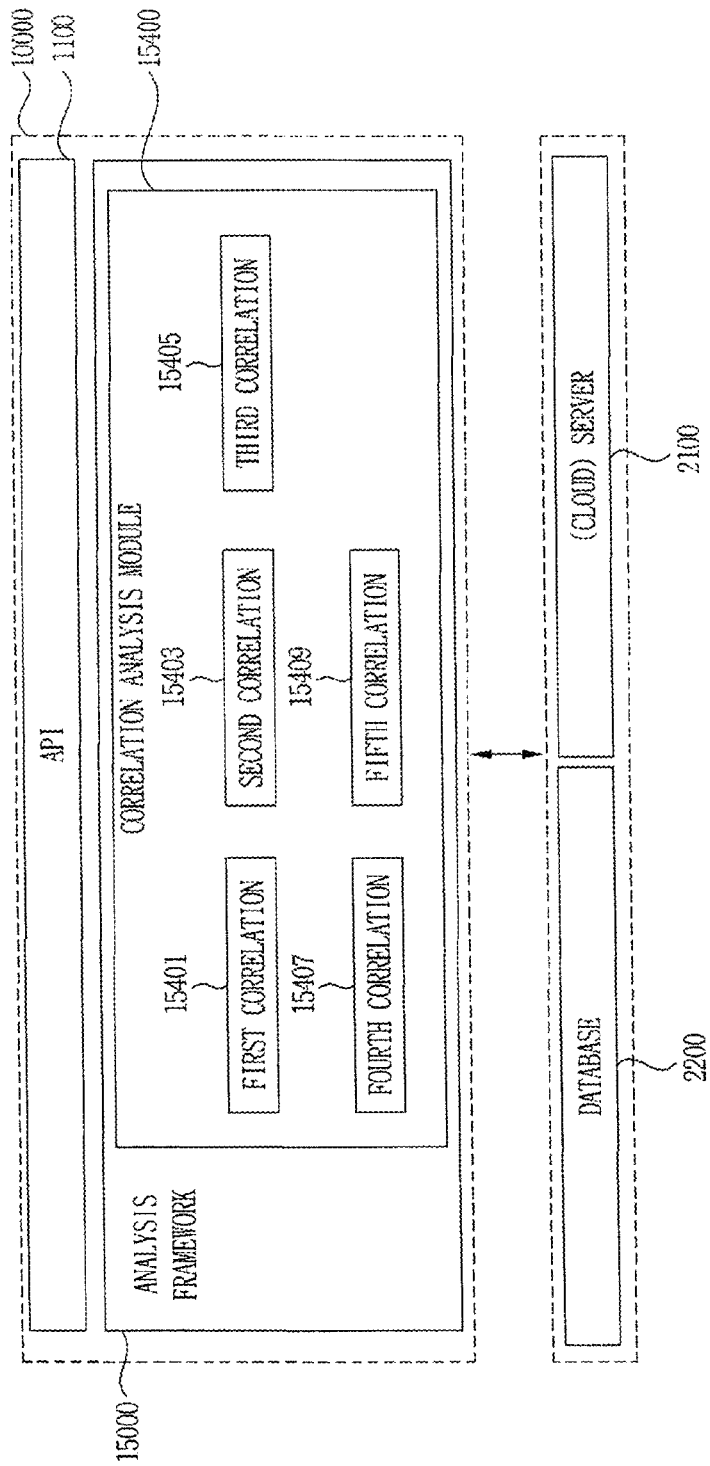
FIG. 14 is a diagram illustrating an example for describing in detail a function of a correlation analysis module in the analysis framework according to a disclosed embodiment.

FIG. 14 illustrates an example for describing in detail a function of the correlation analysis module in the analysis framework according to a disclosed embodiment. An example of an execution process of the correlation analysis module is illustrated as follows with reference to this figure.

The analysis framework 15000 of the intelligence platform 10000 may include a correlation analysis module 15400. The correlation analysis module 15400 generates correlation analysis information so that various types of analysis information analyzed by the analysis framework 15000 are expressed as correlations between the information and an attacker or attack technique based on cyber threat infringement information (IoC).

The correlation analysis module 15400 may include a first correlation analysis module 15401 that analyzes a correlation of IP information between analysis information and attack activity, a second correlation analysis module 15403 that analyzes a correlation of host names included in an e-mail or included in a website, a third correlation analysis module 15405 that analyzes a correlation of URLs, a fourth correlation analysis module 15407 that analyzes a correlation of code signs of a file, a fifth correlation analysis module 15407 that analyzes a correlation between attack techniques, etc.

The modules illustrated in this figure are only examples, and even when not illustrated in this figure, the correlation analysis module 15400 may include modules that may analyze various correlations between pieces of information analyzed to determine an attack technique and an attacker. For example, the correlation analysis module 15400 may include an integrated analysis module that aggregates or integrates the generated correlation information.

The correlation analysis module 15400 may generate correlation analysis information used to accurately infer an attack technique or an attacker.

The correlation analysis module 15400 continuously and accumulatively stores analysis information for a received file or malware, updates related correlation analysis information again whenever a new file or malware is analyzed later, and stores the correlation analysis information in the database 2220.

The correlation analysis module 15400 may obtain cyber threat infringement information based on various types of analysis information (static analysis information, dynamic analysis information, in-depth analysis information, etc.) analyzed above.

The correlation analysis module 15400 may obtain various types of correlation information capable of identifying attack activity or an attacker using cyber threat infringement information (IoC), and store the analyzed correlation analysis information in the database 2200.

As disclosed above, the analysis framework 15000 of the intelligence platform 10000 may synthesize the analyzed information, and store, in the database 2220, standardized information through de-duplication, standardization, and enrichment processes.

The intelligence platform 10000 may store static analysis information, dynamic analysis information, in-depth analysis information, and correlation analysis information in the database 2200 in a standardized format to update or reproduce cyber threat information.

Here, the intelligence platform 10000 may remove an overlap of duplicate or common analysis information of each piece of analysis information, and may perform an enrichment operation of an insufficient part of the data.

The intelligence platform 10000 may store standardized information through post-processing in a format such as STIX or TAXII, which are standards designed to prevent cyberattacks.

The server 2100 may provide standardized cyber threat information such as analysis information generated by the analysis framework 15000 according to an inquiry of the user or a service policy. A method of providing cyber threat information will be described in detail below.

Such cyber threat information may be provided according to a request of the user or a service.

Figure 15:
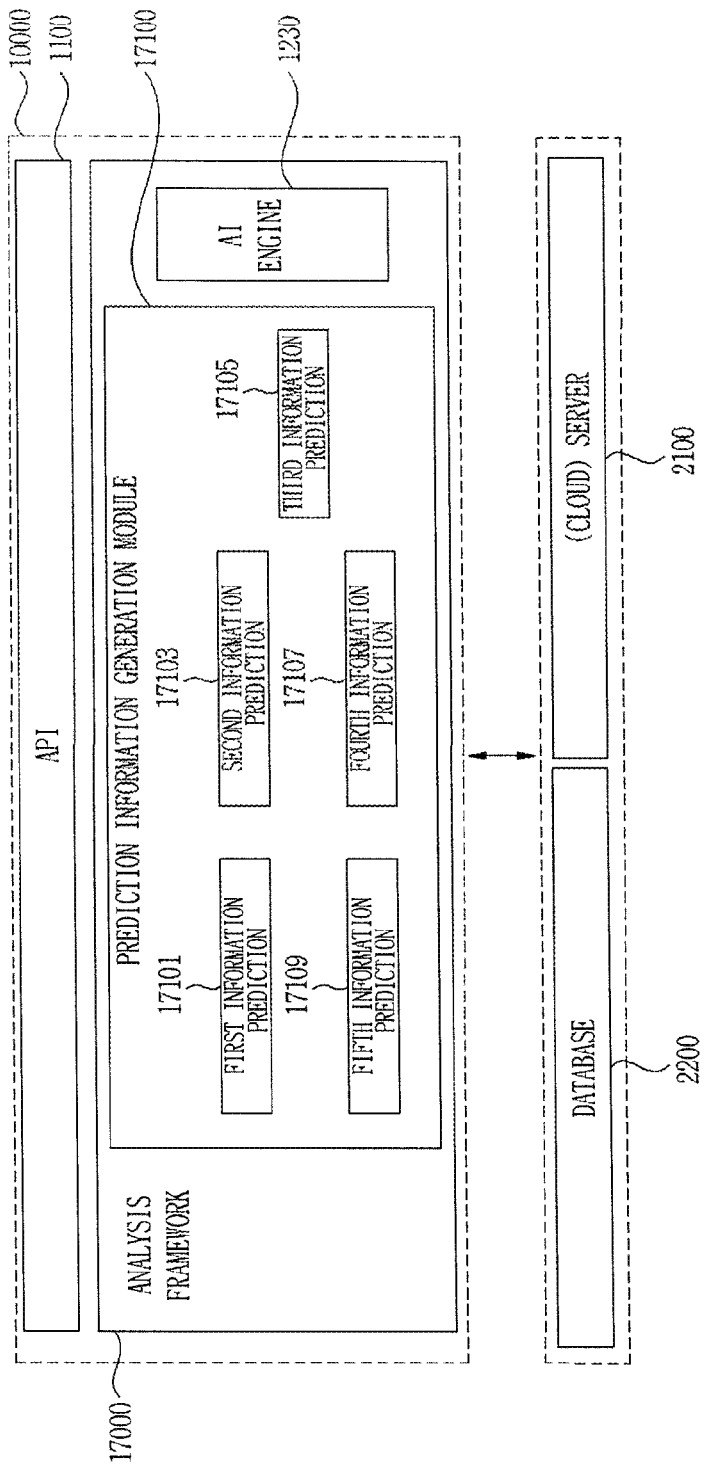
FIG. 15 is a diagram illustrating an example for describing in detail a function of a prediction information generation module of a prediction framework according to a disclosed embodiment.

FIG. 15 illustrates an example for describing in detail a function of a prediction information generation module of a prediction framework according to a disclosed embodiment. An example of an execution process of the prediction framework is illustrated as follows with reference to this figure.

A prediction framework 17000 of the illustrated intelligence platform 10000 may include a prediction information generation module 17100. The prediction information generation module 17100 may include a plurality of information prediction modules according to the generated prediction information. In this example, an example in which the prediction information generation module 17100 includes a first information prediction module 1711, a second information prediction module 1713, a third information prediction module 1715, a fourth information prediction module 1717, and a fifth information prediction module 1719 is illustrated.

The prediction framework 17000 may use analysis information generated by the previously exemplified analysis framework (not illustrated). The prediction framework 17000 may process a data set according to various types of analysis information into an AI-based training data set, and the AI engine 1230 may perform AI analysis based on the processed training data set.

Through execution of the prediction framework 17000 and the AI engine 1230, various types of prediction information related to the attack activity may be generated.

In this example, the first information prediction module 1711 may generate prediction information of a malware creator through AI learning. The second information prediction module 1713 may generate prediction information of malware tactic, and the third information prediction module 1715 may generate prediction information of a malware attack group. Further, an example in which the fourth information prediction module 1717 generates malware similarity prediction information, and the fifth information prediction module 1719 generates malware spread degree prediction information is illustrated.

An example of generation of specific prediction information will be described later.

The prediction framework 17000 may store the generated prediction information in the database 2200.

For example, the prediction framework 17000 may generate malware risk level prediction information that predicts a risk of specific malware, and store the generated information in the database 2200.

In addition, the prediction framework 17000 may store prediction information of a producer, a tactic, an attack group, similarity, and a spread degree of specific malware in the database 2200.

As disclosed, the intelligence platform 1000 may generate malware type and a risk level of the malware based on analysis information or prediction information. In addition, the intelligence platform 10000 may generate profiling information for the malware.

The intelligence platform 10000 may store, in the database 2200, a result of performing self-analysis on a file through file analysis or a result of performing additional and predictive analysis.

The cyber threat information provided by the intelligence platform 10000 may include information obtained by preprocessing the information, generated analysis information, generated prediction information, aggregated information of these pieces of information, or information processed after being added based on these pieces of information.

Therefore, the provided cyber threat information may include integrated analysis information related to the input file.

The integrated analysis information provided by the exemplified intelligence platform 10000 may be stored in a standardized format in the database 2200 by the server 2100 in response to an input file. Such integrated analysis information may be stored in a standardized format and used for searching or inquiring about cyber threat information.

Hereinafter, detailed embodiments according to each processing step or module are disclosed.

Figure 16:
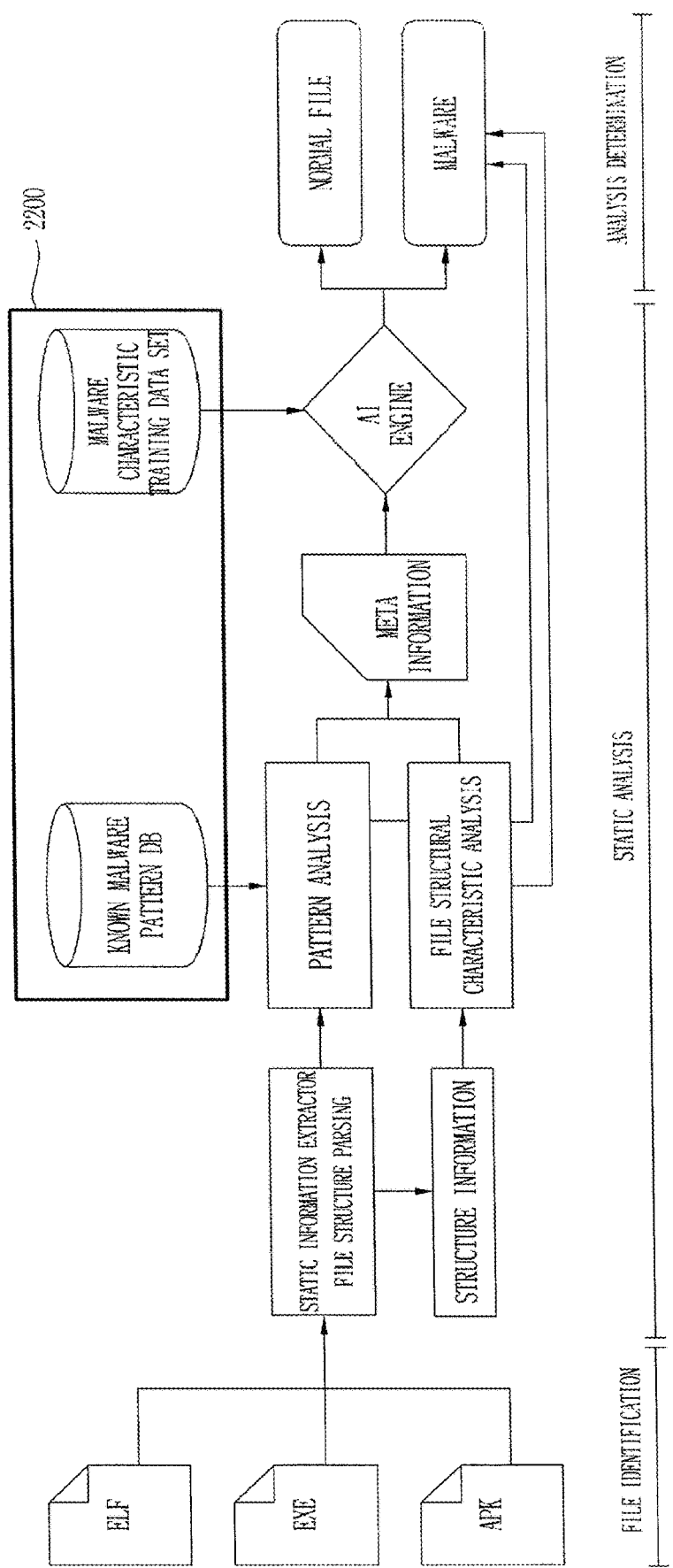
FIG. 16 is a diagram illustrating an example of performing static analysis according to a disclosed embodiment.

FIG. 16 illustrates an example of performing static analysis according to a disclosed embodiment. An example of a static analysis method according to an embodiment will be described with reference to the drawings.

As described, the type of file may be identified in a preprocessing step before performing static analysis or in an initial step of static analysis. This figure illustrates the case in which ELF, EXE, and ARK files are identified as types of files for convenience. However, application of the embodiment is not limited thereto.

Static analysis or detection of malware may be performed based on a process of comparing the characteristics of the file itself with a previously identified pattern database.

A static information extractor may obtain structure information by parsing a structure of the input file.

A pattern in the structure of the parsed file may be compared with a pattern of malware previously stored in the database (DB) 2200.

The structure characteristics and patterns of the parsed file may be meta information of the parsed file.

Although not illustrated in the example disclosed above, a machine learning engine may be used in the static analysis of the disclosed embodiment. The database 2200 may store a data set including the learned characteristics of the previously stored malware.

The AI engine may learn meta information obtained from the parsed file through machine learning, and compare the meta information with a data set previously stored in the database 2200 to determine whether the file is malware.

Structural characteristics of a file analyzed as malware through static analysis may be saved again as a data set related to the malware.

Figure 17:
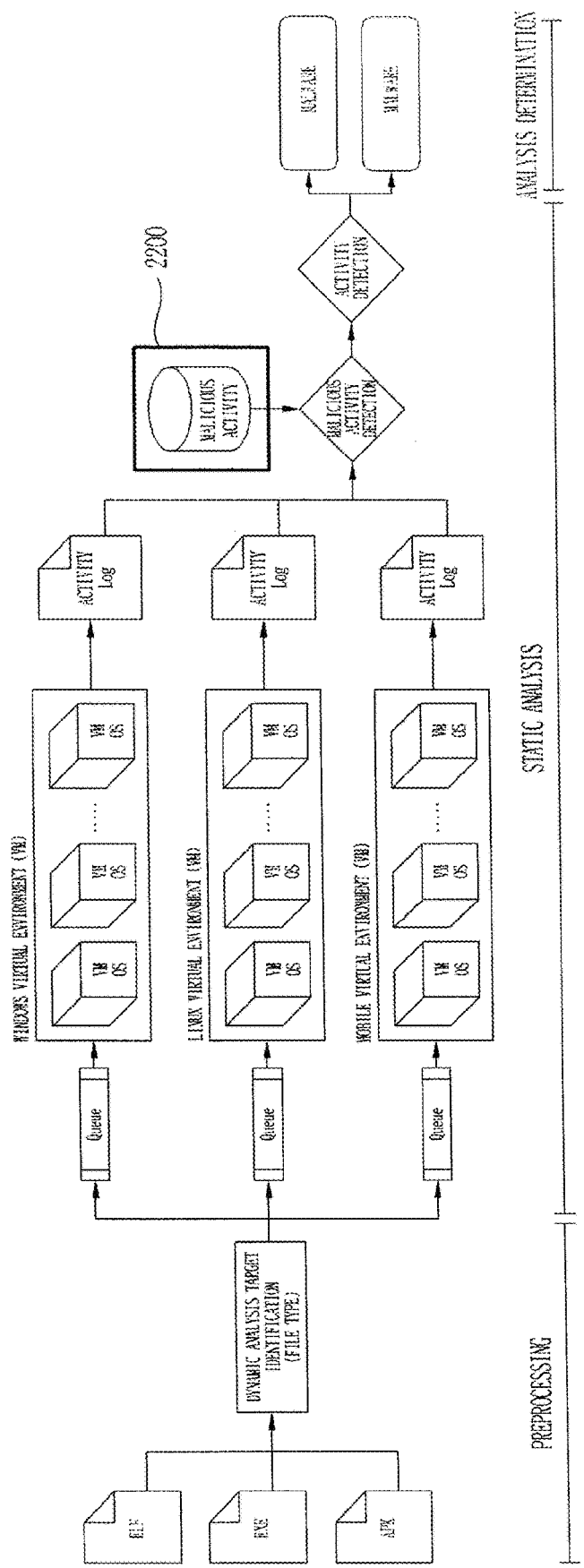
FIG. 17 is a diagram illustrating an example of performing dynamic analysis according to a disclosed embodiment.

FIG. 17 illustrates an example of performing dynamic analysis according to a disclosed embodiment. An example of a dynamic analysis method according to an embodiment will be described with reference to the drawings.

As described, the type of file may be identified in a preprocessing step before performing dynamic analysis or in an initial step of the dynamic analysis. Similarly, in this example, the case where ELF, EXE, and ARK files are identified as types of files is illustrated for convenience.

Through preprocessing, a type of file subjected to dynamic analysis may be identified. The identified file may be executed in a virtual environment according to a sort and type of each file.

For example, when the identified file is an ELF file, the file may be executed in an operating system of a Linux virtual environment (virtual machine, VM) through a queue.

An event that occurs when the ELF file is executed may be recorded in an activity log.

In this way, Windows, Linux, and mobile operating systems are virtually built for each type of identification file, and then an execution event of a virtual system is recorded.

In addition, execution events of the malware previously stored in the database 2200 may be compared with recorded execution events. Although not illustrated above, in the case of dynamic analysis, execution events recorded through machine learning may be learned, and it may be determined whether the learned data is similar to execution events of previously stored malware.

In the case of dynamic analysis, a virtual environment needs to be constructed according to the file, which can increase the size of the analysis and detection system.

Figure 18:
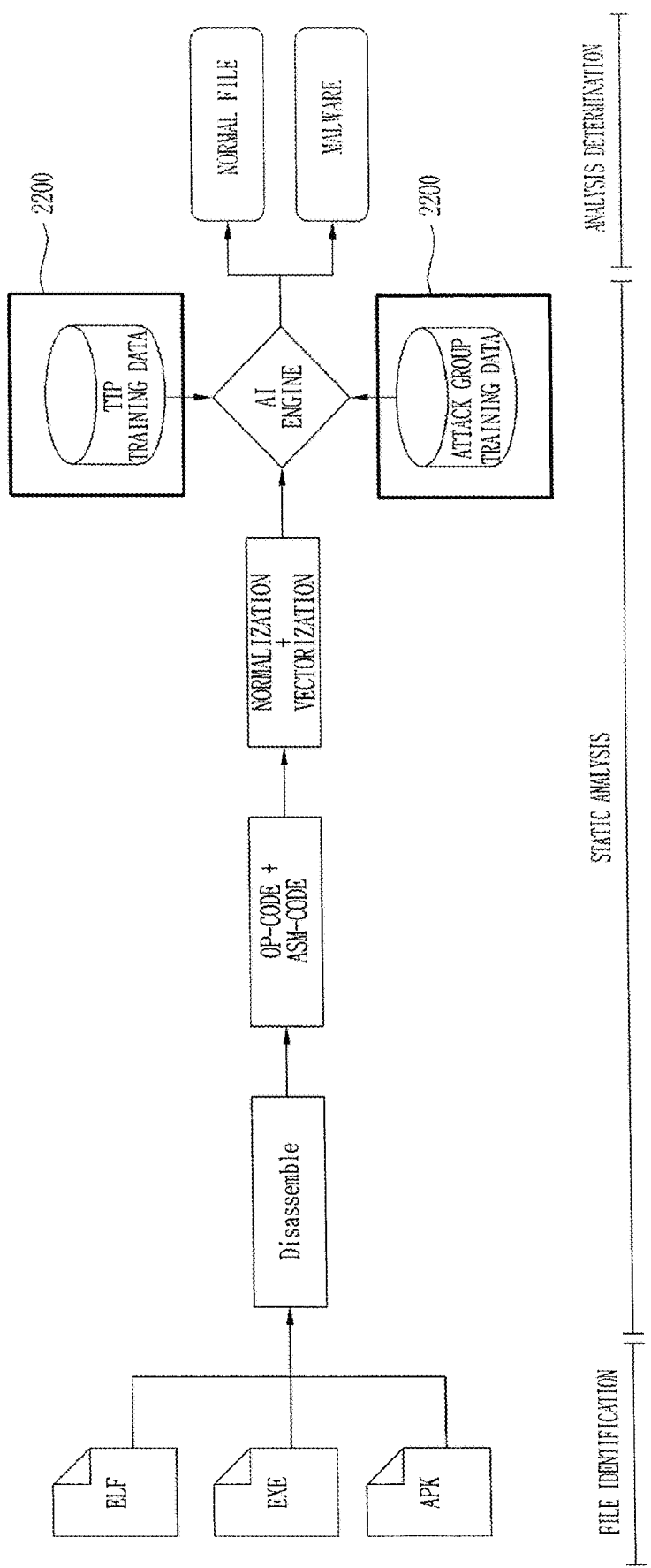
FIG. 18 is a diagram illustrating an example of performing in-depth analysis according to a disclosed embodiment.

FIG. 18 illustrates an example of performing in-depth analysis according to a disclosed embodiment. An example of an in-depth analysis method according to an embodiment will be described as follows with reference to the drawings.

As described, the type of file may be identified in a preprocessing step before performing in-depth analysis or in an initial step of the in-depth analysis. The disclosed example illustrates that identified files are executable binary files of ELF, EXE, and ARK.

When the executable binary file is disassembled, a structure of functions in an instruction set of the CPU may be analyzed.

Unlike dynamic analysis, in-depth analysis operates based on the code extracted by disassembling the binary file, and thus it is possible to analyze the system scale relatively simply. In addition, in-depth analysis may perform AI analysis based on data created through a process of normalizing extracted code without a separate engine.

In this figure, the disassembled code is expressed as a combination of the opcode and the ASM code.

The embodiment may combine two code based on the opcode and the ASM code, and extract a meaningful code block from the combined code.

The code block of the disassembled code, including the opcode and the ASM code, may convert a certain format to identify whether the code is related to malware, a type of malware, or an attacker developing the code.

There are several processes for a data conversion method of the code block to perform determination thereon. The data conversion process of the disassembled code may be selectively applied according to the data processing speed and accuracy. However, only a normalization process and a vectorization process are illustrated in this figure.

The normalization process and the vectorization process may be performed on the extracted code block of the combined code of the opcode and the ASM code.

In other words, after extracting a code block using a combination of the opcode and the ASM code of the binary code, and vectorizing characteristic information of this code block, attack activity, etc. is identified through comparison with data learned through various types of characteristic information.

Since the code blocks extracted as described above may all be different even for the same executable file, the embodiment may use machine learning or an AI method such that the extracted code block is determined and classified as malware.

Further, in the embodiment, final data on which the normalization and vectorization processes are performed is learned through AI. The learned data may be compared with data of an attack technique (TTP), an attacker, or an attack group previously stored in the database 2200 to obtain information such as whether or not there is malware.

The embodiment may classify and distinguish a component, which is a core part of malware, based on an MITRE ATT&CK model.

A specific embodiment thereof is disclosed in more detail below.

Figure 19:
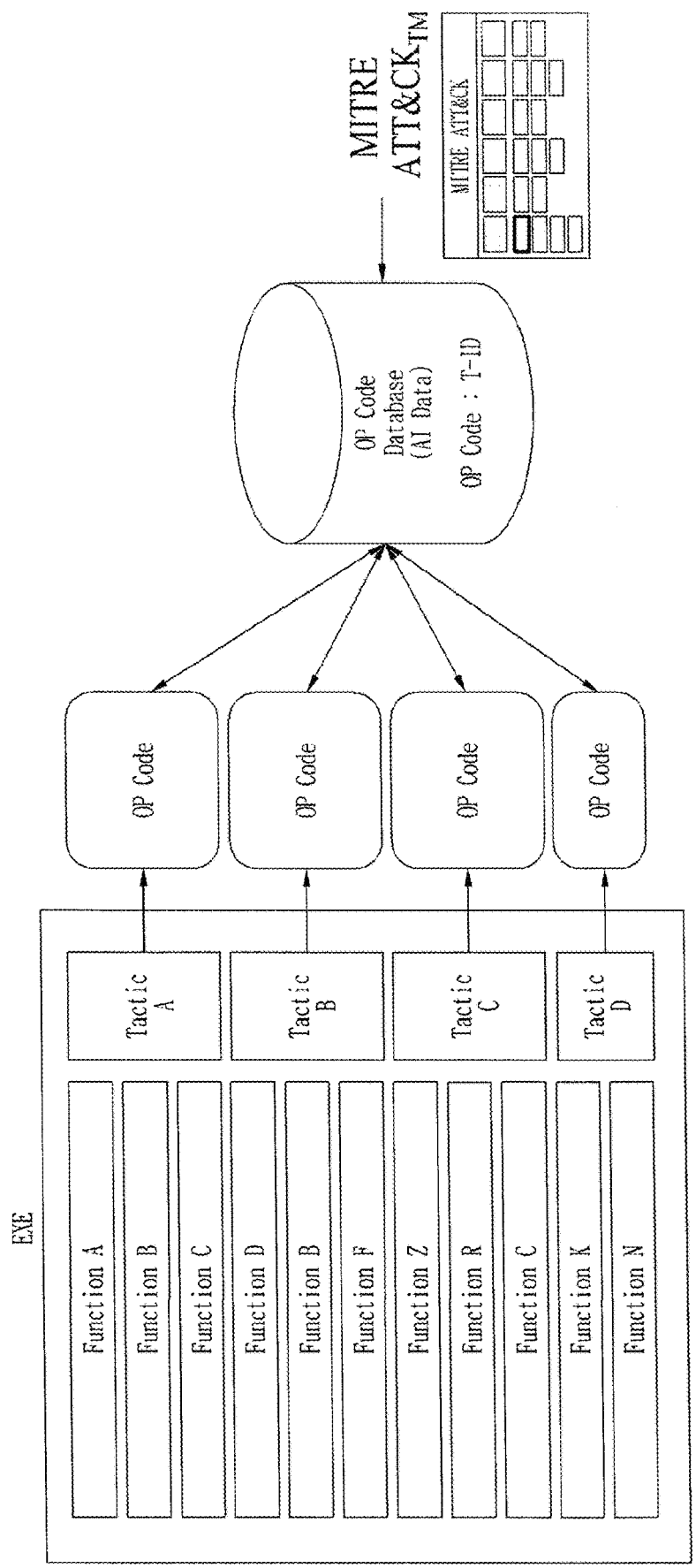
FIG. 19 is a diagram illustrating an example of matching an attack technique with code extracted from binary code according to a disclosed embodiment.

FIG. 19 illustrates an example of matching an attack technique with code extracted from binary code according to a disclosed embodiment. Here, an example of using a standardized model as an example of matching an attack technique is disclosed.

Here, MITRE ATT&CK® Framework is exemplified as a standardized model.

For example, in terms of cybersecurity, "malicious activity" is interpreted differently depending on the analyst, and is interpreted differently depending on the insight of each person in many cases.

Internationally, many efforts are being made among experts to standardize "malicious activity" that occurs on the system and to ensure that everyone makes the same interpretation. MITRE (https://attack.mitre.org), a non-profit R&D organization that performs national security-related tasks with support from the US federal government, studied the definition of "malicious activity" and created and announced the ATT&CK® Framework. This framework was defined so that everyone can define the same "malicious activity" for cyber threats or malware.

MITRE ATT&CK® Framework (hereinafter referred to as MITRE ATT&CK®) is an abbreviation of Adversarial Tactics, Techniques, and Common Knowledge, which summarizes latest attack technology information of attackers. MITRE ATT&CK® is standardized data obtained by analyzing tactics and techniques of adversary behaviors of an attacker after observing actual cyberattack cases to classify and list information on the attack techniques of various attack groups.

MITRE ATT&CK® is a systematization (patterning) of threatening tactics and techniques to improve detection of advanced attacks with a slightly different point of view from the concept of the traditional Cyber Kill Chain. Originally, ATT&CK started by documenting TTP, which are methods (Tactics), techniques, and procedures, for hacking attacks used in corporate environments using Windows operating systems in MITRE. Since then, ATT&CK has developed into a framework that may identify activity of the attacker by mapping TTP information based on analysis of a consistent attack activity pattern generated by the attacker.

The malicious activity mentioned in the disclosed embodiment may be expressed by matching the malware to the attack technique based on a standardized model such as MITRE ATT&CK®, and the malware may be identified and classified for each element and matched to an attack identifier regardless of the standardized model.

The example of this figure conceptually illustrates a scheme of matching the malicious activity of the malware to the attack technique based on the MITRE ATT&CK model.

An executable file EXE may include various functions (Function A, B, C, D, E, . . . , N, . . . , Z) executed when the file is executed. A function group including at least one of the functions may perform one tactic.

In the example of this figure, functions A, B, and C correspond to tactic A, and functions D, B, and F correspond to tactic B. Similarly, functions Z, R and C correspond to tactic C, and functions K and F correspond to tactic D.

The embodiment may match a set of functions corresponding to each tactic and a specific disassembled code segment. The database stores attack identifiers (T-IDs) of tactics, techniques, and procedures (TTP) that can correspond to disassembled code previously learned by AI.

Attack identifiers (T-IDs) of tactics, techniques, and procedures (TTP) follow a standardized model, and the example in this figure illustrates MITRE ATT&CK® as a standardized model of cyber threat information.

Accordingly, the embodiment may match result data extracted from the disassembled code in the binary file with the standardized attack identifier. A more specific scheme of matching an attack identifier is disclosed below.

Figure 20:
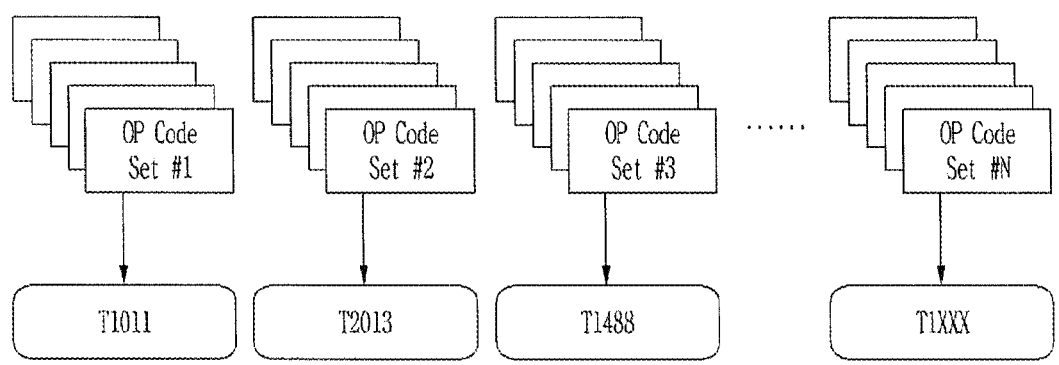
FIG. 20 is a diagram illustrating an example of matching an attack technique with a code set including opcode according to a disclosed embodiment.

FIG. 20 is a diagram illustrating an example of matching an attack technique with a code set including opcode according to a disclosed embodiment.

Most AI engines use a data set learned based on various characteristic information of malware to identify the malware. Then, whether the malware is malicious is determined. However, in this way, it is difficult to describe a reason why the malware is malware. However, as illustrated, when the standardized tactic (TTP) identifier is matched, it is possible to identify a type of threat included in the malware. Accordingly, the embodiment may accurately deliver cyber threat information to a security administrator and enable the security administrator to systematically manage cyber threat information over the long term.

When generating a dataset for AI learning to identify a tactic (TTP) based on the disassembled code, the embodiment not only distinguishes only the identifier or labeling of the tactic (TTP), but also can reflect characteristics of a scheme of implementing the tactic (TTP) as an important factor.

Even malware that implements the same tactic (TTP) is impossible to generate with the same code depending on the developer. That is, even though the tactic (TTP) is described in the form of human oral language, an implementation method and a code writing method are not the same depending on the developer.

Such a difference in coding depends on the ability of the developer or scheme or habit of implementing the program logic, and this difference is expressed as a difference between binary code or opcode and ASM code obtained by disassembling the binary code.

Therefore, when an attack identifier is simply assigned or matched according to the type of the resulting tactic (TTP), it is difficult to accurately identify an attacker or a group of attackers generating the malware.

Conversely, when modeling is performed by reflecting the characteristics of the disassembled opcode and ASM code as important variables, it is possible to identify a developer developing specific malware or a specific attack tool, or even an automatically created tool itself.

The disclosed embodiment may generate threat intelligence, which is significantly important in modern cyber warfare, according to the unique characteristics of the disassembled opcode and ASM code combined code. That is, based on these unique characteristics, the embodiment may identify a scheme of operating the attack code or malware, a person developing the attack code or malware, and the development purpose.

In the future, based on characteristic information about continuous attacks by the attacker, it will be possible to supplement a vulnerable system and to enable an active and preemptive response to cybersecurity threats.

Based on this concept, the embodiment provides a completely different result from that in the method and performance of simply identifying an attack technique according to an attack result based on the opcode.

The embodiment may generate a data set of disassembled code based on the characteristics of the combination of the disassembled opcode and ASM code to accurately identify and classify the coding technique used to implement the tactic (TTP). When modeling is performed to identify unique characteristics from this generated data set, it is possible to identify not only the tactic (TTP) but also characteristic information of the developer, that is, the developer (or automated creation tool).

This figure illustrates an example of matching an opcode data set modeled in the manner described above to an attack identifier.

This example illustrates that a first opcode set (opcode set #1) matches an attack technique identifier T1011, and a second opcode set (opcode set #2) matches an attack technique identifier T2013. Further, a third opcode set (opcode set #3) may match an attack technique identifier T1488, and an Nth opcode set (opcode set #N) matches an arbitrary attack technique identifier T1XXX. While the standardized model, MITRE ATT&CK®, expresses the identifier of the attack technique in a matrix format for each element, the embodiment may additionally identify an attacker or an attack tool in addition to the identifier of the attack technique.

This figure is illustrated as an opcode data set for convenience. However, when an attack technique is identified by a data set of disassembled code including opcode and ASM code, it is possible to identify a more subdivided attack technique comparing to identifying an attack technique only by an opcode data set.

According to an embodiment, by analyzing a combination of disassembled code data sets, it is possible to identify not only the attack technique identifier but also the attacker or the attack group.

Accordingly, the embodiment may provide a more advanced technology in terms of acquiring intelligence information when compared to the conventional technology, and solve problems that have not been solved in the conventional security area.

Fast data processing and algorithms are required to ensure accurate intelligence information in the complex environment as described above. Hereinafter, additional embodiments related thereto and performance thereof will be disclosed.

Figure 21:
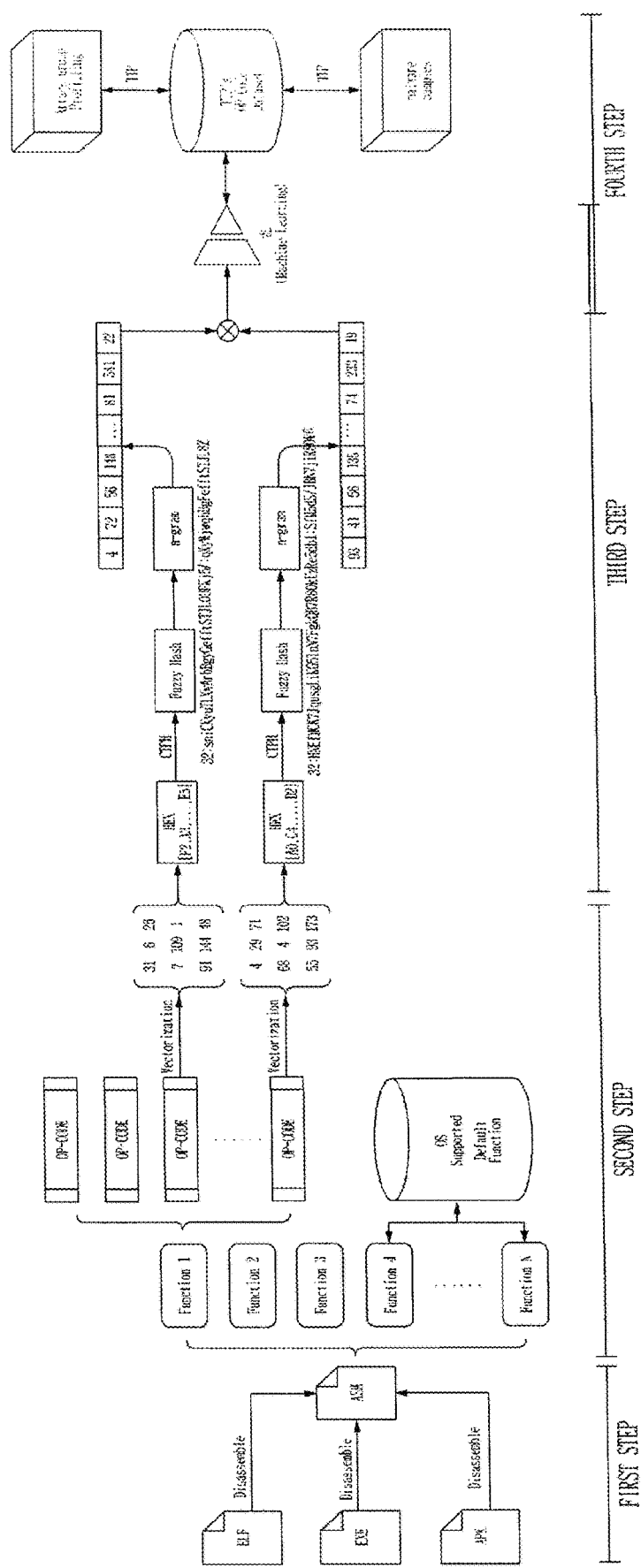
FIG. 21 is a diagram illustrating a flow of processing cyber threat information according to a disclosed embodiment.

FIG. 21 is a diagram illustrating a flow of processing cyber threat information according to a disclosed embodiment.

A case where the file identified in this figure is an executable binary file of ELF, EXE, and ARK will be described as an example. The processing of this step is related to the in-depth analysis described above.

First, a detailed example of a process of extracting the disassembled code including the opcode code as a first step will be described as follows.

When source code is complied, an executable file is created.

The raw source code is generated as new data in a form suitable for processing by a machine by a compiler in each executable OS environment. The newly constructed binary data is in a form that is not suitable for human reading, and thus it is impossible for a human to understand the internal logic by interpreting the file created in the form of an executable file.

However, a reverse process is performed for vulnerability analysis of the security system and for various purposes to perform interpretation or analysis of machine language, which is referred to as a disassembly process as described above. The disassembly process may be performed according to a CPU of a specific operating system and the number of processing bits (32-bit, 64-bit, etc.).

Disassembled assembly code may be obtained by disassembling each of the illustrated ELF, EXE, and ARK executable files.

The disassembled code may include code in which opcode and ASM code are combined.

The embodiment may extract the opcode and ASM code from an executable file by analyzing the executable file based on a disassembly tool.

The disclosed embodiment does not use the extracted opcode and ASM code without change, and reconstructs the opcode array by reconstruction for each function. When the opcode array is rearranged, the data may be reconstructed so that the data may be sufficiently interpreted by including the original binary data. Through this rearrangement, the new combination of the opcode and the ASM code provides basic data that can identify the attacker as well as the attack technique.

A process (ASM) of processing assembly data as a second step will be described in detail as follows.

Assembly data processing is a process of analyzing similarity and extracting information based on data reconstructed in a human or computer-readable form after separating only the opcode and the necessary ASM code.

In this step, the disassembled assembly data may be converted into a certain data format.

Such conversion of the data format may be selectively applied without needing to apply all of the conversion methods described below to increase data processing speed and accurately analyze data.

Various functions may be extracted from the assembly data of the rearranged opcode and ASM code combination.

When one executable file is dissembled, it is possible to include, on average, about 7,000 to 12,000 functions, depending on the size of the program. Some of these functions are implemented by a programmer as needed, and some of the functions are provided by default in the operating system.

When the actual ASM code is analyzed, about 87% to 91% of the functions are basically provided by the operating system (OS supported), and the ASM code actually implemented by the programmer for the program logic is about 10%. The functions provided by the operating system are functions included in various DLL and SO files basically installed when the operating system is installed along with function names (default functions). These operating system-provided functions may be previously analyzed and stored to be filtered from analysis target data. By separating only code to be analyzed in this way, processing speed and performance may be increased.

In the embodiment, in order to accurately perform functional analysis of a program, the opcode may be processed by being separated into function units. The embodiment may perform the minimum unit of all semantic analysis based on a function included in assembly code.

In order to increase analysis performance and processing speed, the embodiment may filter out operator-level functions having inaccurate meaning, and remove functions having the information amount smaller than a threshold value from analysis. Whether or not to filter the functions and a degree of filtering may be set differently depending on the embodiment.

The embodiment may remove annotation data provided by the disassembler during output from the opcode organized according to the function. In addition, the embodiment may rearrange the disassembled code.

For example, the disassembled code output by the disassembler may have the order of [ASM code, opcode, and parameter].

The embodiment may remove parameter data from the assembly data and rearrange or reconstruct the disassembled code of the above order in the order of [opcode and ASM code]. The reassembled disassembled code is easy to process by being normalized or vectorized. In addition, the processing speed may be significantly increased.

In particular, in disassembled code having a combination of [opcode and ASM code], an ASM code segment has different data lengths, making comparison difficult. Therefore, in order to check uniqueness of the corresponding assembly data, the data may be normalized into a data format of a specific size. For example, in order to check uniqueness of the disassembled code of the [opcode and ASM code] combination, the embodiment may convert a data part into a data set of a specific length that is easy to normalize, for example, cyclic redundancy check (CRC) data.

As an example, in the disassembled code of the [opcode and ASM code] combination, it is possible to convert an opcode segment into CRC data of a first length and an ASM code segment into CRC data of a second length, respectively.

Normalized data converted from the opcode and the ASM code may maintain uniqueness of each code before the corresponding conversion, respectively. Vectorization may be performed on the normalized data in order to increase similarity determination speed of the normalized data converted with uniqueness.

As described above, normalization or vectorization processes as a data conversion process may increase data processing speed and selectively apply accurate data analysis.

Detailed examples of the normalization process and the vectorization process are again described in detail below.

As a third step, a process of analyzing data for analyzing the disassembled code will be described in detail as follows.

In this process, conversion of various data formats may be used to increase data processing speed and to accurately analyze data. Some of the conversion methods described below may be selectively applied without the need to apply all the methods.

This step is a step of analyzing the malware and similarity based on a data set for each function in converted disassembled code based on the converted data.

The embodiment may convert vectorized opcode and ASM code data sets back into byte data in order to perform code-to-code similarity operation.

Based on the byte data converted again, a block-unit hash value may be extracted, and a hash value of the entire data may be generated based on the block-unit unique value.

The hash value may be compared by extracting a hash value of a unit designated to extract a unique value of each block unit in order to efficiently perform block-unit comparison, which is a part of byte data.

A fuzzy hashing technique may be used to extract the hash value of the designated unit and compare similarity of two or more pieces of data. For example, the embodiment may determine similarity by comparing a hash value extracted in block units with a hash value in some units in a pre-stored malware using the CTPH method in fuzzy hashing.

In summary, the embodiment generates a unique value of disassembled code of the opcode and the ASM code in order to confirm uniqueness of each specific function based on the fact that the combination code of the opcode and the ASM code implements specific functions in units of functions. In addition, it is possible to perform a similarity operation by extracting a unique value in block units in the opcode and the ASM code of the disassembled code based on this unique value.

A detailed example of extracting a block-unit hash value will be disclosed with reference to the drawings below.

As described above, the embodiment may use a block-unit hash value when performing a similarity operation.

The extracted block-unit hash value includes String Data (Byte Data), and String Data (Byte Data) is numerical values enabling comparison of similarity between codes. When comparing bytes of billions of disassembled code data sets, a significantly long time may be consumed to obtain a single similarity result.

Therefore, according to the embodiment, String Data (Byte Data) may be converted into a numerical value. Based on the numerical value, similarity analysis can be rapidly performed using AI technology.

The embodiment may vectorize String Data (Byte Data) of the hash value of the extracted block unit based on N-gram data. The embodiment of this figure illustrates the case in which a block-unit hash value is vectorized into 2-gram data in order to increase the operation speed. However, in the embodiment, it may be unnecessary to convert the block-unit hash value into 2-gram data, and the block-unit hash value may be vectorized and converted into 3-gram, 4-gram, . . . , N-gram data. In N-gram data, as N increases, the characteristics of the data may be accurately reflected. However, the data processing time increases.

As described above, in order to increase the data processing speed and to accurately analyze data, byte conversion, hash conversion, and N-gram conversion below may be selectively applied.

The illustrated 2-gram conversion data has a maximum of 65,536 dimensions. As the dimension of the training data increases, a distribution of the data becomes sparse, which may adversely affect classification performance. In addition, as the dimension of the training data increases, temporal complexity and spatial complexity for learning the data increase.

The embodiment may address this problem by various natural language processing algorithms based on various text expressions. In this embodiment, Term Frequency-Inverse Document Frequency (TF-IDF) technique will be described as an example of such an algorithm.

As an example for processing the similarity of the training data in this step, when determining an attack identifier or class (T-ID) from high-dimensional data, the TF-IDF technique may be used to select a meaningful feature (pattern). In general, the TF-IDF technique is used to find documents having high similarity in a search engine, and equations for calculating this value are as follows.

$$tf(t, d) = \frac{f_{t,d}}{\sum_{t \in d} f_{t,d}}$$ [Equation 1]

Here, tf(t,d) denotes a frequency of a specific word t in a specific document d, and has a higher value as the word repeatedly appears.

$$idf(t, D) = \log \frac{N}{|\{d \in D: t \in d\}|}$$ [Equation 2]

idf(t,D) denotes a reciprocal value of a proportion of the document d including the specific word t, and has a lower value as the word appears more frequently in several documents.

$$tf\text{-}idf(t,d,D) = tf(t,d) \times idf(t,D)$$ [Equation 3]

tf–idf(t,d,D) is a value obtained by multiplying tf(t,d) by idf(t,D), and may quantify which word is more suitable for which document.

The TF-IDF method is a method of using a word frequency according to Equation 1 and an inverse document frequency (inverse number specific to the frequency of the document) according to Equation 2 to reflect a weight according to an importance of a word in a document word matrix as in Equation 3.

In an embodiment, a document including a corresponding word may be inferred as an attack identifier (T-ID) based on a characteristic or pattern of a word in block-unit code. Therefore, when the TF-IDF is calculated with respect to a pattern extracted from the block-unit code, a pattern that appears frequently within a specific attack identifier (T-ID) may be extracted, or code having a pattern unrelated to the specific attack identifier (T-ID) may be removed.

For example, assuming that a specific pattern A is a pattern expressed in all attack identifiers (T-IDs), a TF-IDF value for the specific pattern A may be measured low. In addition, it may be determined that such a pattern is an unnecessary pattern to distinguish an actual attack identifier (T-ID). An algorithm for determining similarity of natural language, such as TF-IDF, may be performed through learning of a machine learning algorithm.

The embodiment may reduce unnecessary calculations and shorten inference time by removing such an unnecessary pattern.

In detail, the embodiment may perform a similarity algorithm based on text representation of various types of natural language processing on the converted block-unit code data. Through the similarity algorithm, by removing the code of the pattern unrelated to the attack identifier, execution of the algorithm performed below and execution of the classification process according to machine learning may be greatly shortened.

The embodiment may perform classification modeling to classify a pattern of an attack identifier based on a feature or pattern on block-unit code. The embodiment may learn whether a vectorized block-unit code feature or pattern is a pattern of a known attack identifier, and classify the code feature or pattern by an accurate attack technique or implementation method. The embodiment uses various ensemble machine learning models to categorize an accurate attack implementation method, that is, an attack identifier and an attacker, for code determined to have a code pattern similar to that of malware.

The ensemble machine learning models are techniques that generate several classification nodes from prepared data, and combine node predictions for each classification node, thereby performing accurate prediction. As described above, the ensemble machine learning models that classify the attack implementation method of the word feature or pattern in the block-unit code, that is, the attack identifier or the attacker, are performed.

When applying the ensemble machine learning models, a threshold value for classification of prepared data may be set to prevent excessive detection and erroneous detection. Only data above the set detection threshold value may be classified, and data that does not reach the set detection threshold value may not be classified.

As described, conversion of several data formats may be used to increase the data processing speed and to accurately analyze the data. A specific embodiment in which the above-described data conversion method is applied to ensemble machine learning models will be described in detail below.

As a fourth step, a profiling process for identifying and labeling an attack technique (TTP) will be described as follows.

An example of vectorizing through extraction of a feature of disassembled code including opcode and ASM code of input binary data based on an previously analyzed attack code or malware has been described above.

The vectorized data is classified as a specific attack technique after being learned through machine learning modeling, and the classified data is labeled in a profiling process for classified code.

Labeling may be largely performed in two parts. One is to attach a unique index to an attack identifier defined in a standardized model, and the other is to write information about a user creating attack code.

Labeling is assigned according to an attack identifier (T-ID) reflected in a standardized model, for example, MITRE ATT&CK, so that accurate information may be delivered to the user without additional work.

In addition, labeling is assigned to distinguish not only an attack identifier but also an attacker implementing the attack identifier. Therefore, labeling may be provided so that it is possible to identify not only an attack identifier, but also an attacker and an implementation method accordingly.

In an embodiment, advanced profiling is possible based on data learned from a data set of disassembled code (opcode, ASM code, or a combination thereof) previously classified. In an embodiment, data of the static analysis, dynamic analysis, or correlation analysis disclosed above may be utilized as reference data for performing labeling. Therefore, even when a data set has not been previously analyzed, profiling data may be obtained significantly rapidly and efficiently by considering results of static, dynamic, and correlation analysis together.

The process of learning code having a pattern similar to that of the malware and classifying the learned data in the third step and the profiling process of the classified data in the fourth step may be performed together by an algorithm in machine learning.

A detailed example thereof is disclosed below. In addition, an actual example of the profiled data set is illustrated with reference to the drawings below.

FIG. 22 is a diagram illustrating values obtained by converting opcode and ASM code of disassembled code into normalized code according to a disclosed embodiment.

As described above, when the executable file is disassembled, data, in which opcode and ASM code are combined, is output.

The embodiment may remove annotation data output for each function from the disassembled data and change the arrangement order of the opcode, ASM code, and corresponding parameter to facilitate processing.

The reconstructed opcode and ASM code are changed to normalized code data, and the example of this figure illustrates CRC data as normalized code data.

For example, the opcode may be converted into CRC-16 and the ASM code may be converted into CRC-32.

In a first row of an illustrated table, a push function of the opcode is changed to CRC-16 data of 0x45E9, and 55 of the ASM code is changed to CRC-32 data of 0xC9034AF6.

In a second row, a mov function of the opcode is changed to CRC-16 data of 0x10E3, and 8B EC of the ASM code is changed to CRC-32 data of 0x3012FD2C. In a third row, a lea function of the opcode is changed to CRC-16 data of 0xAACE, and 8D450C of the ASM code is changed to CRC-32 data of 0x9214A6AA.

In a fourth row, a push function of the opcode is changed to CRC-16 data of 0x45E9, and 50 of the ASM code is changed to CRC-32 data of 0xB969BE79.

Unlike this example, it is possible to use normalized code data different from CRC data or code data having a different length.

When the disassembled code is changed to a normalized code in this way, it is possible to easily and rapidly perform subsequent calculation, similarity calculation, and vectorization while ensuring uniqueness of each code.

FIG. 23 is a diagram illustrating vectorized values of opcode and ASM code of disassembled code as an example of data conversion of a disclosed embodiment.

This figure illustrates results of vectorizing code of a normalized opcode (CRC-16 according to the example) and a normalized ASM code (CRC-32 according to the example), respectively.

A vectorized value of the code of the normalized opcode (opcode Vector) and a vectorized value of the code of the normalized ASM code (ASM code Vector) are illustrated in a table format in this figure.

The opcode vector value and the ASM code vector value of each row of this figure correspond to the normalized value of the opcode and the normalized value of the ASM code of each row of FIG. 22, respectively.

For example, vectorized values of CRC data 0x45E9 and 0xB969BE79 in the fourth row of the table of FIG. 22 are 17897 and 185 105 121 44 in a fourth row of the table of this figure, respectively.

When vectorization is performed on the normalized data in this way, the disassembled opcode function and ASM code are changed to vectorized values while each including unique features.

FIG. 24 is a diagram illustrating an example of converting a block unit of code into a hash value as an example of data conversion of a disclosed embodiment.

In order to perform similarity analysis, the vectorized data set of each of the opcode and the ASM code is reconverted into a byte data format. The reconverted byte data may be converted into a block-unit hash value. Further, based on the hash values in the block unit, a hash value of the entire reconverted byte data is generated again.

In an embodiment, to calculate the reconverted hash value, hash values such as MD5 (Message-Digest algorithm 5), SHA1 (Secure Hash Algorithm 1), and SHA 256 may be used, and a fuzzy hash function for determining similarity between pieces of data may be used.

The first row of the table in this figure represents human-readable characters that may be included in the data. In the reconverted byte data, a value included in a block unit may include such readable characters.

The characters may each correspond to 97, 98, 99, 100, . . . , 48, 49, which are ASCII values (ascii val) in a second row.

Data including character values in a first row may be segmented and separated into blocks in which ASCII values can be summed.

A third row of the table shows the sum of ASCII values corresponding to respective character values within a block unit having 4 characters.

The first block may have a value of 394, which is the sum (ascii sum) of ASCII values (ascii val) 97, 98, 99, and 100 corresponding to the characters in the block.

In addition, the last row shows the case where the sum of ASCII values in block units is converted into base-64 expression. The letter K is the sum of the first block.

In this way, a signature referred to as Kaq6KaU may be obtained for the corresponding data.

Based on such a signature, it is possible to calculate similarity of two pieces of block-unit data.

In this embodiment, a hash value may be calculated using a fuzzy hash function for determining similarity for block units included in code in reconverted byte data, and similarity may be determined based on the calculated hash value. Even though context triggered piecewise hashing (CTPH) is illustrated as a fuzzy hash function for determining similarity, it is possible to use other fuzzy hash functions that can calculate similarity of data.

Figure 25:
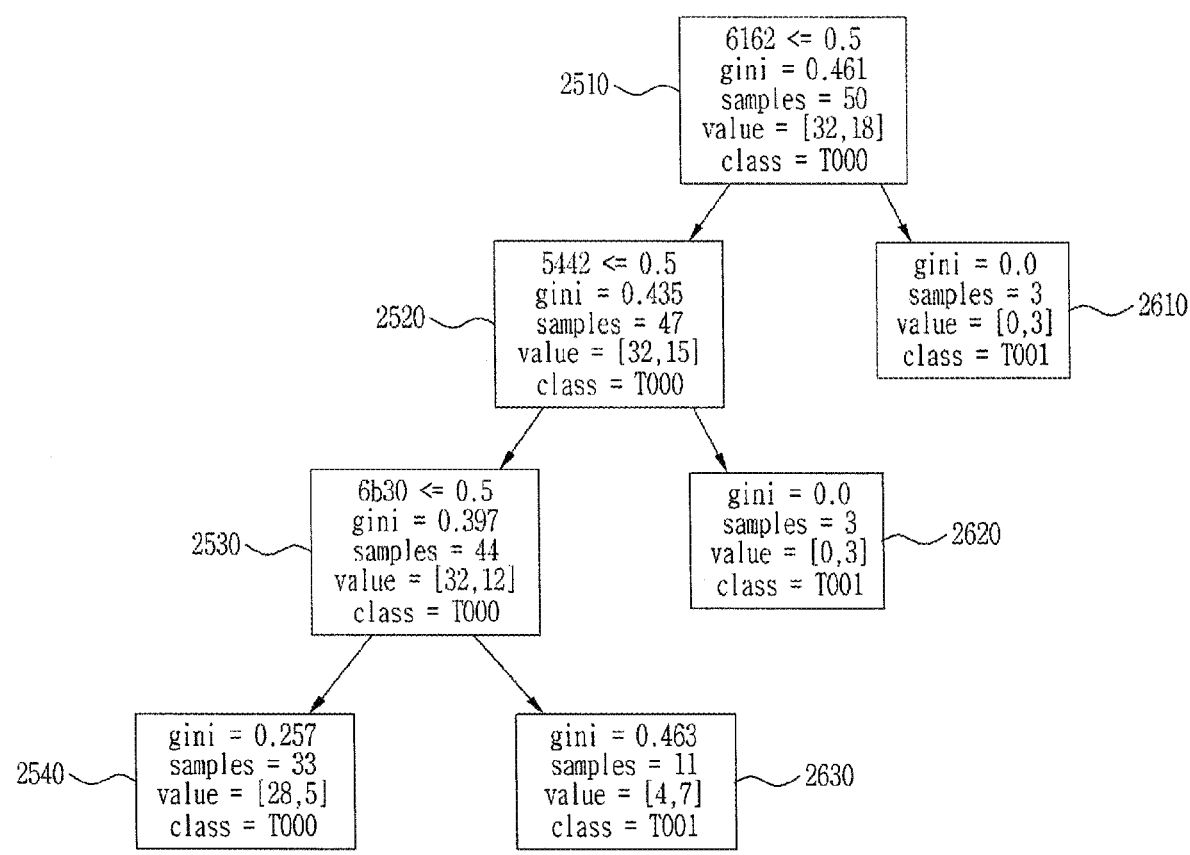
FIG. 25 is a diagram illustrating an example of an ensemble machine learning model according to a disclosed embodiment.

FIG. 25 is a diagram illustrating an example of an ensemble machine learning model according to a disclosed embodiment.

An embodiment may accurately classify an attack identifier (T-ID) of a file determined to be malware by using an ensemble machine learning model.

The hash value of the block unit including String Data (Byte Data) may be digitized based on N-gram characteristic information, and then similarity may be calculated using a technique such as TF-IDF to determine whether the value is an attack identifier (T-ID) or a class to be classified.

In order to increase performance of identifying an attack technique by reducing unnecessary operations, the embodiment may remove unnecessary patterns based on similarity among the hash values.

In addition, attack identifiers may be classified by modeling data, from which unnecessary patterns are removed, through ensemble machine learning.

There are methods such as voting, bagging, and boosting as a method of combining learning results of several classification nodes of an ensemble machine learning model. An ensemble machine learning model that properly combines these methods may contribute to increasing classification accuracy of training data.

Here, a method of more accurately classifying an attack identifier will be described by taking the case of applying the random forest method of the bagging method as an example.

The random forest method is a method of generating a large number of decision trees to reduce classification errors due to a single decision tree and obtaining a generalized classification result. An embodiment may apply a random forest learning algorithm using at least one decision tree for prepared data. Here, the prepared data refers to data from which unnecessary patterns are removed from the fuzzy hash value in block units.

A decision tree model having at least one node is performed to determine similarity of a block-unit hash value. It is possible to optimize a comparison condition for a feature value (here, the number of expressions of classification patterns based on block-unit hash values) capable of distinguishing one or more classes (attack identifier; T-ID) according to a degree of information gain of a decision tree.

To this end, a decision tree illustrated in the figure may be generated.

In this figure, upper quadrilaterals 2510, 2520, 2530, and 2540 are terminal nodes indicating conditions for classifying classes, and the lower quadrants 2610, 2620, and 2630 indicate classes classified as terminal nodes.

For example, when a random forest model is applied as an ensemble machine learning model, the model is a classification model that uses an ensemble technique using one or more decision trees. Various decision trees are constructed by varying characteristics of input data of a decision tree included in the random forest model. Classification is performed on several generated decision tree models, and a final classification class is determined using a majority vote technique. A test of each node may be performed in parallel, resulting in high computational efficiency.

When classifying a class, threshold values are set to prevent excessive detection and erroneous detection, a value less than a lower threshold value is discarded, and classification may be performed for data of a detection threshold value or more.

Figure 26:
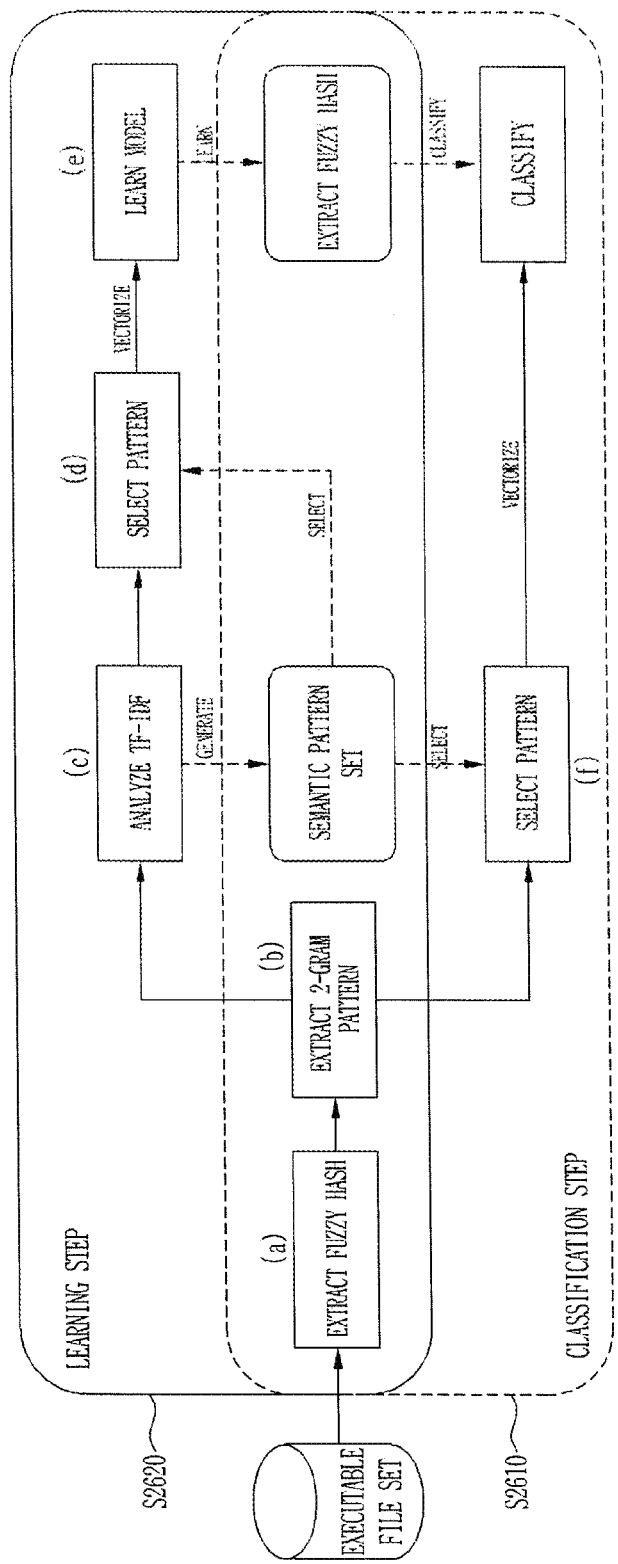
FIG. 26 is a diagram illustrating a flow of learning and classifying data by machine learning according to a disclosed embodiment.

FIG. 26 is a diagram illustrating a flow of learning and classifying data by machine learning according to a disclosed embodiment.

Profiling of input data may include a classification step (S2610) and a learning step (S2620).

In an embodiment, the learning step (S2620) may include (a) a hash value extraction process, (b) an N-gram pattern extraction process, (c) a natural language processing analysis (TF-IDF analysis) process, (d) a pattern selection process, (e) a model learning process, etc.

Further, in an embodiment, the classification step (S2610) may include (a) a hash value extraction process, (b) an N-gram pattern extraction process, (f) a pattern selection process, (g) a classification process by vectorization, etc.

The classification step (S2610) in a profiling step according to the embodiment will be first described as follows.

Input data is received from an executable file set or processed files.

Input data is received from executable file sets stored in the database, or input data including an executable file delivered from the processing process illustrated above is received. The input data may be data obtained by converting disassembled code including opcode and ASM code, and may be vectorized data.

A fuzzy hash value is extracted from the disassembled code, which is the input data, (a), and N-gram pattern data for a specific function is extracted (b). In this case, 2-gram pattern data including patterns determined to be similar to malware among the existing semantic pattern sets may be selected (f).

The N-gram data of the selected pattern may be converted into vectorized data, and the vectorized data may be classified as a function, a semantic pattern of which is determined, (g).

The learning step (S2620) in the profiling step according to the embodiment is performed as follows.

When input data is a new file, a fuzzy hash value is extracted from disassembled code that is the input data (a).

The extracted fuzzy hash value is vectorized into N-gram data (2-gram in this example) (b).

Natural language processing analysis such as TF-IDF is performed on an extracted specific pattern (c).

A data set having high similarity is selected among data sets having patterns related to an existing attack identifier (T-ID), and the remaining data sets are filtered (d). In this instance, it is possible to select sample data sets including some or all features of the data sets having patterns related to the attack identifier (T-ID) by comparing with data sets stored in an existing semantic pattern set.

It is possible to learn vectorized N-gram data based on the extracted sample data set (e).

A probability is obtained for each attack identifier (T-ID) by inputting the vectorized N-gram data into the classification model. For example, it is possible to obtain A % as a probability that vectorized data of an N-gram structure is a specific attack identifier (T-ID) T1027, and obtain (100-A) % as a probability that vectorized data of an N-gram structure is an attack identifier T1055.

An ensemble machine learning model such as a random forest including at least one decision tree may be used as the classification model.

Here, it is possible to determine an attack technique or attacker of the vectorized N-gram data based on the classification model.

Labeling is performed by classifying input data according to a classification result of the classification model (e) or a selection (f) result of the existing stored pattern (g).

A result of final labeling is illustrated with reference to the following drawings.

FIG. 27 is a diagram illustrating an example in which an attack identifier and an attacker are labeled by learning and classifying input data according to a disclosed embodiment.

This figure is a diagram illustrating each of an attack identifier, an attacker or an attack group, a fuzzy hash value corresponding to assembly code, and an N-gram corresponding thereto (indicated as 2-gram data here) in tabular form as a result of the profiler.

According to an embodiment, when profiling is completed, it is possible to obtain classified data in relation to implementation of the following tactic.

According to profiling according to the embodiment, it is possible to perform labeling with an attack identifier (T-ID) and an attacker or an attacker group (Attacker or Group).

Here, the attack identifier (T-ID) may follow the standardized model as described. In this example, a result of assigning the attack identifier (T-ID) provided by MITRE ATT&CK® is exemplified.

Labeling may be added to the identified attacker or attacker group (Attacker or Group) as described above. This figure illustrates an example in which the attacker TA504 is identified by labeling of the attacker or attacker group (Attacker or Group).

SHA-256 (size) indicates a fuzzy hash value and data size of malware corresponding to each attack identifier (T-ID) or attacker group (Attacker or Group). As described above, such malware may correspond to the rearrangement and combination of opcode and ASM code.

In addition, a value of a section marked with N-gram is N-gram pattern data corresponding to the attack identifier (T-ID) or the attacker group and a fuzzy hash value of malware, and is displayed as a part of 2-gram data in this example.

As illustrated in this figure, fuzzy hash values of malware (opcode and ASM code) and attack identifiers (T-IDs) or attacker groups corresponding to N-gram pattern data may be labeled and stored.

The illustrated labeled data may be used as reference data for ensemble machine learning, and may be used as reference data for a classification model.

Performance results of the disclosed embodiments are illustrated below.

Figure 28:
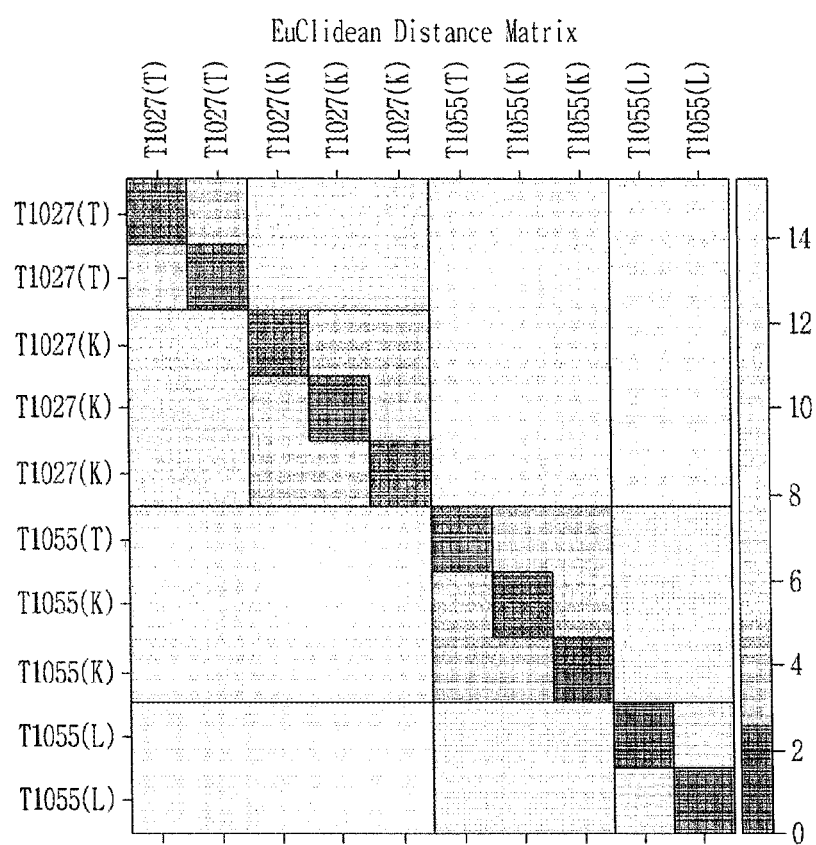
FIG. 28 is a diagram illustrating a result of identifying an attack identifier according to an embodiment.

FIG. 28 is a diagram illustrating a result of identifying an attack identifier according to an embodiment.

This figure illustrates a Euclidean distance matrix, which may represent similarity between two data sets.

In this figure, a bright part indicates that the similarity between the two data sets is low, and the dark part indicates that the similarity between the two data sets is high.

In this figure, T10XX denotes an attack identifier (T-ID), and characters T, K, and L in parentheses denote an attacker group creating an attack technique according to the corresponding attack identifier (T-ID).

That is, the row and column indicate attack identifiers (T-IDs) generated by respective attacker groups (T, K, and L), and row and column have the same meaning. For example, T1055(K) indicates an attack T1055 created by the attacker group L, and T1055(K) indicates the same tactic T1055 created by the attacker group K.

Since samples of each data set include the samples, when distances from other samples are calculated respectively, a distribution, in which uniformity is high in a diagonal direction from the top left to the bottom right, is obtained.

Referring to this figure, it can be seen that the same attack identifier (T-ID) exhibits similar characteristics even when the attacker groups are different. For example, even when the attack group is T or K, the attack identifier of T1027 may have high similarity when the attack technique is similar.

Therefore, when learning is carried out based on the extracted data set as in the above embodiment, it can be found that the characteristics of the same attack technique (T-ID) implemented by the same attacker are clearly identified (darkest part), and similarity of the same attack technique (T-ID) implemented by other attackers is high (middle dark part).

Therefore, when the attack technique is classified by extracting and applying the sample data based on the combination of the opcode and the ASM code in this way, even if the attacker is different, a specific attack technique or identifier (T-ID) may be reliably classified. Conversely, by the combination of the opcode and the ASM code, it is possible to clearly identify specific code implemented inside malware, as well as identify an attack implementation method including an attacker and an attack identifier.

Figure 29:
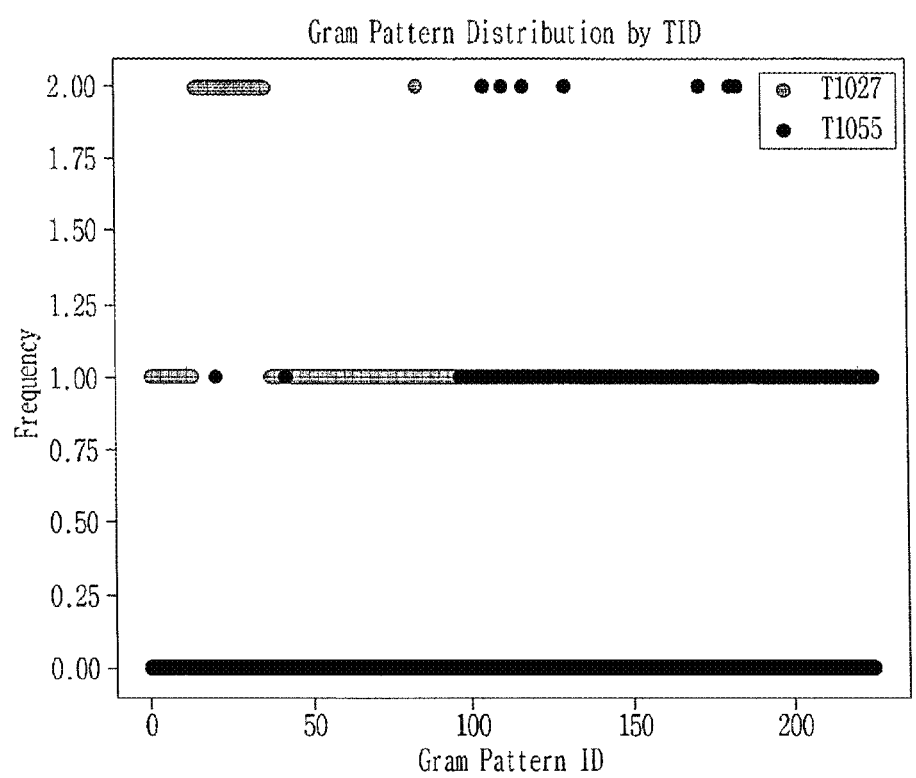
FIG. 29 is a diagram illustrating a gram data pattern according to an attack identifier according to an embodiment.

FIG. 29 is a diagram illustrating a gram data pattern according to an attack identifier according to an embodiment.

This figure is a diagram illustrating a pattern of gram data when attack identifiers (T-IDs) are different. For example, when each of malware including attack identifiers T1027 and T1055 is converted into 2-gram pattern data and classified according to the embodiment, different gram patterns are obtained for the attack identifiers (T-IDs).

That is, according to an embodiment of identifying attack techniques in malware based on the combination of the opcode and the ASM code, a pattern of gram data may be divided for each attack identifier (T-ID).

This result means that, according to the present embodiment, even when the attacker is the same, various attack identifiers (T-IDs) hidden in the malware may be clearly identified.

Figure 30:
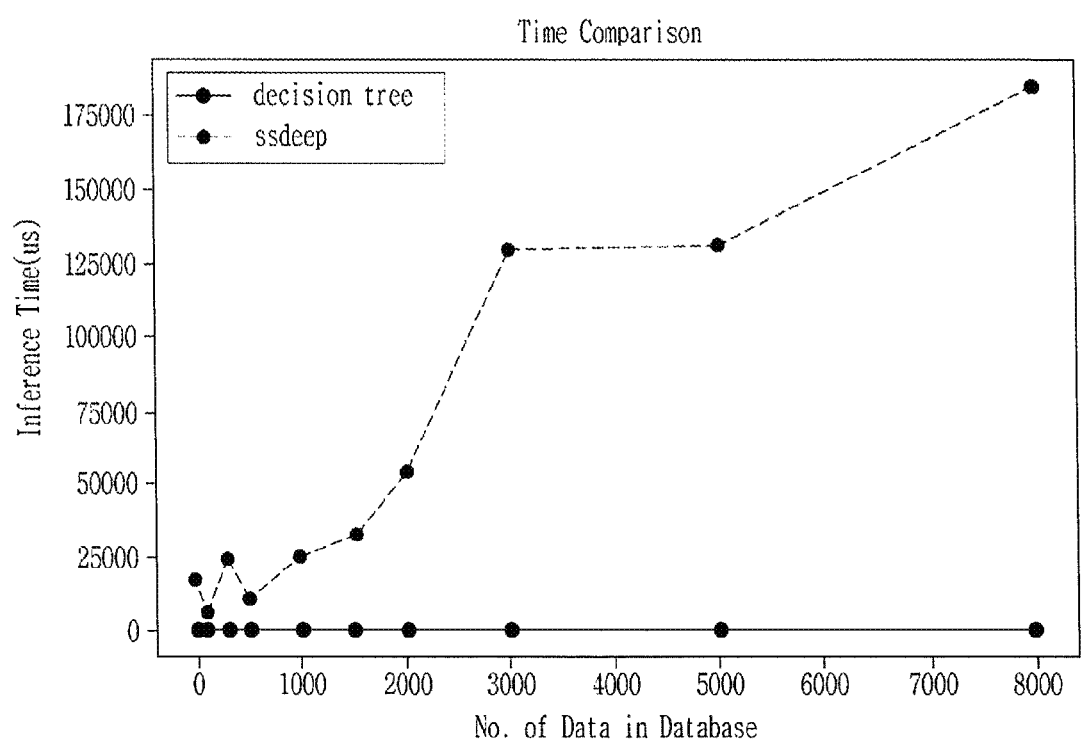
FIG. 30 is a diagram illustrating performance of an embodiment of processing disclosed cyber threat information.

FIG. 30 is a diagram illustrating performance of an embodiment of processing the disclosed cyber threat information.

This figure illustrates performance for an operation speed of classifying an attack identifier or an attacker in implementation of the disclosed embodiment.

The horizontal axis indicates the amount of data stored in the database, and the vertical axis indicates a time consumed to classify an attack identifier.

When common samples are compared N:1 (N vs. 1), respectively, while increasing the number of pieces of data of fuzzy hash data stored in the database, a processing time may exponentially increase depending on the number of pieces of data. For example, when only similarity of hash values or fuzzy hash values is compared (expressed as ssdeep), a time required increases significantly depending on the amount of data to be compared.

However, when the decision tree model of the ensemble machine learning model of the embodiment is used, an inference time for classifying an attack identifier, etc. does not increase even when the number of pieces of data increases.

In other words, the decision tree model that generates the optimized comparison tree has the advantage that the calculation speed is not significantly affected even when the number of pieces of data increases since the nodes can be processed in parallel.

FIG. 31 is a diagram illustrating an example of providing detection names using detection engines that detect cyber threat information.

Various engines in the field of malware detection have been developed to detect cyber threat information. Even when the ability to detect malware increases with the increase in AI analysis, effectiveness of such detection ability is significantly low if the detected malware is not properly described and information thereof is not provided.

This figure illustrates famous overseas detection engines 3210 (left) provided by the site Virus Total and detection names (right) of the same malware provided by the respective detection engines.

Since identification and delivery of the same malware are not performed accurately, it is difficult to identify a reason for detecting the corresponding malware. Therefore, it has been difficult for the security officer to find an object on which a countermeasure needs to be taken based on the information, and it has been difficult to address the risk of security threats.

However, the disclosed embodiment may improve versatility and efficiency by providing cyber threat information with a matrix element of an attack identifier provided by a standardized model, such as MITER ATT&CK, and a combination thereof, and providing information on malware as a standardized identifier (T-ID).

Hereinafter, an example, in which an attacker may be tracked and a new attack may be predicted based on the disclosed embodiment, will be described in detail.

Figure 32:
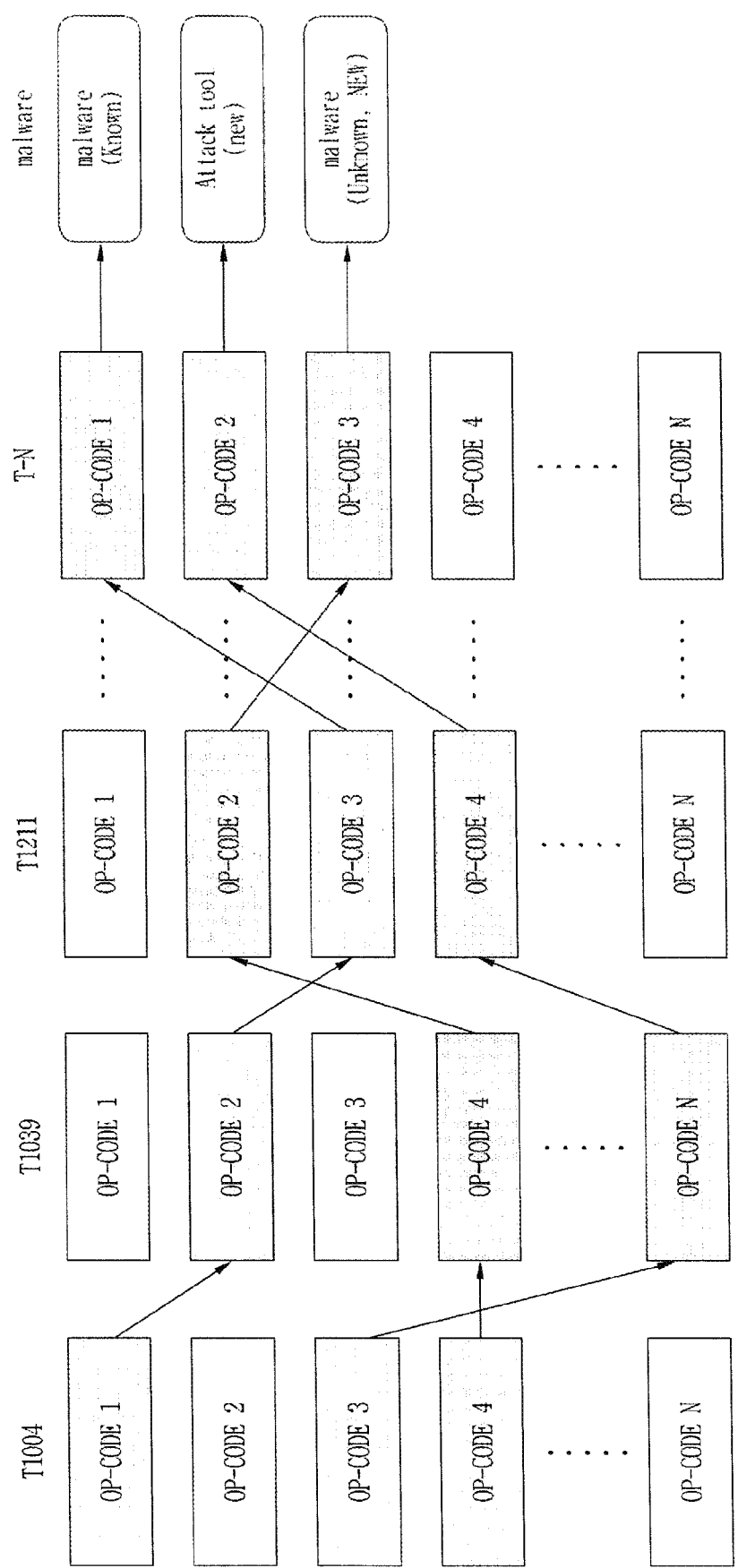
FIG. 32 is a diagram illustrating an example of new malware and a tactic according to an embodiment.

FIG. 32 is a diagram illustrating an example of new malware and a tactic according to an embodiment.

To generate code, code developers are highly prone to use unique habits such as variable name declaration, function call structure, and parameter call method. Since development of programs is based on a flow of logic and experience, it is significantly difficult to completely change these habits.

On this basis, the embodiment may track the attacker by using these results in the code as the fingerprint of the developer.

When the training data is configured based on the attack identifier (T-ID) of the malware, the developer may be specified using the above characteristic information. The disassembled code of the malware reflects the unique characteristics or habits of the developer.

In order to implement a specific attack technique, a specific hacker may use unique techniques of the hacker, which is not recognized by the hacker, and as complexity of the code increases, a possibility of designating a specific developer increases.

In addition, by combining the code blocks of opcode and ASM code for each attack identifier (T-ID), the combination may be used to detect new or variant malware not previously known.

This figure discloses an example of creating a new TTP combination that does not exist through combination of the disassembled opcode and ASM code according to an embodiment below.

In this example, T1044, T1039, T1211, . . . , T-N respectively illustrate attack identifiers (T-IDs).

A set of opcode 1 to opcode N corresponding to the respective attack identifiers refer to code sets included in malware of each attack identifier.

As illustrated here, it is presumed that malware is malware including a combination of opcode 1 of the previously known attack identifier T1044, opcode 2 of the previously known attack identifier T1039, opcode 3 of the previously known attack identifier T1211, and opcode 1 of the previously known attack identifier T-N. The malware including a set of combinations of these opcode may be known code or unknown code.

In a similar manner, it is possible to find a new attack technique including opcode 3 of T1044, opcode N of T1039, opcode 4 of T1211, opcode 2 of T-N, etc.

Alternatively, it is possible to find new and unknown attack techniques including opcode 4 of T1044, opcode 4 of T1039, opcode 2 of T1211, and opcode 3 of T-N.

In the above description, for convenience, an example of finding an attack technique using only a combination of opcode has been disclosed. However, when the disassembled code is generated by combining the opcode and ASM code, not only may the attack technique be found, but also the attacker or attack group may be identified.

Similarly, a new code set may be generated through recombination of disassembled code including the opcode and ASM code. In addition to the opcode corresponding to the function of the executable file, the ASM code indicating a target or storage location of the executable file may be reconstructed or recombined disassembled code may be generated.

By learning this reconstructed disassembled code through machine learning and comparing the code with previously analyzed malware, it is possible to predict future attacks beyond identifying a new segmented attack technique and an attacker creating the attack technique.

This new TTP combination and attack path combination may create a new tactic of cyber threats or malware not existing before, and the embodiment may verify whether code that can be attacked is generated by combining the existing disassembled code sets in this way. Whether the code can be attacked may be verified through a test such as dynamic analysis.

Accordingly, the embodiment may provide information capable of responding to future security threats through the combination of disassembled code sets, thereby enabling a preemptive response thereto.

For example, based on the combined code, it is possible to generate code that reflects a value such as a frequency of use for each attack technique (TTP) or a probability of success when used.

Alternatively, by AI learning, it is possible to generate in advance attack code or malware of a new code block combination having a high probability of success. In addition, by reflecting this information, it is possible to create a pattern to which existing security products may respond, or provide information that may strengthen security of a vulnerable part of an internal system.

Figure 33:
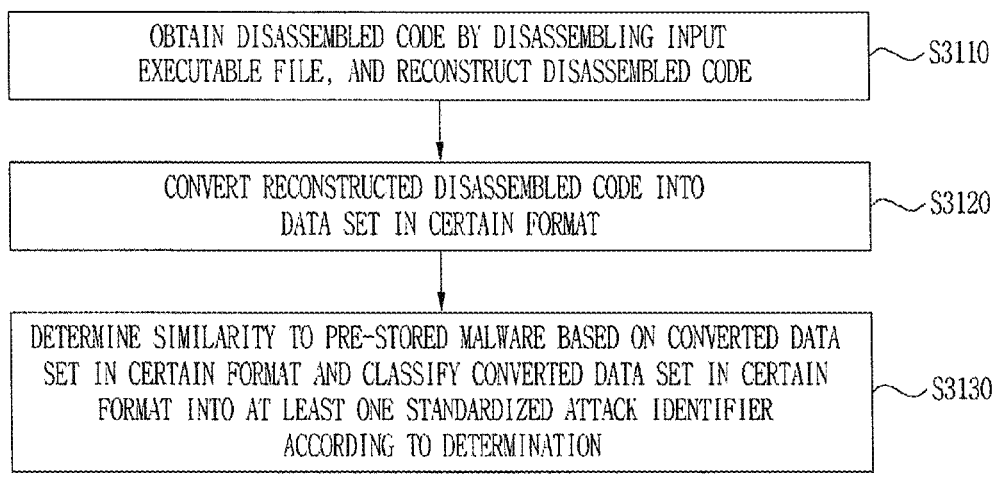
FIG. 33 is a diagram illustrating another embodiment of a cyber threat information processing method.

FIG. 33 is a diagram illustrating another embodiment of a cyber threat information processing method.

Disassembled code is obtained by disassembling an input executable file, and reconstructed disassembled code is obtained by reconstructing the disassembled code (S3110).

An example of obtaining and reconstructing the disassembled code has been described with reference to FIGS. 18, 21, etc.

The reconstructed disassembled code is converted into a data set in a certain format (S3120).

Examples of converting the reconstructed disassembled code into a data set of a certain format are illustrated in FIGS. 18, 21, 22, 23, 24, etc.

Similarity is determined based on the converted data set in the certain format, and the cyber threat attack technique included in the executable file is classified into at least one standardized attack identifier according to the determination (S3130).

Examples of similarity determination and classification of attack identifiers in this step have been described with reference to FIGS. 19, 20, 21, 25, 26, 27, etc.

Figure 34:
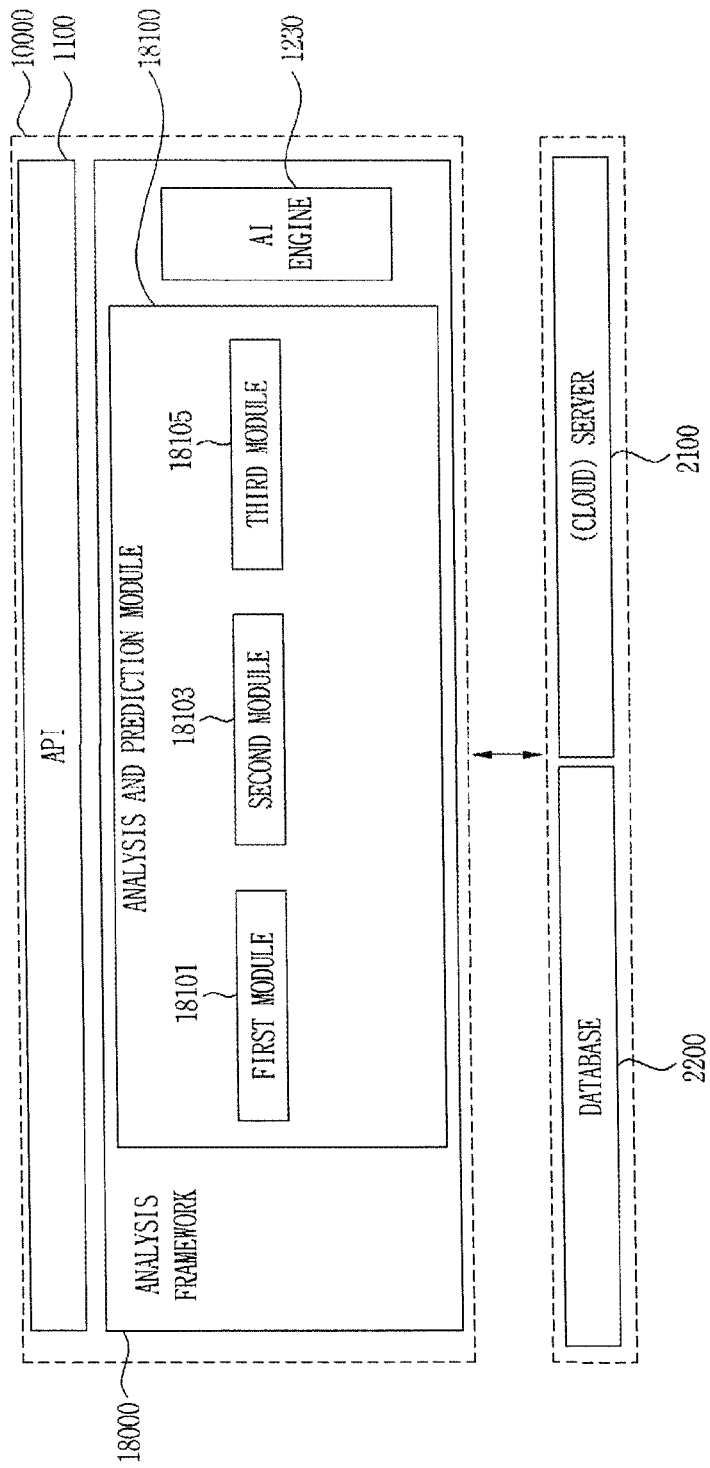
FIG. 34 is a diagram illustrating another embodiment of a cyber threat information processing apparatus.

FIG. 34 is a diagram illustrating another embodiment of a cyber threat information processing apparatus.

Another embodiment of the cyber threat information processing apparatus may include a server 2100 including a processor, a database 2200, and an intelligence platform 10000.

The intelligence platform 10000 may include an API 1100, a framework 18000, an analysis and prediction module 18100 that executes various algorithms and execution modules, and an AI engine 1230.

The database 2200 may store previously classified malware or pattern code of malware.

The processor of the server 2100 may perform a first module 18101 that disassembles an executable file received from the API 1100 to acquire disassembled code, and reconstructs the disassembled code to obtain reconstructed disassembled code.

Examples of an execution process of the first module 18101 are illustrated in FIGS. 18, 21, 22, 23, 24, etc.

In addition, the processor of the server 2100 may execute a second module 18103 for performing a code processing module that converts the reconstructed disassembled code into a data set of a specific format.

Examples of an execution process of the second module 18103 are illustrated in FIGS. 18, 21, 22, 23, 24, etc.

The processor of the server 2100 may perform a third module 18105 that determines similarity to the stored malware based on the converted data set in the specific format, and classifies the converted data set in the specific format into at least one standardized attack identifier according to the determination.

Examples of an execution process of the third module 18105 have been described with reference to FIGS. 19, 20, 21, 25, 26, 27, etc.

Figure 35:
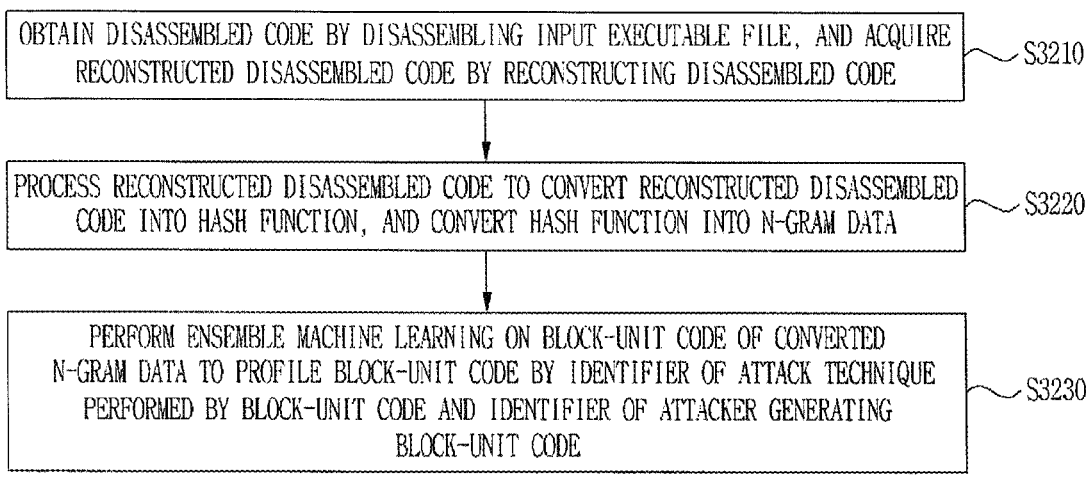
FIG. 35 is a diagram illustrating another embodiment of a cyber threat information processing method.

FIG. 35 is a diagram illustrating another embodiment of a cyber threat information processing method.

Disassembled code is obtained by disassembling an input executable file, and reconstructed disassembled code is obtained by reconstructing the disassembled code (S3110).

An example of obtaining and reconstructing the disassembled code has been described with reference to FIGS. 18, 21, etc.

The reconstructed disassembled code is processed and converted into a hash function, and the hash function is converted into N-gram data (S3120).

Examples of converting the reconstructed disassembled code into a data set in a certain format are illustrated in FIGS. 21, 24, etc.

Ensemble machine learning is performed on block-unit code of the converted N-gram data to profile the block-unit code by an identifier of an attack technique performed by the block-unit code and an identifier of an attacker generating the block-unit code (S3130).

Examples of profiling the identifier of the attack technique and the identifier of the attacker in this step have been described with reference to FIGS. 19, 20, 21, 25, 26, 27, etc.

Figure 36:
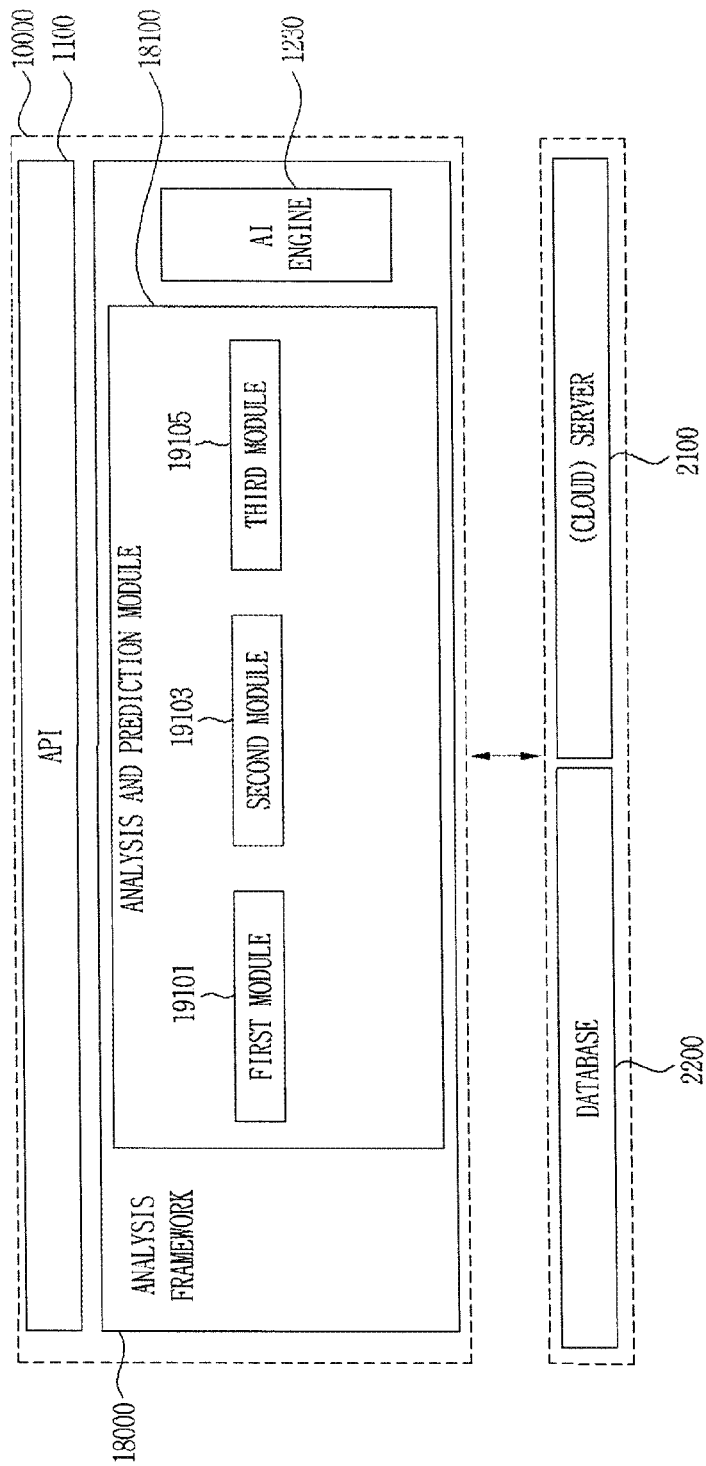
FIG. 36 is a diagram illustrating another embodiment of a cyber threat information processing apparatus.

FIG. 36 is a diagram illustrating another embodiment of a cyber threat information processing apparatus.

Another embodiment of the cyber threat information processing apparatus may include a server 2100 including a processor, a database 2200, and an intelligence platform 10000.

The intelligence platform 10000 may include an API 1100, a framework 18000, an analysis and prediction module 18100 that executes various algorithms and execution modules, and an AI engine 1230.

The database 2200 may store previously classified malware or a pattern code of malware.

The processor of the server 2100 may perform a first module 18101 that disassembles an executable file received from the API 1100 to acquire disassembled code, and reconstructs the disassembled code to obtain reconstructed disassembled code.

Examples of an execution process of the first module 18101 are illustrated in FIGS. 18, 21, etc.

In addition, the processor of the server 2100 may perform a second module 18103 that processes the reconstructed disassembled code to convert the code into a hash function, and converts the hash function into N-gram data.

Examples of an execution process of the second module 18103 are illustrated in FIGS. 21, 24, etc.

The processor of the server 2100 may perform a third module 18105 that performs ensemble machine learning on block-unit code of the converted N-gram data to profile the block-unit code by an identifier of an attack technique performed by the block-unit code and an identifier of an attacker generating the block-unit code.

Examples of an execution process of the third module 18105 have been described with reference to FIGS. 19, 20, 21, 25, 26, 27, etc.

Therefore, according to the disclosed embodiments, it is possible to detect and address malware not exactly matching data learned by machine learning and address a variant of malware.

According to the embodiments, it is possible to identify malware, an attack technique, and an attacker in a significantly short time even for a variant of malware, and furthermore predict an attack technique of a specific attacker in the future.

According to the embodiments, it is possible to accurately identify a cyberattack implementation method based on whether such malware exists, an attack technique, an attack identifier, and an attacker, and provide the cyberattack implementation method as a standardized model. According to the embodiments, it is possible to provide information about malware, for which a malware detection name, etc. is not unified or a cyberattack technique cannot be accurately described, in a normalized and standardized scheme.

In addition, it is possible to provide a means capable of predicting a possibility of generating previously unknown malware and attackers who can develop the malware, and predicting a cyber threat attack occurring in the future.

Hereinafter, an embodiment for a method to predict and counter any malware having a new attack technique other than the existing malware will be disclosed.

Figure 37:
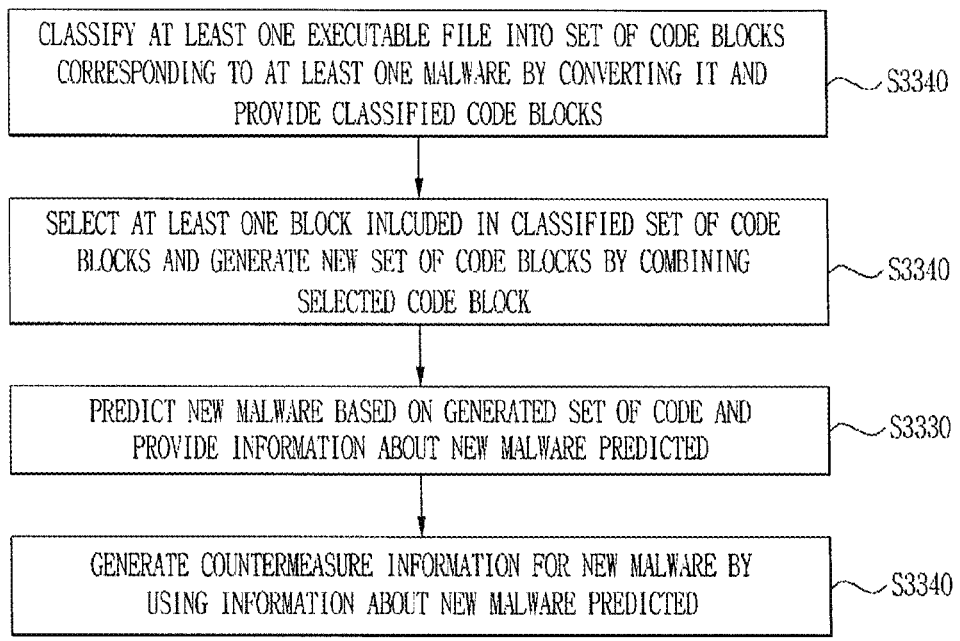
FIG. 37 is a diagram illustrating an example of a cyber threat information processing method predicting malware that may occur in the future according to an embodiment.

FIG. 37 is a diagram illustrating an example of a cyber threat information processing method predicting malware that may occur in the future according to an embodiment.

One or more executable files are classified into a set of code blocks corresponding to at least one malware after going through conversion, and the classified set of code blocks is provided (S3310).

When one or more executable files are classified into a set of code blocks corresponding to at least one malware after going through conversion, it is possible to generate a set of code blocks corresponding to at least one such malware based on the disassembling code resulting from the rearrangement of opcode corresponding to a function included in the executable file and assembly code, which is an operand of the function.

In this case, a code block may include character information of malware, and here, a single set of code blocks may correspond to a single attack technique of malware.

As disclosed above, it is possible to identify an attack technique based on similarity with by performing machine learning of a code block with a specific AI.

It is desired that one or more executable files described above be a file running on an identical operating system.

For example, when code blocks are classified from several executable files, it is desired to select executable files running on any of the following operating systems: a Windows OS, a mobile device OS, and a Linux OS.

A new set of code blocks are generated by selecting one or more code blocks included in the set of code blocks classified as above and combining the selected code blocks (S3320).

If there are several code blocks, or a set of bode blocks, corresponding to a single attack technique, it is possible to select a specific code block from the set of code blocks.

As described above, it is possible to select code blocks from at least one set of code blocks corresponding to at least one attack technique or to combine the selected code blocks.

The selection and combination of such code block may either be proceeded with in an arbitrary or random manner or be performed according to a specific AI algorithm of machine learning.

When selecting or combining code blocks, the elements described below may be considered.

Code blocks may be selected from a set of code blocks respectively corresponding to an identifier of an attack technique, and in this case, the selected or combined code blocks may select code blocks from the set of code blocks in order to have any attack technique other than the attack technique of the existing malware.

When they are selected or combined, code blocks may filter a combination in case where there is almost no possibility that a combined attack technique becomes a physical attack in reality. For example, the generated set of code blocks is excluded from the target of prediction if it may be not necessarily executable in a specific operating system. For example, code blocks that combine attack techniques through a network may filter any combination that is hardly likely to occur in a real network environment.

New malware is predicted based on generated set of code blocks. And information about the new malware predicted is provided (S3330).

Since the set of code blocks predicted as above is arbitrary combined, it is possible that such set of code blocks is neither a file nor code executable in reality. However, the combined set of code blocks may be predicted based on a possibility of the occurrence of an attack technique that the combined set of code blocks means, instead of the possibility that the code block is actually executable.

In other words, a set of code blocks may be predicted as malware based on characteristics of a physical attack technique of at least one malware subject to combination and characteristics of another attack technique.

It is possible to provide information about the possibility of the occurrence of such attack technique as prediction information for malware.

Countermeasure information of the new malware is provided based on information about new malware predicted (S3340).

It is possible to generate and provide countermeasure information of the predicted malware based on information provided in relation to the new malware predicted and its attack technique. Alternatively, it is possible to share the new malware predicted and its attack technique with a security analysis team such as a security company. In this case, any necessary measures and countermeasure information for the new malware and its attack technique may be provided.

According to an embodiment, as a pattern of new malware and its attack technique is created as a database, it is possible to take action to respond to any cyberattacks in the future.

Figure 38:
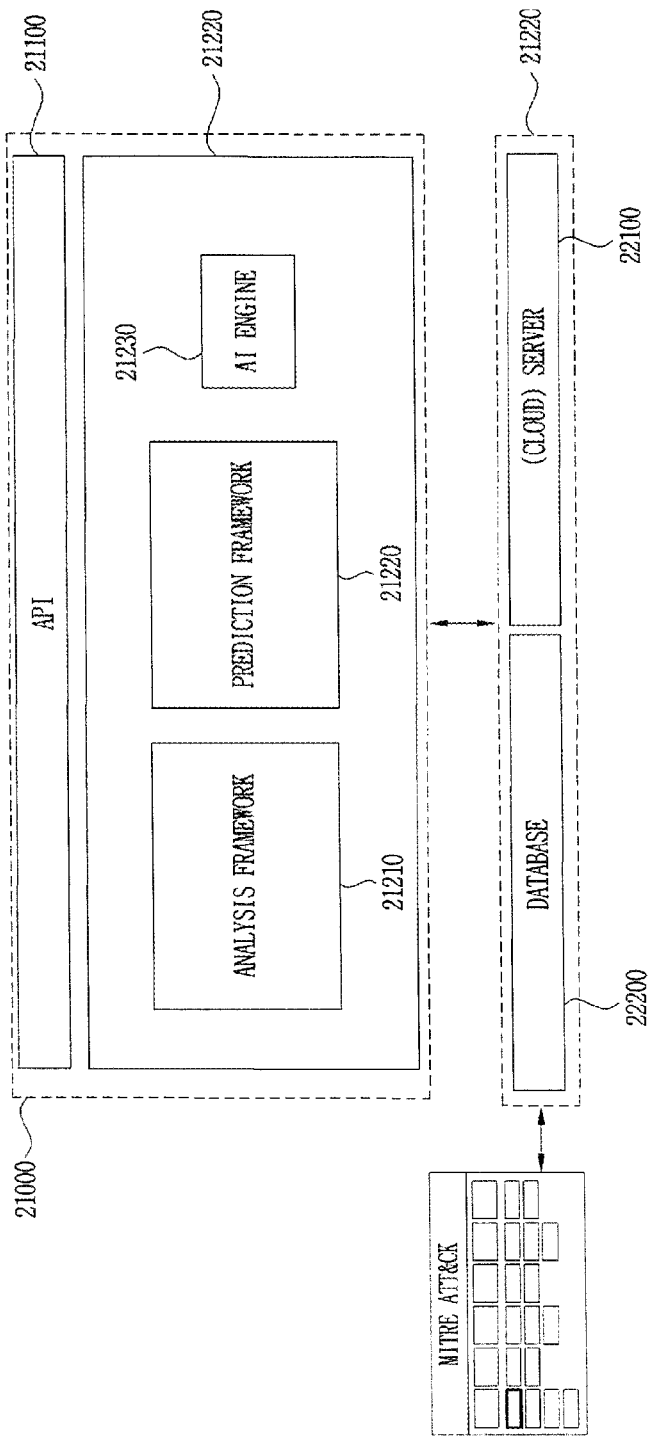
FIG. 38 is a diagram illustrating an example of a cyber threat information processing apparatus predicting malware that may occur in the future according to an embodiment.

FIG. 38 is a diagram illustrating an example of a cyber threat information processing apparatus predicting malware that may occur in the future according to an embodiment.

This diagram illustrates an example of the malware and an attack technique disclosed as above.

For convenience, an example of creating malware that has a new attack technique is disclosed only with a combination of opcode, but in this diagram, opcode in this diagram may mean a code block disassembled by combining opcode and ASM code.

In this diagram, T1044, T1039, T1211, . . . , and T-N respectively illustrate an attack technique identifiers (T-IDs).

In this diagram, a set of code blocks and a set of opcode 1 to opcode N corresponding to each attack technique identifier are a set of code blocks corresponding to each attack technique identifier, respectively.

Malware known as illustrated here may be created by combining opcode 1 of the previously known attack technique identifier T1044, opcode 2 of the previously known attack technique identifier T1039, opcode 3 of the previously known attack technique identifier T1211, opcode 1 of the previously known attack technique identifier T-N, etc.

In a similar manner, it is possible to predict a new attack technique by combining opcode 3 of T1044, opcode N of T1039, opcode 4 of T1211, opcode 2 of T-N, etc.

Alternatively, it is possible to find new and unknown malware including opcode 4 of T1044, opcode 4 of T1039, opcode 2 of T1211, opcode 3 of T-N, etc.

It is possible to analyze a possibility of the physical implementation and occurrence of an attack technique in reality for such a new attack technique (attack tool) or a new form of unknown or new malware.

Any combination of code blocks that, as a combination of physically contradictory attack techniques according to the combinations of attack techniques, is hardly likely to be physically implemented is excluded. However, if physical implementation is possible and an attack technic is likely to occur according to the combination of attack techniques, it is possible to generate prediction information even if the code blocks are not actually executed.

Further, such prediction information may be shared with or provided to a security company, etc., and if there is a possibility that the attack technique may occur, it is also possible to generate and provide proactive countermeasures.

Figure 39:
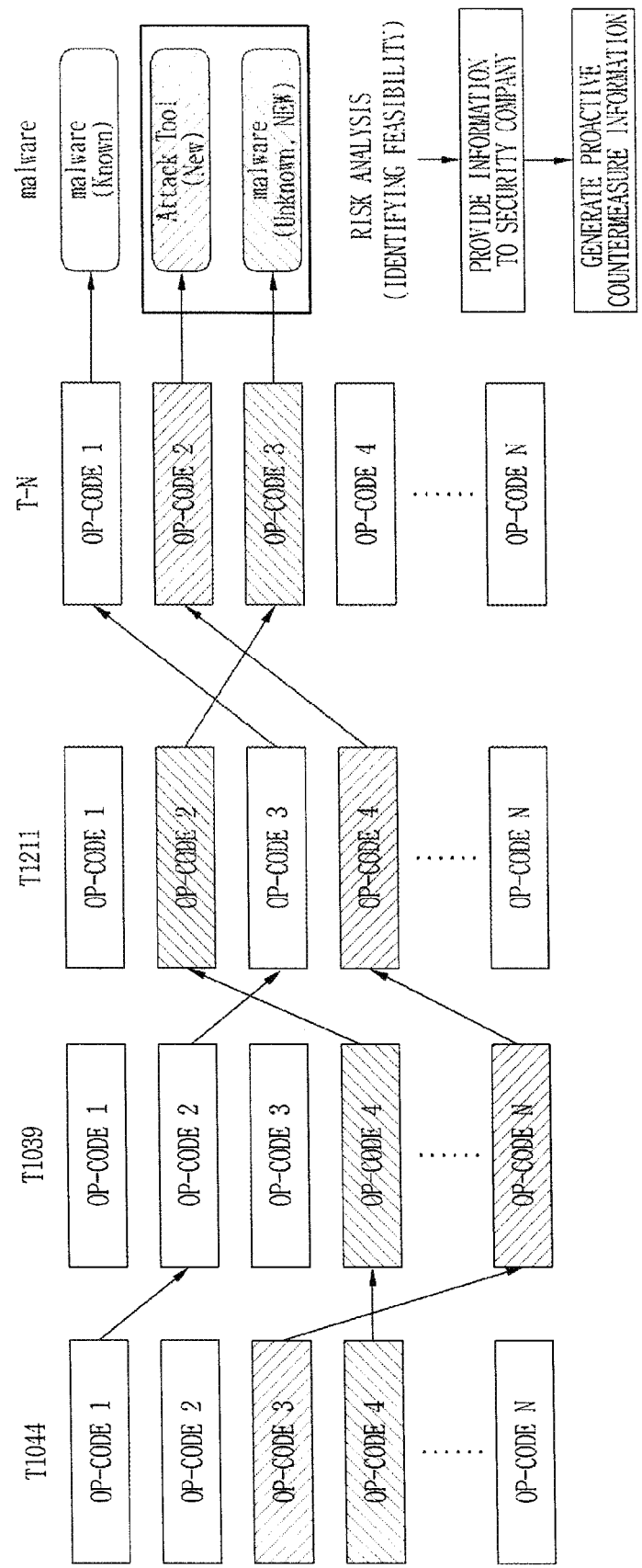
FIG. 39 is a diagram illustrating another example of a cyber threat information processing apparatus predicting malware that may occur in the future according to an embodiment.

FIG. 39 is a diagram illustrating another example of a cyber threat information processing apparatus predicting malware that may occur in the future according to an embodiment.

An example of a cyber threat information processing apparatus may include a server 22100 including a processor, a database 22200, and an intelligence platform 21000.

A prediction framework 21210 may classify at least one executable file being input in an Application Programming Interface (API) 21100 into a set of code blocks corresponding to at least one malware by converting such executable file and provide the set of code blocks classified as above.

Details of the analysis framework 21210 and an AI Engine 21230 are as illustrated in FIGS. 10 through 36.

A set of code blocks converted by the analysis framework 21210 may be classified according to any standardized attack techniques such as MITRE&ATTCK, etc. and then be registered to and stored in the database 22200.

The prediction framework 21220 may generate a new set of code blocks by selecting one or more code blocks included in the set of code blocks converted and analyzed by the prediction framework 21210 and combining the selected code blocks.

The prediction framework 21220 may predict new malware based on the generated set of code blocks and provide information about the new malware predicted as above.

A specific function module of the prediction framework 21220 will be described below.

Figure 40:
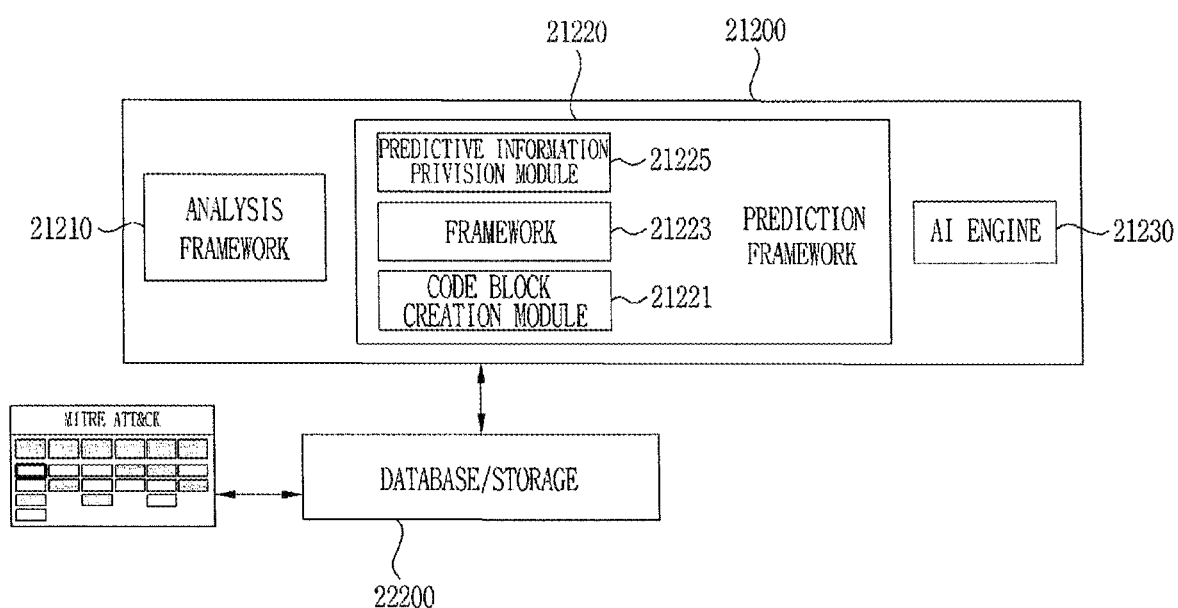
FIG. 40 is a diagram illustrating another example of a cyber threat information processing apparatus predicting malware that may occur in the future according to an embodiment.

FIG. 40 is a diagram illustrating another example of a cyber threat information processing apparatus predicting malware that may occur in the future according to an embodiment.

This diagram illustrates an analysis framework 21210 included in a framework 21200 of an intelligence platform 21000, a prediction framework 21220, and an AI engine 21230.

The intelligence platform 21000 stores and registers malware and its set of code blocks classified according to any standardized attack technique such as MITRE&ATTCK, etc. in or to either a database or a storage 22200

For details of the prediction framework 21210 and the AI engine 21230, descriptions illustrated in FIGS. 10 through 36 are referenceable.

The analysis framework 21210 may classify at least one executable file into a set of code blocks corresponding to at least one malware by converting such executable file and provide the classified set of code blocks.

Here, the analysis framework 21210 may use executable files running on an identical operating system.

A code block creation module 21221 of the prediction framework 21220 selects one or more code blocks included in the classified set of code blocks and generate a new set of code blocks by combining the selected code blocks. In this case, the code block creation module 21221 may combine code blocks and generate a set of code blocks by using the AI engine 21230.

A prediction module 21223 of the prediction framework 21220 may predict new malware or a new attack technique based on the generated set of code blocks.

With respect to new malware or a new attack technique, the prediction module 21223 may generate code blocks based on a possibility that the analyzed attack techniques are physically implemented and a possibility of the occurrence of the attack technique. The prediction module 21223 generates code blocks by using a method to detect any cases where any attack technique is likely to occur as a new attack technique in the future while excluding any combinations of the physically contradictory attack technique.

A prediction information provision module 21225 of the prediction framework 21220 may provide information about a new attack technique, etc. for the predicted malware or character information of malware.

The prediction information provision module 21225 may create proactive countermeasures against a possibility of the occurrence of any new attack technique or new malware. In addition, the prediction information provision module 21225 may provide such prediction information and countermeasure information to a security company or share it with a user.

According to an embodiment, it is possible to provide a means capable of predicting a possibility of generating previously unknown malware or attack technique, and attackers who can develop such malware and attack technique. Further, it is also possible to proactively predict and respond to the occurrence of malware in the future by providing such prediction information and countermeasure information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A cyber threat information processing method, the method comprising:
   converting one or more executable files to classify a set of code blocks corresponding to at least one malware and providing the classified set of code blocks,
   wherein the classified set of code blocks includes one or more sets of code blocks wherein the respective sets of code blocks have one or more identifiers of attack techniques;
   selecting one or more code blocks among the respective sets of code blocks and generating a new set of code blocks,
   wherein the new set of code blocks are selected from the respective sets of code blocks corresponding to the one or more identifiers of attack techniques; and
   predicting a new malware based on the generated new set of code blocks and providing information for the predicted new malware.

2. The method of claim 1, the method further comprising:
   providing countermeasure information for the predicted new malware based on the information for the predicted new malware.

3. The method of claim 1, wherein providing the classified set of code blocks includes:
   generating a set of code blocks corresponding to the at least one malware based on a disassembled code resulting from rearrangement of opcode corresponding to a function included in the executable file and assembly code, which is an operand of the function when converting one or more executable files to classify the set of code blocks.

4. The method of claim 1, wherein the one or more executable files run on an identical operating system.

5. The method of claim 1, wherein the one or more identifiers of attack techniques are defined by MITRE ATT&CK.

6. The method of claim 1, wherein the new malware is predicted based on the generated set of code blocks except when characteristics of a physical attack technique of the at least one malware are contradictory.

7. A cyber threat information apparatus, the apparatus comprising:
   a processor for processing an executable file in an input file; and
   a data base for storing classified malwares, wherein the processor performs:
   converting one or more executable files to classify a set of code blocks corresponding to at least one malware and providing the classified set of code blocks,
   wherein the classified set of code blocks includes one or more sets of code blocks wherein the respective sets of code blocks have one or more identifiers of attack techniques;
   selecting one or more code blocks among the respective sets of code blocks and generating a new set of code blocks,
   wherein the new set of code blocks are selected from the respective sets of code blocks corresponding to the one or more identifiers of attack techniques; and
   predicting a new malware based on the generated new set of code blocks and providing information for the predicted new malware.

8. The apparatus of claim 7, wherein the processor provides countermeasure information for the predicted new malware based on the information for the predicted new malware.

9. The apparatus of claim 7, wherein the processor performs:

generating a set of code blocks corresponding to the at least one malware based on a disassembled code resulting from rearrangement of opcode corresponding to a function included in the executable file and assembly code, which is an operand of the function when converting one or more executable files to classify the set of code blocks.

10. The apparatus of claim 7, wherein the one or more executable files run on an identical operating system.

11. The apparatus of claim 7, wherein the one or more identifiers of attack techniques are defined by MITRE ATT&CK.

12. The apparatus of claim 7, wherein the new malware is predicted based on the generated set of code blocks except when characteristics of a physical attack technique of the at least one malware are contradictory.

13. A non-transitory computer-readable storage medium for storing a software executable by a computer for processing cyber threat information, the processing cyber threat information including:

converting one or more executable files to classify a set of code blocks corresponding to at least one malware and providing the classified set of code blocks, wherein the classified set of code blocks includes one or more sets of code blocks wherein the respective sets of code blocks have one or more identifiers of attack techniques;

selecting one or more code blocks among the respective sets of code blocks and generating a new set of code blocks, wherein the new set of code blocks are selected from the respective sets of code blocks corresponding to the one or more identifiers of attack techniques; and predicting a new malware based on the generated new set of code blocks and providing information for the predicted new malware.

14. The non-transitory computer-readable storage medium of claim 13, wherein the software provides countermeasure information for the predicted new malware based on the information for the predicted new malware.

* * * * *